(12) United States Patent
Lee et al.

(10) Patent No.: US 12,507,861 B2
(45) Date of Patent: Dec. 30, 2025

(54) DISHWASHER

(71) Applicant: SAMSUNG ELECTRONICS CO., LTD., Suwon-si (KR)

(72) Inventors: Inju Lee, Suwon-si (KR); Seungyong Yang, Suwon-si (KR); Sungwook Kang, Suwon-si (KR); Yeonsu Kim, Suwon-si (KR); Jinhyok An, Hwaseong-si (KR); Youngpyo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 91 days.

(21) Appl. No.: 18/396,283

(22) Filed: Dec. 26, 2023

(65) Prior Publication Data

US 2024/0148223 A1 May 9, 2024

Related U.S. Application Data

(63) Continuation of application No. PCT/KR2023/011804, filed on Aug. 10, 2023.

(30) Foreign Application Priority Data

Nov. 4, 2022 (KR) .................. 10-2022-0146527

(51) Int. Cl.
*A47L 15/42* (2006.01)
*A47L 15/44* (2006.01)
*C11D 17/00* (2006.01)

(52) U.S. Cl.
CPC ....... *A47L 15/4436* (2013.01); *A47L 15/4257* (2013.01); *A47L 15/44* (2013.01);
(Continued)

(58) Field of Classification Search
None
See application file for complete search history.

(56) References Cited

U.S. PATENT DOCUMENTS

| 5,167,350 | A | 12/1992 | Amberg et al. |
| 7,231,928 | B2 | 6/2007 | Dingler et al. |
| 7,275,552 | B2 | 10/2007 | DeWeerd et al. |

(Continued)

FOREIGN PATENT DOCUMENTS

| CN | 2010-136795 A | 6/2010 |
| CN | 104264422 A | 1/2015 |

(Continued)

OTHER PUBLICATIONS

International Search Report dated Dec. 11, 2023 for International Application No. PCT/KR2023/011804.

*Primary Examiner* — Levon J Shahinian
(74) *Attorney, Agent, or Firm* — STAAS & HALSEY LLP

(57) ABSTRACT

A dishwasher including a tub; a door to open and close the tub; and an automatic detergent dispenser disposed on the door and including a storage compartment in which solid detergents are stackable along one direction, and a transporting member at one side of the storage compartment to move a solid detergent outside of the storage compartment, the transporting member including a hub portion configured to be rotatable in a first rotational direction around a rotating axis, and a body portion extending in a radial direction from a portion of an outer rim of the hub portion, and configured to rotate together with the hub portion, wherein the body portion is configured to, when rotated in the first rotational direction, press one solid detergent outside of the storage compartment, and guide a movement of at least one remaining solid detergent inside the storage compartment along the one direction.

14 Claims, 21 Drawing Sheets

(52) U.S. Cl.
CPC ....... *A47L 15/4409* (2013.01); *A47L 15/4463* (2013.01); *C11D 17/00* (2013.01); *C11D 17/0091* (2013.01); *A47L 2501/07* (2013.01)

(56) References Cited

U.S. PATENT DOCUMENTS

| | | |
|---|---|---|
| 9,717,393 B2 | 8/2017 | Delgado et al. |
| 11,019,982 B2 | 6/2021 | Boyer et al. |
| 11,089,939 B2 | 8/2021 | Staun |
| 11,284,776 B2 | 3/2022 | Dirnberger et al. |
| 2002/0117511 A1 | 8/2002 | McNabb et al. |
| 2009/0090401 A1 | 4/2009 | Feddema |
| 2013/0036775 A1 | 2/2013 | Brueckner et al. |
| 2020/0196830 A1* | 6/2020 | Dirnberger .......... A47L 15/4257 |
| 2022/0175212 A1 | 6/2022 | Dirnberger et al. |

FOREIGN PATENT DOCUMENTS

| | | |
|---|---|---|
| CN | 111436874 A | 7/2020 |
| CN | 211484457 U | 9/2020 |
| CN | 213665123 U | 7/2021 |
| EP | 1 355 561 B1 | 3/2008 |
| EP | 1 995 368 A2 | 11/2008 |
| EP | 2 044 877 A1 | 4/2009 |
| EP | 2 777 472 A1 | 9/2014 |
| EP | 4 133 985 A1 | 2/2023 |
| KR | 10-2007-0024037 A | 3/2007 |
| KR | 10-2013-0062273 A | 6/2013 |
| KR | 10-2017-0025986 | 3/2017 |
| KR | 10-2022-0080706 A | 6/2022 |
| WO | WO 2005/060820 A2 | 7/2005 |

* cited by examiner

DISHWASHER

CROSS-REFERENCE TO RELATED APPLICATION(S)

This application is a continuation application, under 35 U.S.C. § 111(a), of international application No. PCT/KR2023/011804, filed on Aug. 10, 2023, which claims priority to Korean Patent Application No. 10-2022-0146527, filed on Nov. 4, 2022, in the Korean Intellectual Property Office, the disclosures of which are incorporated by reference herein in their entireties.

BACKGROUND

1. Field

The disclosure relates to a dishwasher, and more particularly, to a dishwasher including a device configured to input detergent.

2. Description of Related Art

A dishwasher is a device that automatically removes food residues and the like on dishes using detergent and wash water.

The dishwasher includes a main body, a washing chamber formed by a tub disposed inside the main body, a storage container disposed inside the washing chamber to store dishes, and a spray unit configured to spray wash water to the storage container.

The storage container may be usually provided in two or three stages, and the spray unit may be provided in plurality and disposed to correspond to the storage container so as to spray wash water to each place, in which each storage container is disposed.

The dishwasher may include a washing process, a rinsing process, and a drying process. In the washing process, the spray unit may spray wash water, and at the same time, an automatic detergent dispenser may input detergent to the tub. Accordingly, dishes may be washed. In the rinsing process, wash water may be sprayed to remove the detergent. In the drying process, moisture remaining in the dishes may be removed.

The automatic detergent dispenser of the dishwasher may include a storage compartment so as to store various types of detergents, such as powder detergent or liquid detergent, in the storage compartment.

SUMMARY

Aspects of embodiments of the disclosure will be set forth in part in the description which follows and, in part, will be apparent from the description, or may be learned by practice of the presented embodiments.

According to an embodiment of the disclosure, a dishwasher includes a tub; a door to open and close the tub; and an automatic detergent dispenser disposed on the door and configured to input a solid detergent toward an inside of the tub, the automatic detergent dispenser including a storage compartment in which a plurality of solid detergents are stackable so as to be loaded along one direction, and a transporting member arranged at one side of the storage compartment along the one direction in which the plurality of solid detergents are stackable, and configured to move a solid detergent, among the plurality of solid detergents loaded in the storage compartment, outside of the storage compartment, the transporting member including a hub portion configured to be rotatable in a first rotational direction around a rotating axis, and a body portion extending from a portion of an outer rim of the hub portion, in a radial direction of the hub portion, and configured to rotate together with the hub portion in the first rotational direction, wherein the body portion is configured to, when rotated in the first rotational direction, and a plurality of solid detergents are loaded in the storage compartment, press one solid detergent among the plurality of solid detergents outside of the storage compartment, and guide a movement of at least one remaining solid detergent, among the plurality of solid detergents, inside the storage compartment along the one direction.

According to an embodiment of the disclosure, the body portion may include a pressing portion configured to press the one solid detergent outside of the storage compartment during rotation of the body portion in the first rotational direction, and the pressing portion may be formed at one end of the body portion in the first rotational direction.

According to an embodiment of the disclosure, the pressing portion may include a first portion extending from the hub portion, and a second portion extending in the first rotational direction from one end of the first portion.

According to an embodiment of the disclosure, the first portion may obliquely extend from the hub portion in a direction opposite to the first rotational direction with respect to the radial direction of the hub portion.

According to an embodiment of the disclosure, an extension length of the first portion may be longer than an extension length of the second portion.

According to an embodiment of the disclosure, the storage compartment may include a storage compartment outlet configured to pass a solid detergent therethrough to be discharged outside of the storage compartment, and a distance between one end of the pressing portion in the radial direction of the hub portion and the rotating axis of the transporting member may be greater than or equal to a distance between the storage compartment outlet and the rotating axis of the transporting member.

According to an embodiment of the disclosure, the transporting member may include a plurality of cam regions divided in the first rotational direction on an outer rim of the transporting member, the plurality of cam regions may include a first cam region located on the outer rim of the hub portion, and a second cam region located at a side of the first cam region in the first rotational direction, on an outer rim of the body portion, and the second cam region may be configured to guide the movement of the at least one remaining solid detergent inside the storage compartment along the one direction toward the rotating axis of the transporting member during the rotation of the body portion in the first rotational direction.

According to an embodiment of the disclosure, the second cam region may include a plurality of peak areas arranged along the first rotational direction and protruding in a radial direction of the transporting member, and a concave areas positioned between adjacent peak areas among the plurality of peak areas, and recessed inwardly in the radial direction of the transporting member.

According to an embodiment of the disclosure, a protruding length of each of the plurality of peak areas in the radial direction of the transporting member may gradually increase along the first rotational direction.

According to an embodiment of the disclosure, the transporting member may be configured to be rotatable in a second rotational direction opposite to the first rotational direction, and the plurality of peak areas may be configured to press one solid detergent among the plurality of solid detergents when the transporting member is rotated in the second rotational direction.

According to an embodiment of the disclosure, the storage compartment may include a support surface configured to allow a solid detergent, among the plurality of solid detergents, closest to the rotating axis of the transporting member to be supported in the one direction in which the plurality of solid detergents are stacked, and the first cam region may be configured such that a distance between an outer rim of the first cam region and the rotating axis of the transporting member is less than or equal to a distance between the support surface and the rotating axis of the transporting member.

According to an embodiment of the disclosure, the body portion may have a shape in which a length extending from the hub portion gradually increases along the first rotational direction.

According to an embodiment of the disclosure, the body portion may be configured to press the one solid detergent in a direction perpendicular to the one direction in which the plurality of solid detergents are stacked.

According to an embodiment of the disclosure, while the tub is closed by the door, the one direction in which the plurality of solid detergents are stacked may be parallel to an upper to lower direction of the door, and the transporting member is configured to move the one solid detergent, which is disposed at a lowest position among the plurality of solid detergents before being pressed outside of the storage compartment, outside of the storage compartment as the transporting member rotates in the first rotational direction.

According to an embodiment of the disclosure, the rotating axis of the transporting member may be located below the storage compartment.

BRIEF DESCRIPTION OF THE DRAWINGS

These and/or other embodiments of the disclosure will become apparent and more readily appreciated from the following description of embodiments, taken in conjunction with the accompanying drawings of which.

DETAILED DESCRIPTION

Figure 1:
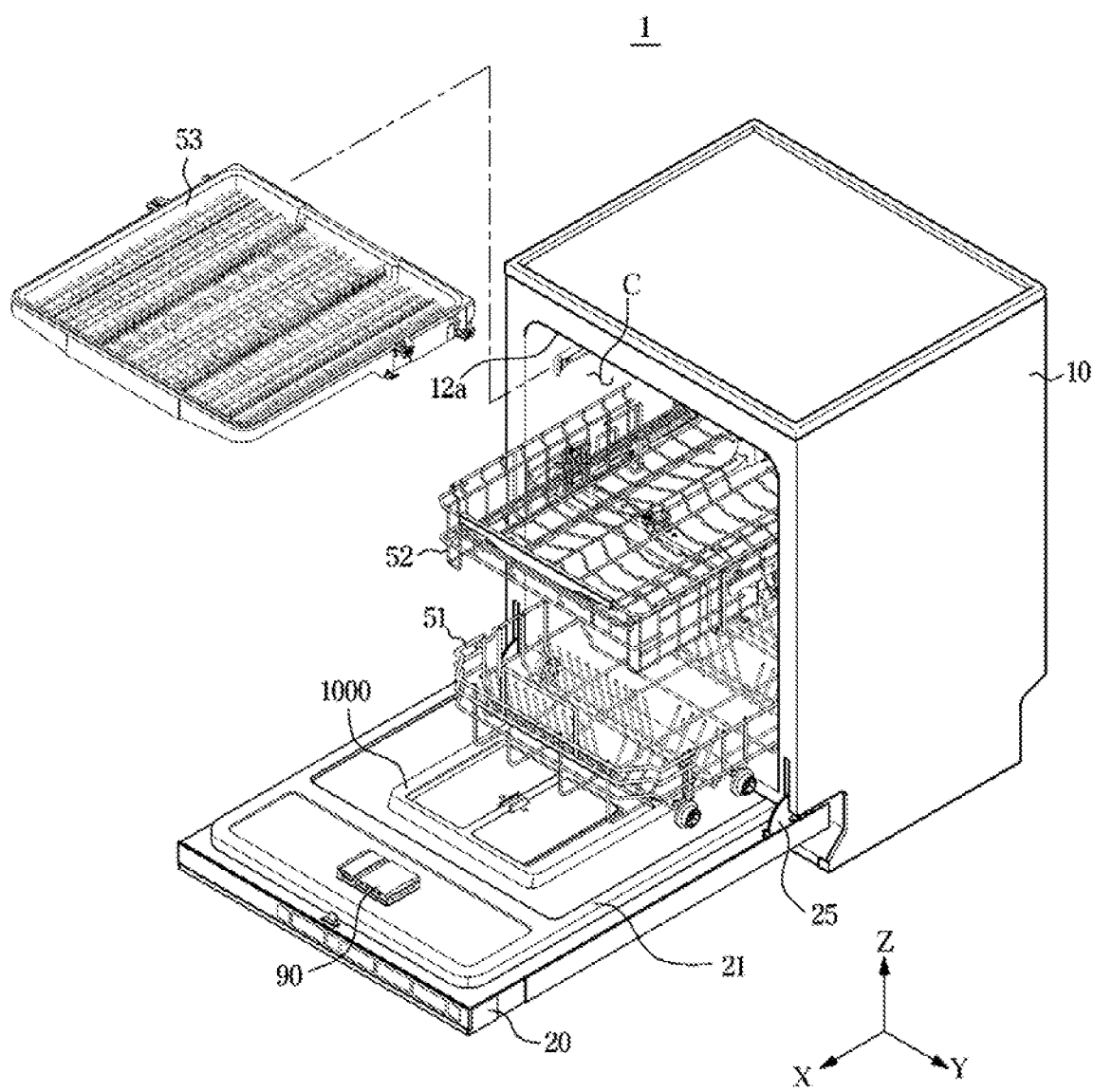
FIG. 1 is a perspective view of a state in which a door of a dishwasher according to an embodiment of the disclosure is opened.

The various embodiments and the terms used therein are not intended to limit the technology disclosed herein to specific forms, and the disclosure should be understood to include various modifications, equivalents, and/or alternatives to the corresponding embodiments.

In describing the drawings, similar reference numerals may be used to designate similar constituent elements.

A singular expression may include a plural expression unless they are definitely different in a context.

The expressions "A or B," "at least one of A or/and B," or "one or more of A or/and B," A, B or C," "at least one of A, B or/and C," or "one or more of A, B or/and C," and the like used herein may include any and all combinations of one or more of the associated listed items.

The term of "and/or" includes a plurality of combinations of relevant items or any one item among a plurality of relevant items.

Herein, the expressions "a first", "a second", "the first", "the second", etc., may simply be used to distinguish an element from other elements, but is not limited to another aspect (importance or order) of elements.

When an element (e.g., a first element) is referred to as being "(functionally or communicatively) coupled," or "connected" to another element (e.g., a second element), the first element may be connected to the second element, directly (e.g., wired), wirelessly, or through a third element.

In this disclosure, the terms "including", "having", and the like are used to specify features, numbers, steps, operations, elements, elements, or combinations thereof, but do not preclude the presence or addition of one or more of the features, elements, steps, operations, elements, elements, or combinations thereof.

When an element is said to be "connected", "coupled", "supported" or "contacted" with another element, this includes not only when elements are directly connected, coupled, supported or contacted, but also when elements are indirectly connected, coupled, supported or contacted through a third element.

Throughout the description, when an element is "on" another element, this includes not only when the element is in contact with the other element, but also when there is another element between the two elements.

The terms "up and down direction", "height direction", "vertical direction", etc., used in the following description may refer to the Z-direction based on a perspective view of a dishwasher in FIG. 1, and "horizontal direction" may refer to any direction along the X-Y plane in the X-direction or the Y-direction based on the perspective view of FIG. 1.

The terms "first direction", "second direction", "third direction", etc. used in the following description are arbitrarily defined according to some standards to be described later, but are not limited thereto. In addition, "first direction", "second direction", and "third direction" may mean a direction comprehensively including all "first direction and opposite direction of first direction", "second direction and opposite direction of second direction", and "third direction and opposite direction of third direction".

Hereinafter "dish" may be used as a concept encompassing bowls, cups, cutlery, and various cooking utensils.

Embodiments of the disclosure may provide a dishwasher including an improved structure in which a solid detergent is input into a tub during a washing process.

Embodiments of the disclosure may provide a dishwasher including an improved structure in which a plurality of solid detergents are stacked and loaded into an automatic detergent dispenser.

Embodiments of the disclosure may provide a dishwasher including an improved structure in which a certain amount of solid detergent loaded in a storage compartment of an automatic detergent dispenser is input into a tub during a washing process.

Embodiments of the disclosure may provide a dishwasher including an improved structure in which a movement of a solid detergent loaded in a storage compartment of an automatic detergent dispenser is guided.

Reference will now be made in detail to embodiments of the disclosure, examples of which are illustrated in the accompanying drawings.

Figure 2:
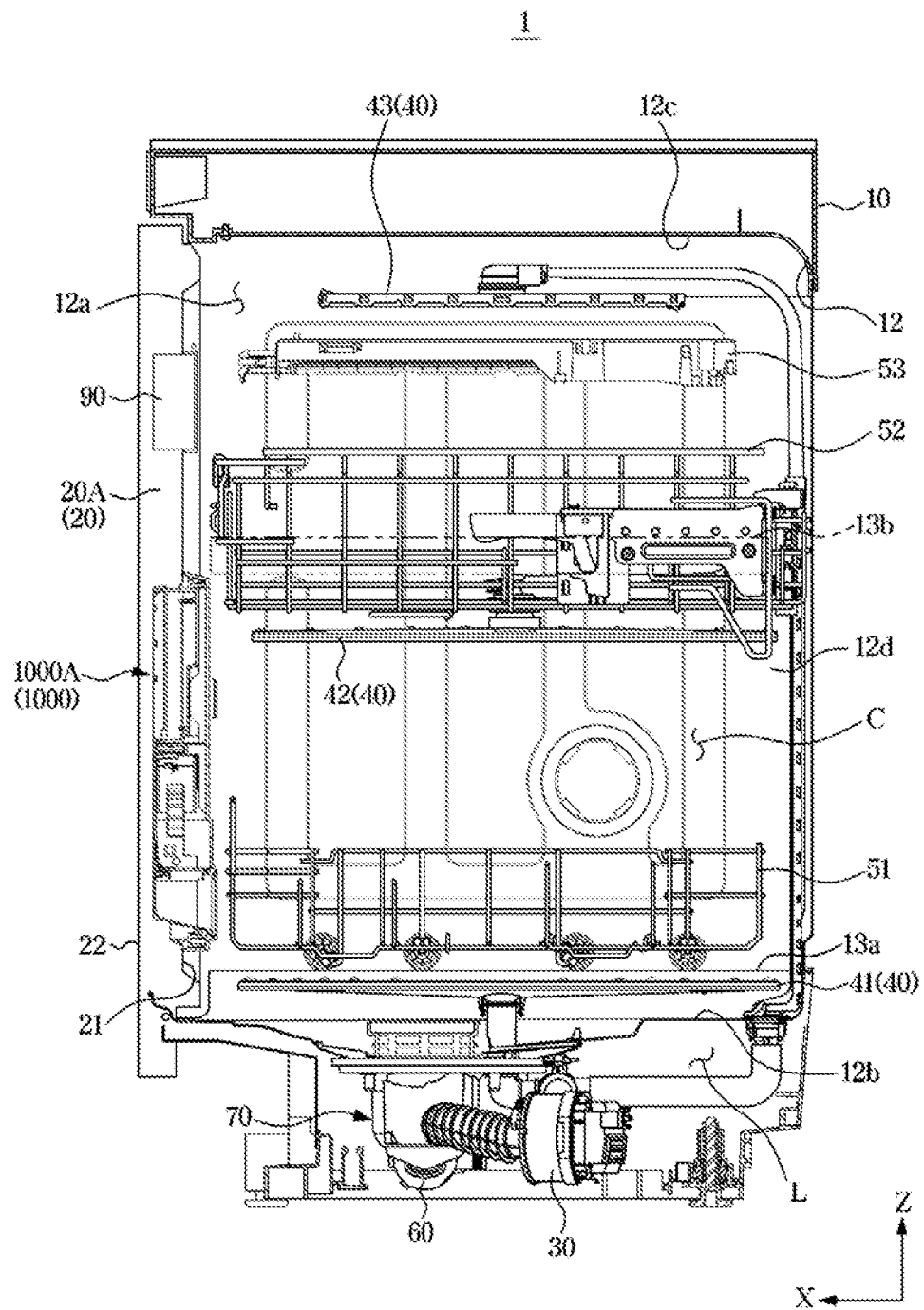
FIG. 2 is a schematic side cross-sectional view of the dishwasher according to an embodiment of the disclosure.
Figure 3:
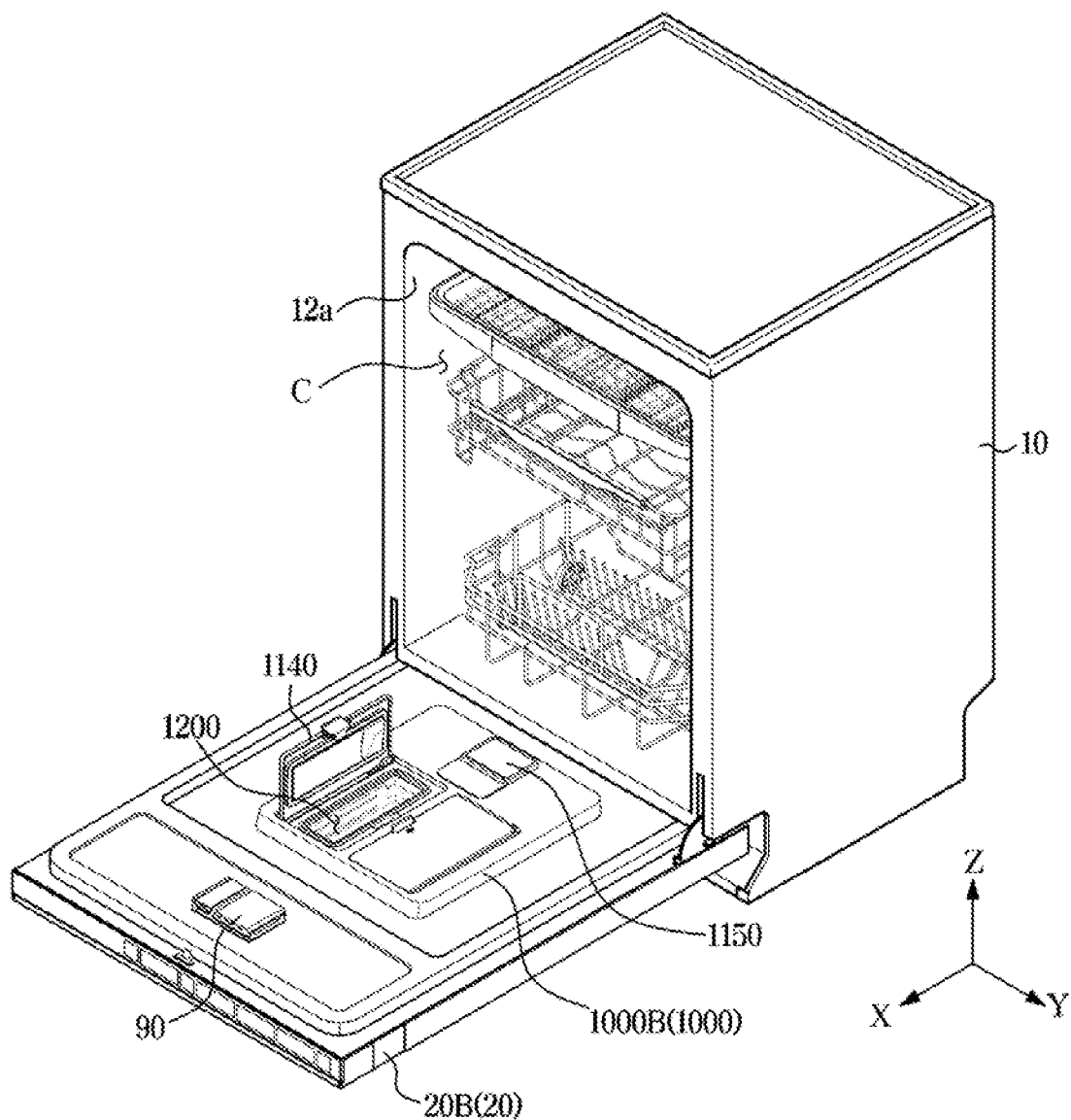
FIG. 3 is a perspective view illustrating a state in which a detergent is loaded into an automatic detergent dispenser of the dishwasher according to an embodiment of the disclosure.

FIG. 1 is a perspective view of a state in which a door of a dishwasher according to an embodiment is opened, FIG. 2 is a schematic side cross-sectional view of the dishwasher according to an embodiment, and FIG. 3 is a perspective view illustrating a state in which a detergent is loaded into an automatic detergent dispenser of the dishwasher according to an embodiment.

A dishwasher 1 may include a tub 12 arranged inside a main body 10. The tub 12 may be formed in a substantially box shape. One side of the tub 12 may be opened. The tub 12 may include an opening 12a. For example, a front surface of the tub 12 may be opened toward the first direction X.

The dishwasher 1 may further include a door 20 configured to open and close the opening 12a of the tub 12. The door 20 may be installed in the main body 10 to open and close the opening 12a of the tub 12. The door 20 may be rotatably installed in the main body 10 through a member such as a hinge 25. The door 20 may be removably mounted to the main body 10.

For example, the door 20 may be rotatably hinged to a lower portion of the main body 10. A rotation axis of the hinge 25 may extend in the second direction Y, which is the left and right direction of the main body 10, to allow the door 20 to be rotated in the front and rear directions in front of the main body 10.

For example, on the front side of the main body 10, the door 20 may be hinged to a hinge arranged on the left or right side of the main body 10 with respect to the second direction Y. The door 20 may be provided to be rotated from the second direction Y to the first direction X by the hinge arranged on the left and/or right side of the main body 10.

The door 20 may include an outer surface 22 forming an exterior of the dishwasher 1 together with the main body 10, and an inner surface 21 facing the inside of the tub 12 when the door 20 closes the tub 12.

The dishwasher 1 may further include a storage container arranged in the tub 12 to accommodate dishes. The storage container may include a plurality of baskets 51, 52 and 53.

The storage container may include an intermediate basket 52 positioned in the middle with respect to the height direction of the dishwasher 1, and a lower basket 51 positioned in a lower portion with respect to the height direction of the dishwasher 1. The intermediate basket 52 may be provided to be supported by an intermediate guide rack 13b. The lower basket 51 may be provided to be supported by a lower guide rack 13a. The intermediate guide rack 13b and the lower guide rack 13a may be installed on a side surface 12d of the tub 12 so as to be slidable toward the opening 12a of the tub 12. The side surface 12d of the tub 12 may include an inner surface of a right wall and an inner surface of a left wall of the tub 12.

Relatively large dishes may be stored in the lower basket 51 and the intermediate basket 52. However, the types of dishes accommodated in the lower and intermediate baskets 51 and 52 is not limited to relatively large dishes. That is, the plurality of baskets 51, 52 and 53 may accommodate not only relatively large dishes but also relatively small dishes.

The storage container may include an upper basket 53 positioned in an upper portion with respect to the height direction of the dishwasher 1. The upper basket 53 may be formed in a rack assembly to accommodate relatively small dishes. For example, the upper basket 53 may accommodate a cooking utensil such as a ladle, a knife, or a turner, or cutlery. In addition, the upper basket 53 may accommodate a small cup such as an espresso cup. However, the types of dishes accommodated in the upper basket 53 is not limited thereto.

The upper basket 53 may be provided to be supported by an upper guide rack. The upper guide rack may be installed on the side surface 12d of the tub 12. For example, the upper basket 53 may be slidably moved by the upper guide rack, and inserted into or withdrawn from a washing chamber C.

The storage container is not limited to the shape shown in FIGS. 1 and 2, and the storage container may not include the upper basket 53 according to the size of the tub 12. For example, the storage container may be implemented with the intermediate basket 52 and the lower basket 53.

The dishwasher 1 may include the washing chamber C, which is a space formed inside the tub 12. The washing chamber C may be defined as an inner space of the tub 12. The washing chamber C may correspond to a space surrounded by a lower surface 12b, an upper surface 12c and the side surface 12d of the tub 12, and the inner surface 21 of the door 20 when the door 20 closes the tub 12.

The washing chamber C may refer to a space in which dishes placed in the baskets 51, 52 and 53 are washed by wash water and dried.

The dishwasher 1 may include a spray device 40 configured to spray wash water. The spray device 40 may receive wash water from a sump assembly 70.

The spray device 40 may include a plurality of spray units 41, 42, and 43.

For example, the plurality of spray units 41, 42, and 43 may include a first spray unit 41 arranged under the lower basket 51 in the height direction of the dishwasher 1, a second spray unit 42 arranged under the intermediate basket 52 in the height direction of the dishwasher 1, and a third spray unit 43 arranged above the upper basket 53 in the height direction of the dishwasher 1.

Each of the plurality of spray units 41, 42, and 43 may be configured to spray wash water while rotating. Each of the first spray unit 41, the second spray unit 42, and the third spray unit 43 may be provided to spray wash water while rotating. The plurality of spray units 41, 42 and 43 may be referred to as a plurality of spray rotors. The first spray unit 41, the second spray unit 42, and the third spray unit 43, respectively, may be referred to as a first spray rotor 41, a second spray rotor 42, and a third spray rotor 43.

However, the spray device 40 may spray the wash water in a manner different from the above-described example. For example, unlike the second spray unit 42 and the third spray unit 43, the first spray unit 41 may be fixed to one side of the lower surface 12b of the tub 12. The first spray unit 41 may be configured to spray the wash water in a substantially horizontal direction by a fixed nozzle. A direction of the wash water, which is sprayed in a substantially horizontal direction from the nozzle of the first spray unit 41, may be changed by a conversion assembly (not shown) arranged thereon and then the wash water may move upward. The conversion assembly may be installed on a rail by a holder and may be provided to be movable in translation along the rail.

The dishwasher 1 may include the sump assembly 70.

The sump assembly 70 may be provided to receive wash water. The sump assembly 70 may collect wash water of the washing chamber C. For example, the lower surface 12b of the tub 12 may be inclined downward toward the sump assembly 70 to smoothly collect water to the sump assembly 70. The wash water of the washing chamber C may flow along the slope of the lower surface 12b of the tub 12 and smoothly flow into the sump assembly 70.

The sump assembly 70 may include a circulation pump 30 configured to pump wash water stored in the sump assembly 70 to the spray device 40.

The sump assembly 70 may include a drain pump 60 configured to drain wash water and foreign substances (e.g., food residues) remaining in the sump assembly 70.

The sump assembly 70 may pump the collected wash water and supply the wash water to the spray device 40. The sump assembly 70 may be connected to the spray device 40 to supply wash water to the spray device 40.

The sump assembly 70 may be independently connected to the first spray unit 41, the second spray unit 42, and the third spray unit 43. For example, the sump assembly 70 may be independently connected to connectors connected to the first spray unit 41, the second spray unit 42, and the third spray unit 43. The connector may be provided in the shape of a connection port, duct, or the like.

For example, the second spray unit 42 and the third spray unit 43 may be provided with one connector, and in this case, wash water supplied through the one connector may flow into a connector. Wash water flowing into the connector may be branched during moving, and the branched wash water may be provided to at least one of the second spray unit 42 and the third spray unit 43.

The dishwasher 1 may include an alternating device (not shown) configured to selectively supply wash water to the spray device 40. The alternating device (not shown) may be driven to selectively supply wash water to each connector connected to each of the spray devices 41, 42, and 43. For example, the alternating device (not shown) may selectively supply wash water to at least one of a connector connected to the first spray device 41 and a connector connected to the second spray device 42.

The dishwasher 1 may include a machine room L, which is a space provided below the tub 12. The machine room L may be a place in which a component for circulating wash water is disposed.

For example, at least a part of the sump assembly 70 may be arranged in the machine room L. Most of the sump assembly 70 may be arranged in the machine room L. As for a volume of the sump assembly 70, a volume of the sump assembly 70 located in the washing chamber C may be less than a volume of the sump assembly 70 located in the machine room L. By reducing the volume of the sump assembly 70 occupying the washing chamber C, the volume of the washing chamber C may be secured. Accordingly, a capacity of the washing chamber C may be increased, and thus a storage capacity of the dishes may be improved.

The dishwasher 1 may include an automatic detergent dispenser 1000 configured to input a solid detergent into the tub 12.

The dishwasher 1 may include a detergent box 90 provided to input not only a solid detergent but also powder detergent or liquid detergent into the tub 12.

When a user inputs information related to a washing mode of the dishwasher 1 through an inputter of the dishwasher 1 or a mobile device, a control device 1900, which will be described later, may control the dishwasher 1 to selectively input the detergent stored in the detergent box 90 into the tub 12 based on the user input obtained from a main control device. The information related to the washing mode may include information related to a small amount washing mode in which a small number of dishes is washed or information related to a quick washing mode in which a washing time is minimized.

The solid detergent means a solid detergent that is formed to have a predetermined shape. The solid detergent may have an approximate block shape, and thus the solid detergent may be referred to by various terms such as detergent block and block-type detergent. The shape of the solid detergent is not limited to a specific shape or size, and may have various shapes.

The automatic detergent dispenser 1000 may be provided to allow a plurality of solid detergents to be loaded. The automatic detergent dispenser 1000 may be provided to allow one of a plurality of solid detergents to be input into the tub 12 while the dishwasher 1 washes dishes.

For example, the dishwasher 1 may be provided to wash dishes through a pre-washing operation, a main washing operation, a rinsing operation, and a drying operation. The automatic detergent dispenser 1000 may be configured to input a solid detergent into the tub 12 before or at the start of the main washing process.

The detergent box 90 may be provided to accommodate powder detergent or liquid detergent. The detergent box 90 may be provided to allow detergent to be input into the tub 12 while the dishwasher 1 washes dishes.

The dishwasher 1 may be configured to input detergent stored in the detergent box 90 or a solid detergent loaded in the automatic detergent dispenser 1000 into the tub 12.

The dishwasher 1 may be configured to allow one detergent, which is selected by a user between detergent stored in the detergent box 90 and solid detergents loaded in the automatic detergent dispenser 1000, to be input to the tub 12.

The automatic detergent dispenser 1000 may be disposed on the inner surface 21 of the door 20. The automatic detergent dispenser 1000 may be provided to be coupled to the inner surface 21 of the door 20.

The detergent box 90 may be disposed on the inner surface 21 of the door 20. When the door 20 closes the tub 12, the automatic detergent dispenser 1000 and the detergent box 90 may be arranged in the third direction Z, which is the vertical direction.

Because the automatic detergent dispenser 1000 is disposed on the door 20, the automatic detergent dispenser 1000 may be provided to be rotated together with the door 20 by the rotation of the door 20.

When a position in which the door 20 closes the tub 12 is defined as a first position 20A of the door 20, and a position in which the door 20 opens the tub 12 is defined as a second position 20B of the door 20, the door 20 may be configured to open and close the tub 12 by moving between the first position 20A and the second position 20B.

The second position 20B of the door 20 may be defined as any position among positions at which the door 20 opens the tub 12, and it is appropriate that the second position 20B is a position in which dishes stored in the tub 12 are allowed to be withdrawn to the outside of the tub 12. For example, the second position 20B of the door 20 may be a position in which an extension direction of the inner surface 21 of the door 20 corresponds to the first direction X.

The automatic detergent dispenser 1000 may be interlocked with the door 20 so as to be moved between a first position 1000A of the automatic detergent dispenser 1000 corresponding to the first position 20A of the door 20, and a second position 1000B of the automatic detergent dispenser 1000 corresponding to the second position 20B of the door 20.

When the door 20 closes the tub 12, the automatic detergent dispenser 1000 may be disposed at the first position 1000A, and when the door 20 opens the tub 12, the automatic detergent dispenser 1000 may be disposed at the second position 1000B.

As illustrated in FIG. 3, a user can load a plurality of solid detergents into the automatic detergent dispenser 1000 when the automatic detergent dispenser 1000 is disposed at the second position 1000B.

A user can open a storage compartment cover 1140 of the automatic detergent dispenser 1000 and load a plurality of solid detergents into a storage compartment 1200.

In the conventional manner, whenever the dishwasher washes dishes, a user has to load the detergent into the automatic detergent dispenser or the detergent box, which causes inconvenience to the user. On the other hand, the automatic detergent dispenser 1000 of the dishwasher 1 according to an embodiment may be configured to allow a plurality of solid detergents to loaded into the automatic detergent dispenser 1000 at the one-time loading by a user, and when the dishwasher 1 performs the washing process, one solid detergent among the plurality of solid detergents may be input into the tub 12 in one washing process.

Because solid detergents remain inside the automatic detergent dispenser 1000 during the washing process of the dishwasher 1, moisture may flow into the automatic detergent dispenser 1000 during the washing process, and accordingly, the plurality of solid detergents may be damaged.

Because the automatic detergent dispenser 1000 is moved between the first position 1000A and the second position 1000B, a plurality of solid detergents loaded in the automatic detergent dispenser 1000 may be separated from the stored position.

Hereinafter the automatic detergent dispenser 1000 capable of relieving the above difficulties will be described in detail.

Figure 4:
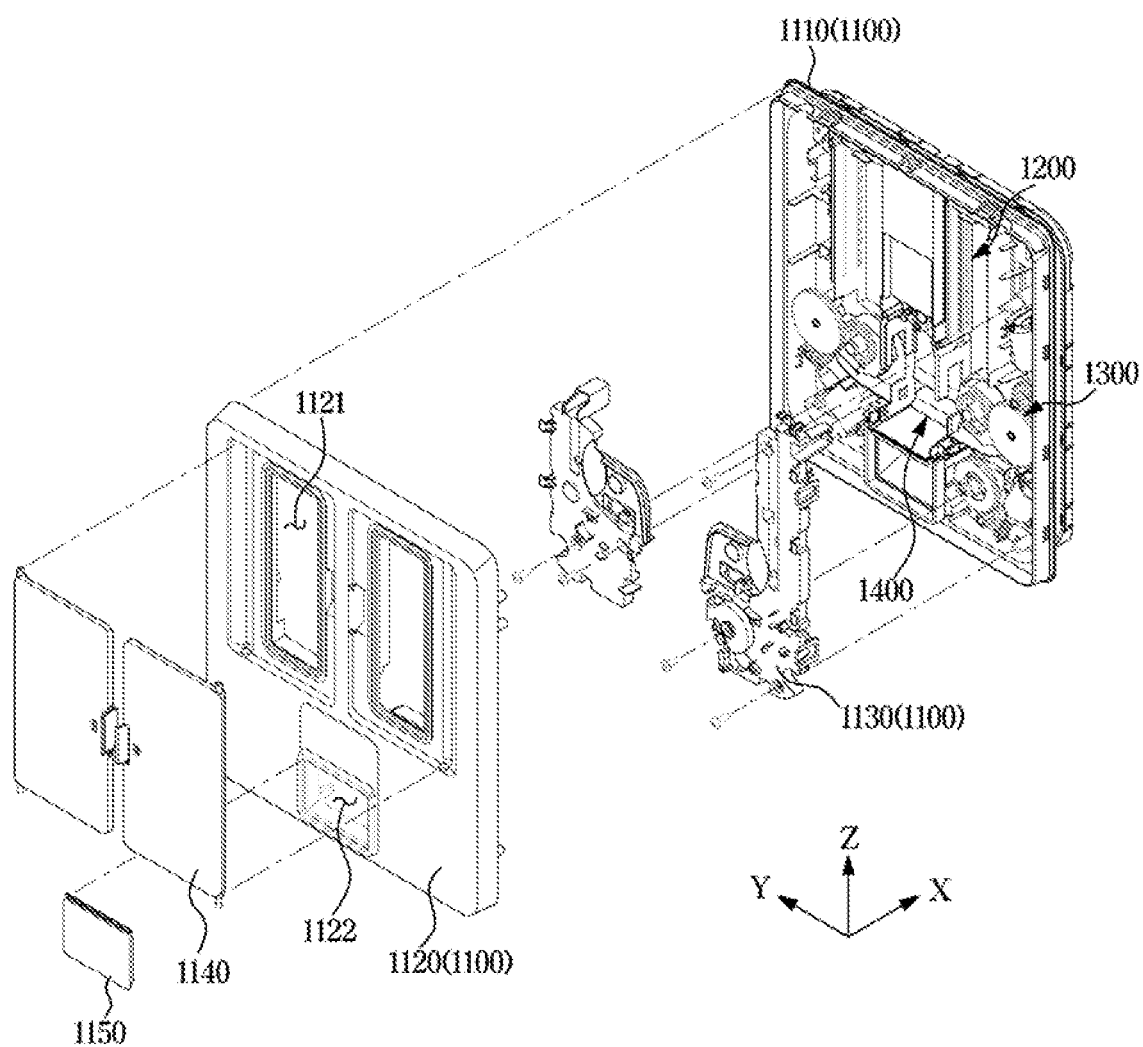
FIG. 4 is an exploded perspective view of the automatic detergent dispenser of the dishwasher according to an embodiment of the disclosure.
Figure 5:
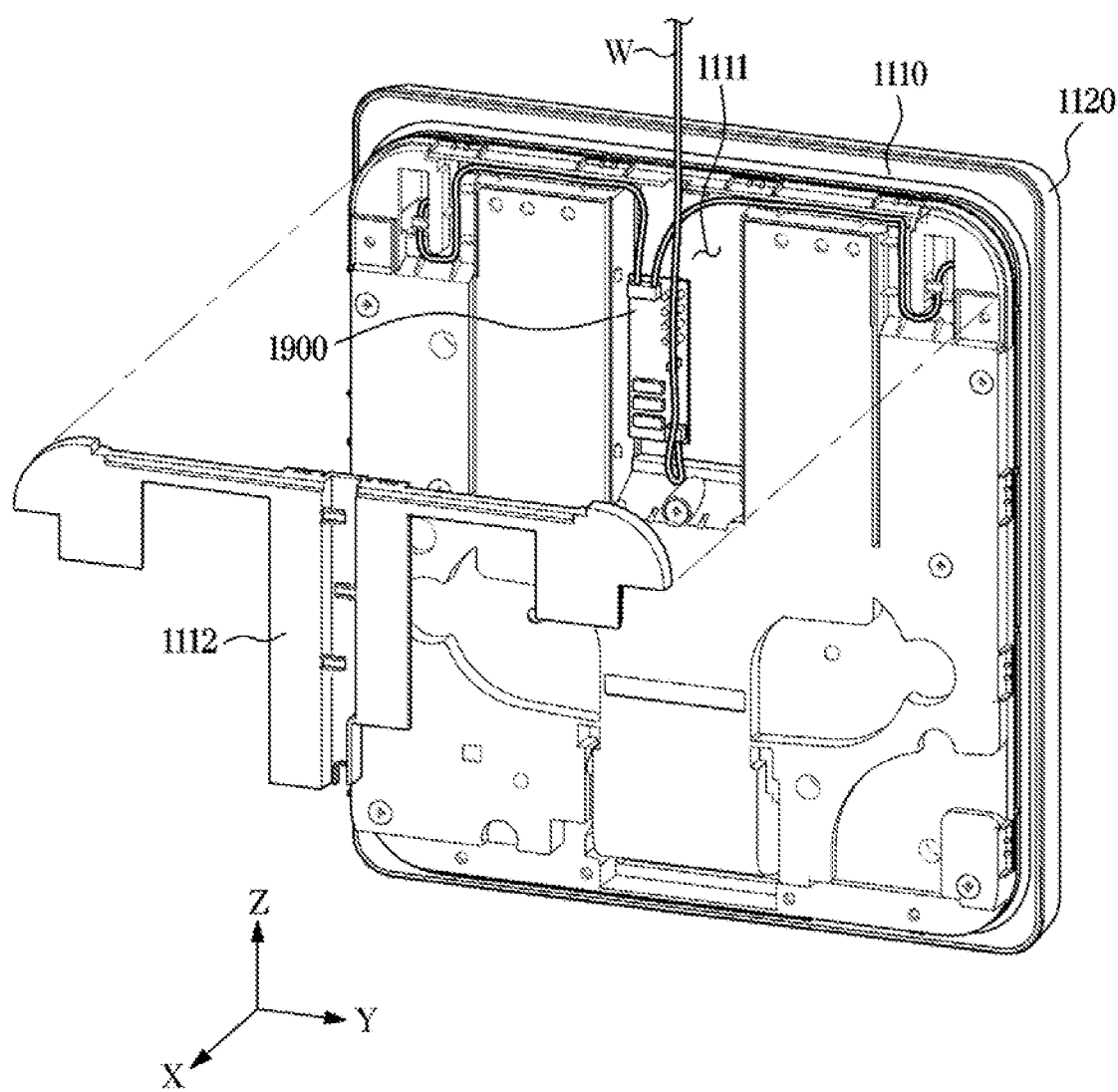
FIG. 5 is an exploded perspective view of the automatic detergent dispenser of the dishwasher according to an embodiment of the disclosure when viewed from another angle.
Figure 6:
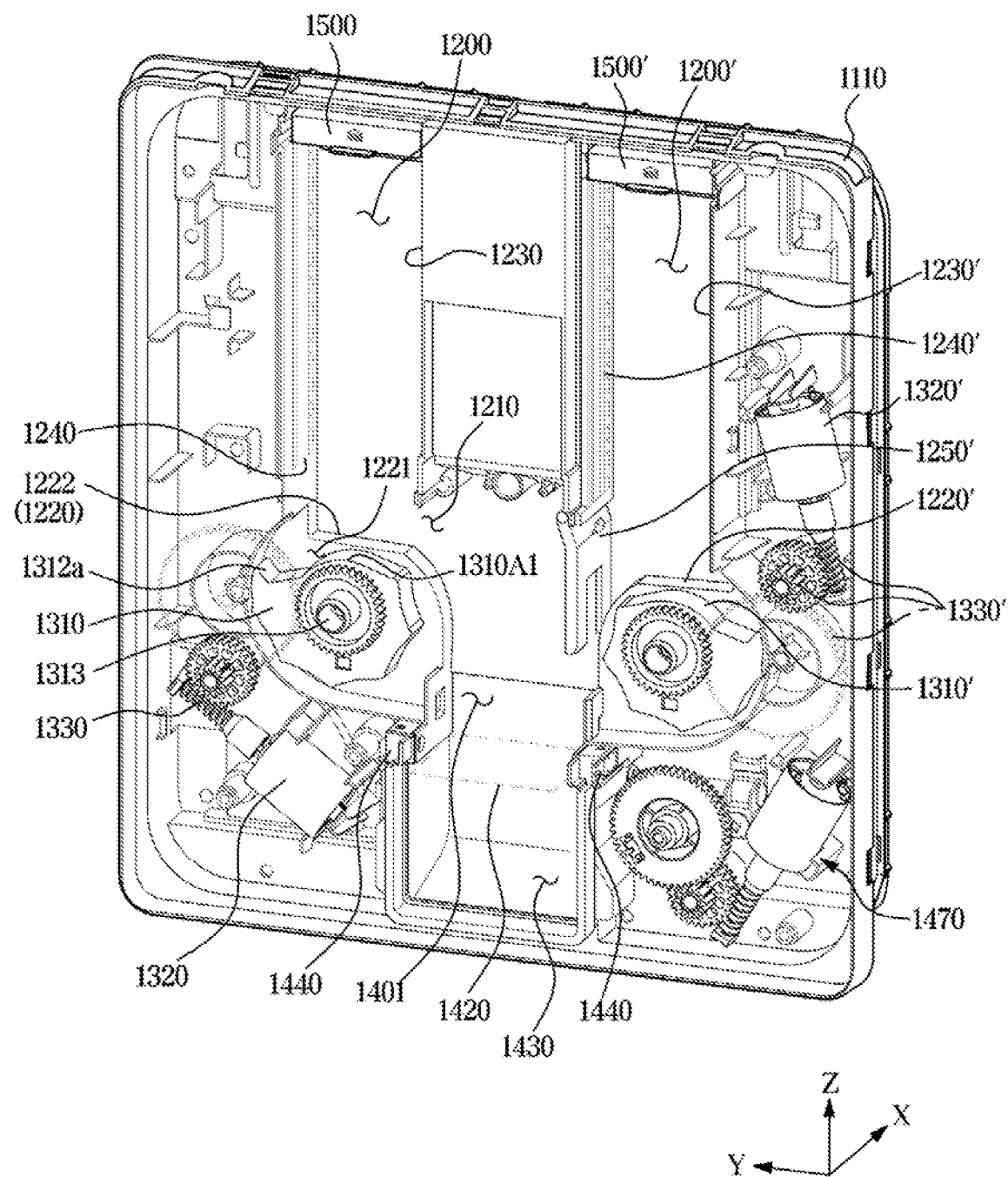
FIG. 6 is a perspective view of a state in which some components of the automatic detergent dispenser of the dishwasher according to an embodiment of the disclosure are removed.
Figure 7:
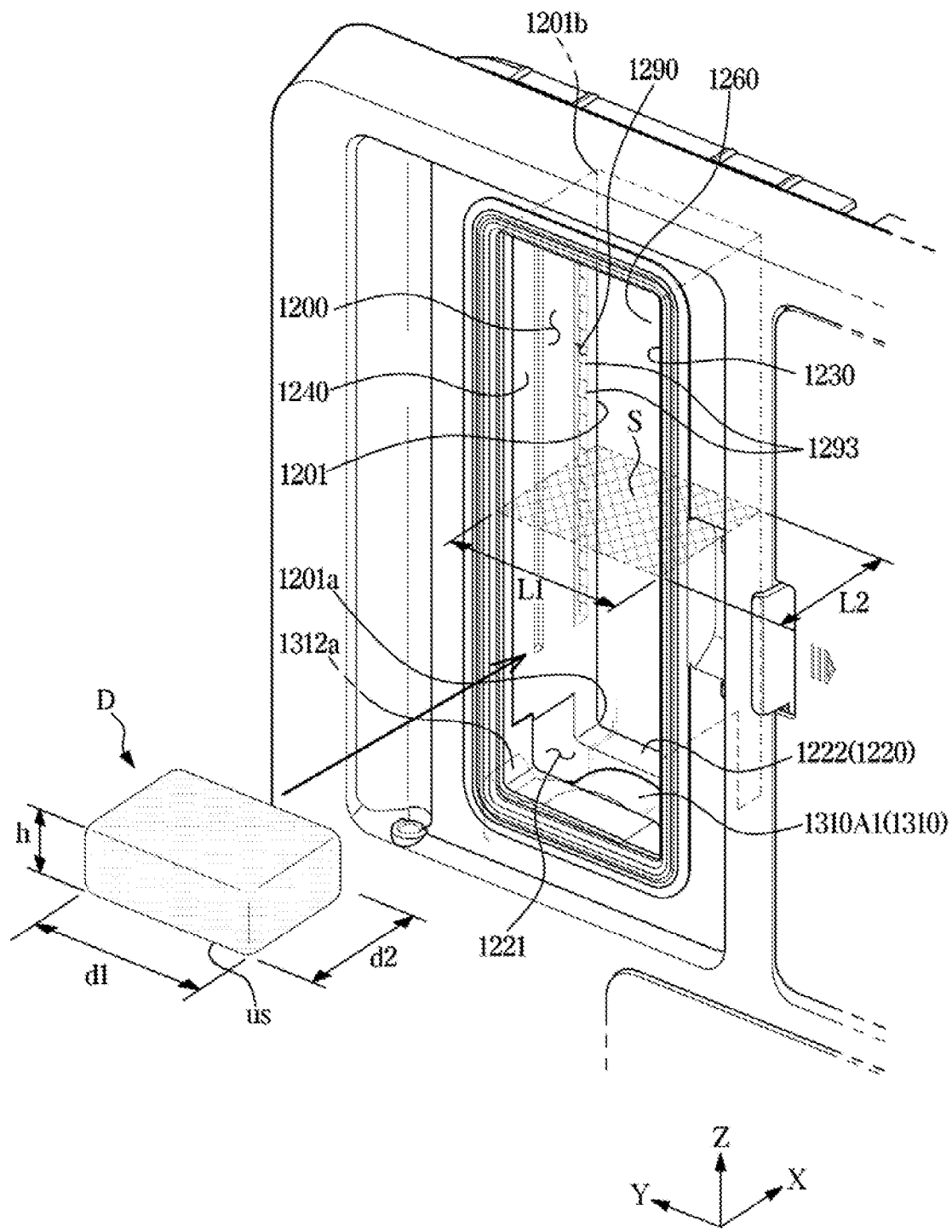
FIG. 7 is an enlarged perspective view of some components of the automatic detergent dispenser of the dishwasher according to an embodiment of the disclosure.
Figure 8:
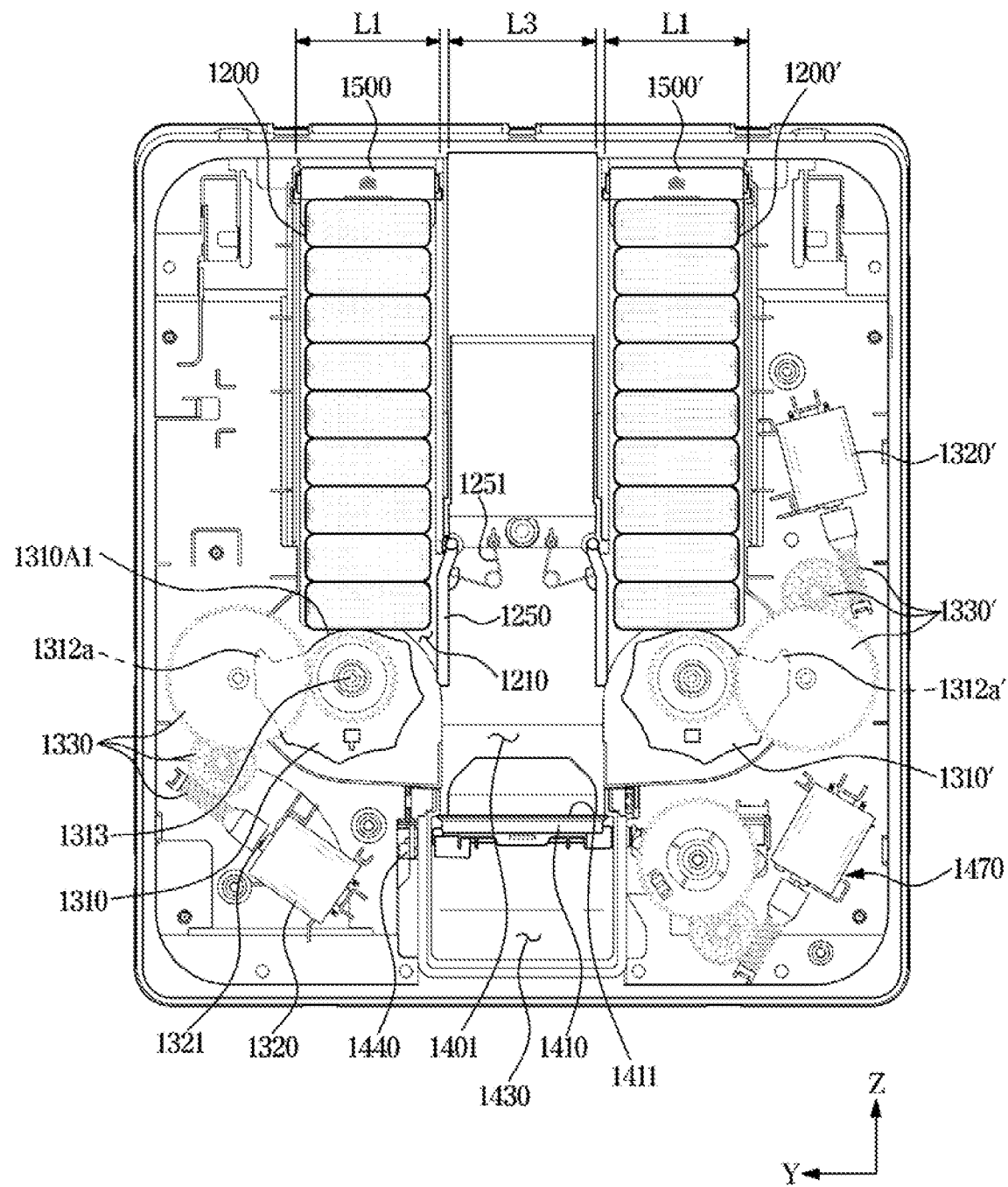
FIG. 8 is a view illustrating a state in which some components of the automatic detergent dispenser of the dishwasher according to an embodiment of the disclosure are removed.

FIG. 4 is an exploded perspective view of the automatic detergent dispenser of the dishwasher according to an embodiment, FIG. 5 is an exploded perspective view of the automatic detergent dispenser of the dishwasher according to an embodiment when viewed from another angle, FIG. 6 is a perspective view of a state in which some components of the automatic detergent dispenser of the dishwasher according to an embodiment are removed, FIG. 7 is an enlarged perspective view of some components of the automatic detergent dispenser of the dishwasher according to an embodiment, and FIG. 8 is a view illustrating a state in which some components of the automatic detergent dispenser of the dishwasher according to an embodiment are removed.

As illustrated in FIGS. 4 and 5, the automatic detergent dispenser 1000 may include a housing 1100.

The housing 1100 may include a first housing 1110 forming the storage compartment 1200 to be described later and a second housing 1120 coupled to the first housing 1110.

The first housing 1110 may be provided to be coupled to the inner surface 21 of the door 20.

The second housing 1120 may be coupled to the first housing 1110 in the first direction X when the automatic detergent dispenser 1000 is disposed at the first position 1000A.

The second housing 1120 may form the storage compartment 1200 together with the first housing 1110. The second housing 1120 may include a first storage compartment opening 1121 provided to open the storage compartment 1200 to the outside. The second housing 1120 may include an inlet 1122 communicating with a seating member 1400 to be described later and configured to allow a solid detergent to be discharged from the automatic detergent dispenser 1000 and introduced into the tub 12.

The housing 1100 may include an intermediate housing 1130 disposed between the first housing 1110 and the second housing 1120 and provided to support an ejector 1300 and the like disposed inside the housing 1100.

For example, components such as the ejector 1300 may be seated on the first housing 1110 and supported by the intermediate housing 1130. Alternatively, components such as the ejector 1300 may be seated on the second housing 1120 and supported by the intermediate housing 1130.

For example, the intermediate housing 1130 may be integrally formed with the first housing 1110. Alternatively, the intermediate housing 1130 may be integrally formed with the second housing 1120.

The housing 1100 may include the storage compartment cover 1140 disposed on the second housing 1120 and configured to open and close the storage compartment opening 1121.

The housing 1100 may include an inlet cover 1150 disposed on the second housing 1120 and configured to open and close the inlet 1122.

The first housing 1110 may include a control device seating member 1111 disposed in a direction opposite to the direction in which the first housing 1110 is coupled to the second housing 1120, and on which the control device 1900 configured to control the automatic detergent dispenser 1000 is seated.

For example, the control device seating member 1111 may be disposed on an outer side of an inside of the housing 1100 formed by coupling the second housing 1120 to the first housing 1110. For example, the control device seating member 1111 may be disposed inside the housing 1100 formed by coupling the second housing 1120 to the first housing 1110.

The first housing 1110 may include a control device cover 1112 covering the control device seating member 1111 from the outside. The control device cover 1112 is not disposed in the inner space of the housing 1100, which is formed by the combination of the first and second housings 1110 and 1120, but is disposed outside the inner space of the housing 1100. Accordingly, when it is required to replace the control device 1900, the control device 1900 may be easily replaced without disassembling the first and second housings 1110 and 1120.

The control device 1900 may control the driving of the ejector 1300 and a seating member door 1410, which will be described later, and may control the automatic detergent dispenser 1000 based on sensing values of various sensors.

The control device 1900 may be configured to communicate with the main control device of the dishwasher 1. For example, the control device 1900 and the main control device may constitute a controller of the dishwasher 1.

The main control device may obtain a user input through the inputter of the dishwasher 1 or a mobile device, and may control driving of the dishwasher 1 based on the obtained user input.

The main control device may transmit information about the received user input to the control device 1900. The control device 1900 may control the automatic detergent dispenser 1000 based on information about the input received from the main control device.

The automatic detergent dispenser 1000 may include a wire W electrically connecting the control device 1900 to electronic components configured to drive the automatic detergent dispenser 1000. The wire W may electrically connect the electronic components (a driving motor 1320, a seating member door driver 1470 and various sensors) configured to drive the automatic detergent dispenser 1000 to allow one of the plurality of solid detergents loaded in the storage compartments 1200 and 1200' to be input into the tub 12, and the control device 1900.

For example, the wire W may electrically connect the main control device and a power supplier of the dishwasher 1 to the control device 1900. For example, the wire W may be provided to electrically connect only a part of components such as various electronic components and the control device 1900 of the automatic detergent dispenser 1000 or the main control device of the dishwasher 1.

For example, at least some of components of various electronic components, sensors and the control device 1900 of the automatic detergent dispenser 1000 or the main control device of the dishwasher 1 may be configured to transmit and receive signals to each other by wireless communication without being electrically connected through the wire W.

The control device 1900 may control the automatic detergent dispenser 1000 based on values sensed by various sensors of the automatic detergent dispenser 1000. This will be described later in detail.

As illustrated in FIGS. 6 to 8, the automatic detergent dispenser 1000 may include the storage compartment 1200 in which a plurality of solid detergents is loaded.

When the automatic detergent dispenser 1000 is disposed at the first position 1000A, the storage compartment 1200 may be provided to allow a plurality of solid detergents to be stacked in the third direction Z corresponding to the vertical direction. For example, the storage compartment 1200 may be provided with the plurality of storage compartments 1200 and 1200'. However, for convenience of description, a single storage compartment 1200 will be described.

The storage compartment 1200 may correspond to a space formed by the first housing 1110 and the second housing 1120. In order to allow the plurality of solid detergents to be stacked and loaded in the third direction Z, the storage compartment 1200 may be provided with a space including a long side 1201 extending in the third direction Z when the automatic detergent dispenser 1000 is disposed at the first position 1000A.

For example, the storage compartment 1200 may be provided as a space formed by the first housing 1110. Alternatively, the storage compartment 1200 may be provided as a space formed by the second housing 1120.

When the storage compartment cover 1140 opens the storage compartment opening 1121, the storage compartment 1200 may be opened to the outside through the storage compartment opening 1121. As shown in FIG. 3, when the automatic detergent dispenser 1000 is placed at the second position 1000B, a user can open the storage compartment cover 1140 and input a plurality of solid detergents into the storage compartment 1200 so as to load the plurality of solid detergents into the storage compartment 1200.

The automatic detergent dispenser 1000 is disposed on the inner surface 21 of the door 20, and thus when the door 20 is opened, the automatic detergent dispenser 1000 may be disposed outside the washing chamber C and thus a user can easily input the detergent.

The storage compartment 1200 may have a predetermined volume or more to store a plurality of solid detergents. As described above, the automatic detergent dispenser 1000 is disposed on the inner surface 21 of the door 20, and thus when a volume of the storage compartment 1200 increases in the first direction X, a volume of the washing chamber C may be reduced. In order to prevent the volume of the storage compartment 1200 from increasing in the first direction X, the storage compartment 1200 may be provided to allow a plurality of solid detergents to be stacked in the third direction Z corresponding to the vertical direction when the automatic detergent dispenser 1000 is at the first position 1000A.

When the automatic detergent dispenser 1000 is disposed at the first position 1000A, the plurality of solid detergents may be loaded in the storage compartment 1200 so as to be stacked and arranged only in the third direction Z without being arranged in the first direction X.

The storage compartment 1200 may be formed to allow the plurality of solid detergents to be stacked only in the third direction Z. Accordingly, it is possible to maximally secure the space of the washing chamber C with respect to the first direction X as described above, and it is possible to secure the space of the storage compartment 1200 of the automatic detergent dispenser 1000 with respect to the second direction Y.

The storage compartment 1200 may be formed to allow a plurality of solid detergents to be stacked only in the third direction Z, and thus a driving configuration of the ejector 1300 such as a transmission member 1330 of the automatic detergent dispenser 1000 or an electronic configuration such as the control device 1900 may be arranged in the second direction Y in the storage compartment 1200. Accordingly, the volume of the automatic detergent dispenser 1000 in the second direction Y may be minimized.

Accordingly, on the inner surface 21 of the door 20, an additional component other than the automatic detergent dispenser 1000 may be disposed outside the automatic detergent dispenser 1000 in the second direction Y, and thus a ratio of the volume of the inner space of the tub 12 to the volume of the main body 10 of the dishwasher 1 may be increased.

However, it is not limited thereto, and a plurality of solid detergents may be loaded in the storage compartment 1200 to be stacked and arranged only in the second direction Y, which is the left and right direction, when the automatic detergent dispenser 1000 is disposed at the first position 1000A.

The automatic detergent dispenser 1000 may include the ejector 1300 configured to move one of the plurality of solid detergents, which is loaded on the storage compartment 1200, to the outside of the storage compartment 1200 so as to be discharged from the storage compartment 1200. For example, the ejector 1300 may be provided with a plurality of ejectors 1300 and 1300' corresponding to the number of the plurality of storage compartments 1200 and 1200'. However, for convenience of description, it will be described based on a single ejector 1300.

When the automatic detergent dispenser 1000 is disposed at the first position 1000A, the ejector 1300 may be configured to allow a single solid detergent, which is disposed at the lowest position in the third direction Z among the plurality of solid detergents stacked in the third direction Z, to be discharged to the outside of the storage compartment 1200.

The ejector 1300 may be disposed on one side 1201a of the long side 1201 with respect to an extension direction of the long side 1201. When the automatic detergent dispenser 1000 is disposed at the first position 1000A, the one side 1201a of the long side 1201 may be disposed on a lower side in the third direction Z, and the other side 1201b of the long side 1201 may be disposed on an upper side.

The ejector 1300 may be disposed at a lower side of the storage compartment 1200 with respect to the third direction Z to allow a single solid detergent, which is disposed at the lowest position in the third direction Z among the plurality of solid detergents stacked in the third direction Z, to be discharged from the storage compartment 1200.

When the automatic detergent dispenser 1000 is disposed at the first position 1000A, the ejector 1300 may discharge a solid detergent, which is closest to a lower surface 1220 of the storage compartment 1200 among the plurality of solid detergents, to the outside of the storage compartment 1200.

For example, the ejector 1300 may be configured to press the solid detergent seated on the lower surface 1220 of the storage compartment 1200 among the plurality of solid detergents. That the solid detergent is seated on the lower surface 1220 means that the solid detergent is supported by the lower surface 1220 or that the solid detergent is placed in contact with the lower surface 1220. Accordingly, that the solid detergent is seated on the lower surface 1220 means that the solid detergent is placed in a position in which the solid detergent is pressed and then discharged from the storage compartment 1200 by the ejector 1300.

The storage compartment 1200 may include a storage compartment outlet 1210 provided to discharge one solid detergent to the outside of the storage compartment 1200 by the ejector 1300.

The storage compartment outlet 1210 may be arranged in a lower portion of the storage compartment 1200 to allow one solid detergent, which is disposed at the lowest position in the third direction Z among the plurality of solid detergents stacked in the third direction Z, to be discharged to the outside of the storage compartment 1200.

The storage compartment outlet 1210 and the ejector 1300 may be disposed in a lower portion/at a lower side of the storage compartment 1200 so as to discharge one solid detergent disposed at the lowest position among the plurality of solid detergents stacked in the third direction Z to the outside of the storage compartment 1200.

The storage compartment 1200 is provided to allow a plurality of solid detergents to be stacked in the third direction Z, and thus when the lowest solid detergent among the plurality of solid detergents is discharged to the outside of the storage compartment 1200, the plurality of solid detergents may be moved downward in the stacking direction by gravity.

Because all of the plurality of solid detergents is moved downward, the solid detergent, which is disposed directly above the solid detergent discharged to the outside of the storage compartment 1200, may be moved adjacent to the lower surface 1220 of the storage compartment 1200 and then disposed in a space in which the discharged solid detergent was located. The solid detergent may be discharged to the outside of the storage compartment 1200 by the ejector 1300 in the next washing process of the dishwasher 1.

That is, when the automatic detergent dispenser 1000 is disposed at the first position 1000A, the storage compartment 1200 may be provided to allow a plurality of solid detergents to be stacked in the third direction Z, and the ejector 1300 may be arranged on the lower side of the storage compartment 1200. Accordingly, the plurality of solid detergents may be discharged to the outside of the storage compartment 1200 in the stacking order from the lowest solid detergent in the third direction Z.

However, the ejector 1300 is not limited thereto, and the ejector 1300 may be configured to discharge one solid detergent, which is disposed at the highest position in the third direction Z among the plurality of solid detergents stacked in the third direction Z, from the storage compartment 1200.

As shown in FIG. 7, when a solid detergent D has a shape in which a horizontal length d1 and a vertical length d2 are greater than a height h, the solid detergent D may be loaded on the storage compartment 1200 to be stacked in the height H direction in the storage compartment 1200.

As for the solid detergent D described below, it is assumed that the horizontal length d1 is greater than the vertical length d2 and the height h.

For example, the solid detergent D may be loaded in the storage compartment 1200 in such a way that a direction formed by the smallest length among the horizontal length d1, the vertical length d2, and the height h of the solid detergent D corresponds to the stacking direction of the plurality of solid detergents.

This is to maximize the number of solid detergents D that may be loaded into the storage compartment 1200.

For example, when the automatic detergent dispenser 1000 is disposed at the first position 1000A, the solid detergent D may be loaded in the storage compartment 1200 in such a way that a surface of the solid detergent D formed in the horizontal length d1 and the vertical length d2 directions corresponds to a cross-sectional area S of the storage compartment 1200 formed in the first direction X and the second direction Y.

For example, the plurality of solid detergents D may be stacked inside the storage compartment 1200 with respect to the height h direction of the solid detergent D.

The solid detergent may have various sizes according to components, functions, or manufacturing companies of the solid detergent, but a volume of the solid detergent may be determined in proportion to the volume of the washing chamber of the dishwasher. Because the volume of the washing chamber is provided within a predetermined range, the volume of the solid detergent may also be provided within a predetermined range, and accordingly, the horizontal length, the vertical length, and the height of the solid detergent may be similarly designed regardless of the types of the solid detergent.

A solid detergent D described below may be defined as a suitable solid detergent D that may be loaded into the automatic detergent dispenser 1000 of the dishwasher 1 according to an embodiment, and the horizontal length d1, the vertical length d2, and the height h of the solid detergent D may be defined as an approximate value of a horizontal length, a vertical length, and a height of various solid detergents that may be loaded into the automatic detergent dispenser 1000 of the dishwasher 1. Further, the horizontal length d1, the vertical length d2, and the height h of the solid detergent D may be defined as a changeable value within a predetermined range. For example, the horizontal length d1 and the vertical length d2 may be defined based on dimensions provided in the first direction X and the second direction Y, and the horizontal length may also be defined as d2, and the vertical length may also be defined as d1.

An area S of the storage compartment 1200 in the first direction X and the second direction Y in a state in which the automatic detergent dispenser 1000 is disposed at the first position A (hereinafter it is referred to as a cross-sectional area of the storage compartment 1200) may be provided as a size in which the solid detergent D is easily loaded and stacked in the third direction Z.

The cross-sectional area S of the storage compartment 1200 may be formed by a pair of sides having a horizontal length L1 extending in the second direction Y and a pair of sides having a vertical length L2 extending in the first direction X when the automatic detergent dispenser 1000 is disposed at the first position A. For example, the horizontal length L1 and the vertical length L2 may be defined based on the dimensions provided in the first direction X and the second direction Y, and the horizontal length may also be defined as L2, and the vertical length may also be defined as L1.

The horizontal length L1 of the cross-sectional area S of the storage compartment 1200 may be a length in the second direction Y between a right surface 1230 and a left surface 1240 of the storage compartment 1200 and the vertical length L2 of the cross-sectional area S of the storage compartment 1200 may be a length in the first direction X between an inner surface 1260 and the storage compartment opening 1121 of the storage compartment 1200.

When the solid detergent D is loaded into the storage compartment 1200, the solid detergent D may be arranged to allow one side having the horizontal length d1 of the solid detergent D to correspond to a side having the horizontal length L1 of the cross-sectional area S of the storage compartment 1200, and to allow the other side having the vertical length d2 of the solid detergent D to correspond to a side having the vertical length L2 of the cross-sectional area S of the storage compartment 1200.

As described above, because the vertical length d2 of the solid detergent D is formed to be less than the horizontal length d1, the horizontal length L1 of the cross-sectional area S may be formed to be greater than the vertical length L2. Further, because the horizontal length d1 of the solid detergent is formed to be greater than the length of the height h of the solid detergent D, the vertical length L2 of the cross-sectional area S may be formed to be greater than the height h of the solid detergent D.

The horizontal length L1 of the cross-sectional area S may be greater than the horizontal length d1 of the solid detergent D by approximately 10% to 30% of the horizontal length d1 of the solid detergent D.

The vertical length L2 of the cross-sectional area S may be greater than the vertical length d2 of the solid detergent D by approximately 10% to 30% of the vertical length d2 of the solid detergent D.

In order to allow the plurality of solid detergents to stably descend inside the storage compartment 1200 while maintaining a stacked arrangement when the solid detergent disposed at the lowest position in the third direction Z is moved out of the storage compartment 1200 by the ejector 1300, the cross-sectional area S of the storage compartment 1200 may be formed to have the above-mentioned value.

When the horizontal and vertical lengths L1 and L2 of the cross-sectional area S are formed to be greater than the horizontal and vertical lengths d1 and d2 of the solid detergent D by a length that is less than 10% of the horizontal and vertical lengths d1 and d2 of the solid detergent D, a plurality of solid detergents may be stuck inside the storage compartment 1200 while being moved downward inside the storage compartment 1200. Accordingly, it is difficult for the plurality of solid detergents to be stably moved downward.

For example, when the solid detergent disposed at the lowest position in the third direction Z among the plurality of stacked solid detergents is moved downward, the solid detergent may be stuck on the inside of the storage compartment 1200 without being seated on the lower surface 1220 of the storage compartment 1200. Accordingly, even when the ejector 1300 is driven, a pressing member 1312a, which will be described later, may not easily press the solid detergent disposed at the lowest position in the third direction Z, and thus the solid detergent may not be discharged from the storage compartment 1200.

When the horizontal and vertical lengths L1 and L2 of the cross-sectional area S are formed to be greater than the horizontal and vertical lengths d1 and d2 of the solid detergent D by a length that is more than 30% of the horizontal and vertical lengths d1 and d2 of the solid detergent D, the detergents may be rotated while being moved downward in the storage compartment 1200, and thus the stacked arrangement of the detergents may be broken.

For example, as the cross-sectional area S is formed to be greater than the solid detergent, the solid detergent may be rotated or moved in an oblique direction with respect to the third direction Z when being moved downward, and thus the solid detergent may be moved in the first direction X and the second direction Y without being moved in the third direction. Accordingly, the stacked arrangement of the plurality of solid detergents may not be maintained.

Therefore, the horizontal and vertical lengths L1 and L2 of the cross-sectional area S may be formed to be greater than the horizontal and vertical lengths d1 and d2 of the solid detergent D by approximately 10% to 30% of the horizontal and vertical lengths d1 and d2 of the solid detergent D.

For example, the horizontal length L1 of the cross-sectional area S may be 40 mm to 50 mm.

For example, the vertical length L2 of the cross-sectional area S may be 30 mm to 40 mm.

For example, the horizontal length L1 of the cross-sectional area S may be provided such that the difference between the horizontal length L1 of the cross-sectional area S and the horizontal length d1 of the solid detergent D is 5 mm to 15 mm.

For example, the vertical length L2 of the cross-sectional area S may be provided such that the difference between the vertical length L2 of the cross-sectional area S and the vertical length d2 of the solid detergent D is 5 mm to 15 mm.

Because the vertical length L2 of the cross-sectional area S of the storage compartment 1200 is formed to be greater than the vertical length d2 of the solid detergent D, the automatic detergent dispenser 1000 may have a predetermined thickness in the direction in which the vertical length L2 extends.

Accordingly, when the door 20 is disposed at the first position 20A, the automatic detergent dispenser 1000 may protrude from the door 20 toward the inside of the tub 12 in the first direction X and thus the inner space of the tub 12 may be reduced.

Particularly, as for the lower basket 51 disposed at a height substantially corresponding to the automatic detergent dispenser 1000 in the third direction Z, when the door 20 is disposed at the first position 20A, the lower basket 51 may collide with the automatic detergent dispenser 1000 with respect to the first direction X. To prevent this, the automatic detergent dispenser 1000 may be arranged to be spaced apart from the lower basket 51 in the first direction X when the automatic detergent dispenser 1000 is disposed at the first position 1000A. For example, when the automatic detergent dispenser 1000 is disposed at the first position 1000A, the automatic detergent dispenser 1000 may be arranged to be spaced apart from the intermediate basket 52 with respect to the first direction X.

In addition, the door 20 is disposed at the second position 20B, and accordingly, the lower basket 51 may be withdrawn toward the front of the tub 12 in the first direction X. When the lower basket 51 is withdrawn forward, the withdrawal of the lower basket 51 may be limited by the thickness of the automatic detergent dispenser 100 because the automatic detergent dispenser 1000 has a predetermined thickness in the extension direction of the vertical length L2.

The automatic detergent dispenser 1000 may be provided to be coupled to the inner surface 21 of the door 20. When the automatic detergent dispenser 1000 is coupled to the inner surface 21, at least a portion of the automatic detergent dispenser 1000 may be inserted into the inside of the door 20 in the first direction X.

Accordingly, when the automatic detergent dispenser 1000 is disposed at the first position 1000A, a predetermined separation distance between the automatic detergent dispenser 1000 and the lower basket 51 may be easily generated in the first direction X.

Accordingly, when the automatic detergent dispenser 1000 is disposed at the second position 1000B, the protrusion of the automatic detergent dispenser 1000 may be minimized in the third direction Z, and thus the lower basket 51 may be easily withdrawn in the first direction X without limitation of the automatic detergent dispenser 1000.

For example, the automatic detergent dispenser 1000 may be coupled to the inner surface 21 of the door 20 in such a way that, when the automatic detergent dispenser 1000 is disposed at the second position 1000B, the upper end of the automatic detergent dispenser 1000 in the third direction Z is positioned lower than the lower end of the lower basket 51 in the third direction Z. Accordingly, when the lower basket 51 slides out of the tub 12 and is withdrawn while the automatic detergent dispenser 1000 is disposed at the second position 1000B, the lower basket 51 may be withdrawn from the tub 12 without colliding with the automatic detergent dispenser 1000.

The ejector 1300 may include a pressing member 1310 configured to press and move one solid detergent, which is disposed at the lowest position in the third direction Z among the plurality of solid detergents stacked in the third direction Z, to the outside of the storage compartment 1200.

The pressing member 1310 may include a cam member configured to be rotated so as to press the solid detergent. Hereinafter the pressing member 1310 will be referred to as a cam member 1310.

The cam member 1310 may include a pressing portion 1312a provided to protrude from a rim of the cam member 1310 and configured to press the solid detergent while being rotated by the rotation of the cam member 1310.

The pressing portion 1312a may be rotated according to the rotation of the cam member 1310 and moved into the storage compartment 1200, and configured to press one solid detergent, which is disposed at the lowest position in the third direction Z among the plurality of solid detergents stacked in the third direction Z, so as to be moved to the storage compartment outlet 1210. The cam member 1310 may move the solid detergent by pressing the solid detergent toward the direction of rotation of the cam member 1310.

For convenience of description, the rotational direction and the left and right sides of the cam member 1310 will be described based on the state shown in FIG. 8. The right side in FIG. 8 may be a direction corresponding to the left side in FIG. 1, and the left side in FIG. 8 may be a direction corresponding to the right side in FIG. 1. Accordingly, the left and right sides in FIG. 1 may be opposite to the left and right sides in FIG. 8 with respect to the second direction Y. However, for convenience of description, it will be described based on the left and right sides shown in FIG. 8.

In addition, the cam member 1310 to be described below will be described as an example of the cam member 1310 of the ejector 1300 disposed on the left side of the second direction Y shown in FIG. 8.

The ejector 1300 may be disposed at a lower side of the storage compartment 1200, and thus when a rotational direction of the cam member 1310 is a clockwise direction, the cam member 1310 may move a solid detergent, which is seated on the lower surface 1220 of the storage compartment 1200, to the right side while the cam member 1310 rotates clockwise.

In order to discharge the solid detergent, which is moved to the right side, to the outside of the storage compartment 1200, the storage compartment outlet 1210 may be disposed in a lower portion of the right surface 1230 of the storage compartment 1200.

The storage compartment 1200 may include a penetration member 1221 formed on the lower surface 1220 of the storage compartment 1200 and provided to allow the pressing portion 1312a to be moved from the outside of the storage compartment 1200 to the inside of the storage compartment 1200.

The penetration member 1221 may be provided to extend not only to the lower surface 1220 of the storage compartment 1200 but also to the lower side of the right surface 1230 and the left surface 1240 of the storage compartment 1200.

The pressing portion 1312a may be rotated by the rotation of the cam member 1310 and moved into the storage compartment 1200 through the lower side of the left surface 1240 and the penetration member 1221 of the lower surface 1220, and then moved to the outside of the storage compartment 1200 through the lower side of the right surface 1230 and the penetration member 1221 of the lower surface 1220 according to the rotation of the cam member 1310.

The pressing portion 1312a may be provided to be rotated while pressing the solid detergent seated on the lower surface 1220, so as to allow the solid detergent to be moved to the right side.

The penetration member 1221 may be provided in such a way that at least a portion of the lower surface 1220 is opened, as illustrated in FIG. 7. As at least a portion of the lower surface 1220 is opened, the cam member 1310 disposed at a lower side of the storage compartment 1200 may be rotated and the pressing portion 1312a may be moved into the storage compartment 1200 through the penetration member 1221.

The penetration member 1221 may be provided in such a way that not all but at least a portion of the lower surface 1220 is opened For example, an area of a portion, in which the penetration member 1221 is formed, in the lower surface 1220 may be less than an area of a portion, which is closed in the third direction Z, in the lower surface 1220. Hereinafter the lower surface 1222 closed in the third direction Z is referred to as a support surface 1222. This is because the support surface 1222 supports the solid detergent located at the lowest position in the third direction Z.

For example, the penetration member 1221 may be provided to extend from the center of the lower surface 1220 with respect to the first direction X to the second direction Y. Accordingly, the front and rear sides of the penetration member 1221 with respect to the first direction X may be provided as the support surface 1222.

This is to stably position the solid detergent located at the lowest position in the third direction Z on the lower surface 1220 when the plurality of solid detergents is stacked. The support surface 1222 may support the solid detergent located at the lowest position in the third direction Z to allow the solid detergent to be disposed adjacent to the lower surface 1220, and thus the pressing portion 1312a may easily press the solid detergent while being moved through the penetration member 1221.

Particularly, the support surface 1222 may be formed in the front and rear of the penetration member 1221 in the first direction X, and the support surface 1222 may allow one solid detergent, which is disposed at the lowest position in the third direction Z, to be supported by the storage compartment 1200 horizontally in the third direction Z.

Accordingly, when the solid detergent is moved to the outside of the storage compartment 1200 by the pressing portion 1312a, the solid detergent may be moved in the second direction Y in a substantially horizontal state with respect to the third direction Z.

For example, the support surface 1222 may guide the solid detergent, which is moved in the second direction Y, to be moved in a horizontal state with respect to the third direction Z. Based on FIG. 7, the solid detergent D may be loaded into the storage compartment 1200 in a state in which a lower surface (us) of the solid detergent D in the third direction Z is in contact with the support surface 1222. When the solid detergent D is pressed toward the second direction Y by the pressing portion 1312a, the lower surface (us) of the solid detergent D may be guided by the support surface 1222 and then moved to the storage compartment outlet 1210 while the solid detergent D is maintained in a substantially horizontal state with respect to the third direction Z.

When the solid detergent is moved in the second direction Y while being inclined with respect to the third direction Z, the solid detergent may be rotated, or moved to another direction without being moved to the second direction Y by the center of gravity. Accordingly, the solid detergent may not be moved toward the storage compartment outlet 1210 and may not be discharged to the outside of the storage compartment 1200.

As for the cam member 1310, the rim of the cam member 1310 with respect to a rotational direction of the cam member 1310 may include a plurality of cam regions that is partitioned in the rotational direction of the cam member 1310. When a cam region, in which a rim having a shortest radius from a rotating axis 1313 of the cam member 1310 is disposed, among the plurality of cam regions is defined as a first cam region 1310A1, the first cam region 1310A1 may be disposed on an upper end of the cam member 1310 when the dishwasher 1 does not perform the washing process.

The pressing portion 1312a may protrude to a predetermined height in a radial direction of the cam member 1310 with respect to the first cam region 1310A1.

The pressing portion 1312a may protrude to a predetermined height in the radial direction of the cam member 1310 with respect to the first cam region 1310A1, so as to allow a pressing force, which is capable of transferring the solid detergent D to the storage compartment outlet 1210, to be transferred to the solid detergent D.

The pressing portion 1312a may protrude to a predetermined height in the radial direction of the cam member 1310 with respect to the first cam region 1310A1, and thus when the cam member 1310 is rotated, the pressing portion 1312a may press the solid detergent D, which is disposed at the lowest position in the third direction Z without pressing a solid detergent disposed above the solid detergent D at the lowest position.

For example, the pressing portion 1312a may protrude by 15 mm in the radial direction of the cam member 1310 with respect to the first cam region 1310A1.

When the first cam region 1310A1 of the cam member 1310 is disposed on the upper end of the cam member 1310, the first cam region 1310A1 may be disposed at a lower position than the support surface 1222 in the third direction Z. This is to that, when the solid detergent located at the lowest position among the plurality of solid detergents is disposed on the lower surface 1220 of the storage compartment 1200, the solid detergent is located in the storage compartment 1200 in a substantially horizontal state with respect to the third direction Z while preventing one side of the solid detergent from being pressed upward with respect to the third direction Z by the cam member 1310.

A cam member 1310' of an ejector 1300' disposed on the right side with respect to the second direction Y shown in FIG. 8 may be configured to be rotatable counterclockwise with respect to the direction shown in FIG. 8. Accordingly, the solid detergent loaded in the storage compartment 1200' disposed on the right side may be provided to be discharged to the left side of the storage compartment 1200'. This will be described later in detail.

The rotating axis 1313 of the cam member 1310 may be provided to extend in the first direction X when the automatic detergent dispenser 1000 is disposed at the first position 1000A. The cam member 1310 may be disposed in such a way that the radial direction of the cam member 1310 is disposed in a direction perpendicular to the first direction X, and accordingly, when the cam member 1310 is disposed inside the housing 1100, a volume of the cam member 1310 may be minimized in the first direction X. As described above, this is to maximize the volume of the washing chamber C in the first direction X.

The ejector 1300 may include the driving motor 1320 configured to generate a rotational force to drive the cam member 1310. The driving motor 1320 may be arranged in such a way that a rotating shaft 1321 of the driving motor 1320 extends in a direction substantially perpendicular to the first direction X when the automatic detergent dispenser 1000 is disposed at the first position 1000A. Accordingly, when the driving motor 1320 is disposed inside the housing 1100, a volume of the driving motor 1320 in the first direction X may be minimized. As described above, this is to maximize the volume of the washing chamber C in the first direction X.

The ejector 1300 may include the transmission member 1330 configured to transmit a rotational force generated by the driving motor 1320 to the pressing member 1310.

The transmission member 1330 may include a plurality of gears. Because the rotating axis 1313 of the cam member 1310 is arranged to extend in the first direction X and the rotating shaft 1321 of the driving motor 1320 is arranged to extend in a direction perpendicular to the first direction X, the transmission member 1330 may include a worm gear configured to vertically change a transmission direction of the driving force. For example, the transmission member 1330 may include a bevel gear.

When the transmission member 1330 includes a worm gear, it is possible to prevent the cam member 1310 from being arbitrarily rotated by an external force.

The worm gear of the transmission member 1330 is arranged to extend in a direction perpendicular to the first direction X in which the rotating axis 1313 of the cam member 1310 extends, and thus when the transmission member 1330 is arranged in the housing 1100, a volume of the transmission member 1330 in the first direction X may be minimized. As described above, this is to maximize the volume of the washing chamber C in the first direction X.

The transmission member 1330 may connect the cam member 1310 and the driving motor 1320 to transfer the rotational force generated by the driving motor 1320 to the cam member 1310, and at this time, the transmission member 1330 may be configured to allow the cam member 1310 to be rotated with an appropriate rotational speed. For example, the transmission member 1330 may be configured to reduce the rotational speed of the rotating shaft 1321 of the driving motor 1320. The transmission member 1330 may be configured in various ways according to design factors such as a target rotational speed of the cam member 1310 and a rotational speed of the driving motor 1320.

The automatic detergent dispenser 1000 may include a holder 1500 provided to allow the plurality of solid detergents to be maintained in the stacked state inside the storage compartment 1200 when the automatic detergent dispenser 1000 is disposed at the first position 1000A and the second position 1000B or during the automatic detergent dispenser 1000 is moved between the first position 1000A and the second position 1000B.

The holder 1500 may be moved in a direction, in which the long side 1201 of the storage compartment 1200 extends, by guides formed on both side surfaces 1230 and 1240 of the storage compartment 1200.

In the storage compartment 1200, the holder 1500 may be provided to be movable toward the plurality of solid detergents in a direction in which the plurality of solid detergents is stacked. This is because the direction, in which the plurality of solid detergents is stacked, corresponds to the direction in which the long side 1201 of the storage compartment 1200 extends.

The holder 1500 may be disposed above the plurality of solid detergents in the storage compartment 1200 when the automatic detergent dispenser 1000 is disposed at the first position 1000A.

The holder 1500 may be movable from the upper side to the lower side of the storage compartment 1200 when the automatic detergent dispenser 1000 is disposed at the first position 1000A. The holder 1500 may be moved downward inside the storage compartment 1200 by gravity when the automatic detergent dispenser 1000 is disposed at the first position 1000A.

When the automatic detergent dispenser 1000 is disposed at the first position 1000A, the stacking direction of the plurality of solid detergents may correspond to the third direction Z, and the holder 1500 may be moved in the third direction Z by gravity. Accordingly, the holder 1500 may be provided to press the solid detergent, which is disposed at the highest position in the third direction Z among the plurality of solid detergents, downward.

The holder 1500 may include a weight member having a weight greater than a predetermined weight so as to be moved in the third direction Z by gravity. For example, the weight member may be integrally provided with the holder 1500. Alternatively, the weight member may be provided to be coupled to the holder 1500.

For example, the holder 1500 may be formed of a heavy material so as to have a weight greater than a predetermined weight.

The holder 1500 may be provided to have a weight greater than or equal to a predetermined weight and may be provided to press the plurality of solid detergents downward with respect to the third direction Z.

When the solid detergent, which is located at the lowest position in the third direction Z among the plurality of solid detergents, is discharged to the outside of the storage compartment 1200 by the ejector 1300, the plurality of solid detergents may be moved downward by gravity in the third direction Z corresponding to the stacking direction. The holder 1500 may press the plurality of solid detergents downward by gravity, and the holder 1500 may guide the downward movement of the plurality of solid detergents.

For example, when one of the plurality of solid detergents stacked in the third direction Z is separated from the arrangement and accordingly, some of the solid detergent is supported on both side surfaces 1230 and 1240 of the storage compartment 1200, the downward movement of the plurality of solid detergents may be limited. In this case, the holder 1500 may guide the downward movement of the plurality of solid detergents by pressing the plurality of solid detergents downward.

As described above, the automatic detergent dispenser 1000 may be provided to allow a plurality of solid detergents to be stacked in the third direction Z when the automatic detergent dispenser 1000 is disposed at the first position 1000A, and thus it is possible to increase the space efficiency of the automatic detergent dispenser 1000 and the dishwasher 1 in the first direction X and the second direction Y.

In addition, the automatic detergent dispenser 1000 may be provided to allow the plurality of solid detergents to be easily and sequentially discharged from the bottom in the direction of gravity as the plurality of solid detergents is disposed in the direction of gravity.

However, when the door 20 is rotated from the first position 20A to the second position 20B to open the tub 12 or disposed at the second position 20B, the direction in which the plurality of solid detergents is stacked may be arranged to be directed to a direction different from the third direction Z.

At this time, because the stacking direction of the plurality of solid detergents is directed to a direction different from the direction of gravity, one of the plurality of solid detergents may be separated from the stacked structure and the stacked arrangement of the plurality of solid detergents in the third direction Z may be broken.

For example, as described above, the solid detergent D may be loaded into the storage compartment 1200 in such a way that one surface of the solid detergent D, which is formed in the horizontal length d1 and vertical length d2 directions, to face the cross-sectional area S of the storage compartment 1200 formed in the first direction X and the second direction Y.

For example, the surface of the solid detergent D formed in the horizontal length d1 and vertical length d2 directions may be provided in a curved surface rather than a flat surface. Accordingly, when the plurality of solid detergents D is stacked, the plurality of solid detergents, which face to each other in the stacking direction, may be arranged to allow curved faces thereof to face each other, and thus when the stacking direction of the plurality of solid detergents is directed to a direction different from the direction of gravity, the plurality of solid detergents may be separated from the stacked arrangement.

That is, when the plurality of solid detergents D is stacked to allow the curved surface thereof to face each other, it is more difficult to maintain the stacked state. Accordingly, when the stacking direction corresponds to the gravity direction, the holder 1500 may press the plurality of solid detergents D to the stacking direction, and when the stacking direction is different from the gravity direction, the holder 1500 may support the plurality of solid detergents D so as to maintain the arrangement of the plurality of solid detergents D.

Even when the door 20 is disposed at the first position 20A again in a state in which the stacked arrangement of the plurality of solid detergents is broken, the movement of the plurality of solid detergents in the direction of gravity may be restricted. Further, the solid detergent, which is disposed at the lowest position in the third direction Z among the plurality of solid detergents, may be abnormally seated on the lower surface 1220 of the storage compartment 1200, and thus the solid detergent may not be discharged to the outside of the storage compartment 1200 by the ejector 1300.

That the solid detergent is abnormally seated on the lower surface 1220 means a state in which, when the solid detergent is placed on the lower surface 1220, the ejector 1300 fails to press the solid detergent or means that the solid detergent is placed at a position in which the solid detergent is prevented from being discharged to the outside of the storage compartment 1200 even when the solid detergent is pressed by the ejector 1300.

To prevent this, the holder 1500 may prevent the stacked arrangement of the plurality of solid detergents from being broken when the stacking direction of the plurality of solid detergents is directed to a direction different from the third direction Z due to the movement of the door 20.

The holder 1500 may be provided to maintain the stacked arrangement of the plurality of solid detergents while the door 20 is moved from the first position 20A to the second position 20B, or even when the door 20 is disposed at the second position 20B.

When the stacking direction of the plurality of solid detergents is directed to a direction different from the third direction Z, the holder 1500 may be provided to support the solid detergent disposed at the highest position in the third direction Z among the plurality of solid detergents.

When the stacking direction of the plurality of solid detergents is directed to a direction different from the third direction Z, the holder 1500 may be provided to be fixed at a position adjacent to the solid detergent disposed at the highest position in the third direction Z among the plurality of solid detergents.

When the stacking direction of the plurality of solid detergents is directed to a direction different from the third direction Z, the movement of the solid detergent, which is disposed at the highest position in the third direction Z among the plurality of solid detergents, may be blocked by the temporarily fixed holder 1500, and thus it is possible to prevent the solid detergent, which is disposed at the highest position in the third direction Z among the plurality of solid detergents, from being separated from the stacked arrangement.

The storage compartment 1200 may include a guide rail 1290 provided to guide the movement of the holder 1500 inside the storage compartment 1200.

The holder 1500 may be guided by the guide rail 1290 and translated in the extension direction of the long side 1201 of the storage compartment 1200.

The guide rail 1290 may be provided to allow the holder 1500 to be moved downward in the third direction Z when the automatic detergent dispenser 1000 is disposed at the first position 1000A.

For example, the holder 1500 may include a guide protrusion inserted into the guide rail 1290. The guide protrusion of the holder 1500 may be inserted into the guide rail 1290 and moved along the extension direction of the guide rail 1290.

The guide rail 1290 may be provided to extend in the extension direction of the long side 1201 of the storage compartment 1200. The holder 1500 may be configured to be moved along the extension direction of the guide rail 1290.

The guide rail 1290 may include a stopper 1293 provided to limit the movement of the holder 1500 when the automatic detergent dispenser 1000 is not positioned at the first position 1000A.

While the door 20 is moved from the first position 20A to the second position 20B, the movement of the holder 1500 may be limited in the storage compartment 1200 as the movement of the guide protrusion of the holder 1500 is limited by the stopper 1293.

Alternatively, the holder 1500 may be provided to maintain the stacked arrangement of the plurality of solid detergents even when the door 20 is disposed at the second position 20B.

When the stacking direction of the plurality of solid detergents is directed to a direction different from the third direction Z, the holder 1500 may be provided to support the solid detergent disposed at the highest position in the third direction Z among the plurality of solid detergents.

When the stacking direction of the plurality of solid detergents is directed to a direction different from the third direction Z, the holder 1500 may be provided to be fixed to a position adjacent to the solid detergent disposed at the highest position in the third direction Z among the plurality of solid detergents.

Accordingly, when the stacking direction of the plurality of solid detergents is directed to a direction different from the third direction Z, the holder 1500 may be temporarily fixed to the inside of the storage compartment 1200 by the stopper 1293, and the movement of the solid detergent, which is disposed at the highest position in the third direction Z among the plurality of solid detergents, may be limited by the fixed holder 1500.

Even when the stacking direction of the plurality of solid detergents is directed to a direction different from the third direction Z, the stacked arrangement of the plurality of solid detergents may be maintained by the holder 1500. Accordingly, even when the plurality of solid detergents is stacked in the third direction Z in the state in which the automatic detergent dispenser 1000 is disposed at the first position 1000A, the automatic detergent dispenser 1000 may be configured to allow one of the plurality of solid detergents to be discharged to the outside of the storage compartment 1200 and then input to the tub 12.

The automatic detergent dispenser 1000 may include the seating member 1400 provided to seat one solid detergent discharged from the storage compartment 1200.

The seating member 1400 may be provided to communicate with the storage compartment outlet 1210. The seating member 1400 may include a seating member inner space 1401 provided to communicate with the storage compartment outlet 1210.

One of the plurality of solid detergents may be discharged from the storage compartment 1200 through the storage compartment outlet 1210 and moved to the seating member inner space 1401.

The seating member may include a discharge guide 1430 connected to the tub 12. The discharge guide 1430 may be provided as a space connected to the seating member inner space 1401.

For example, the seating member inner space 1401 and the discharge guide 1430 may be formed as one space, and the seating member inner space 1401 and the discharge guide 1430 may be partitioned by a seating member opening 1420 that is opened or closed by a seating member door 1410 described later.

For example, a lower end of the seating member inner space 1401 in the third direction Z may be formed as the seating member opening 1420, and the discharge guide 1430 may be a region that is formed from the seating member opening 1420 to the lower side with respect to the third direction Z.

The seating member 1400 may be provided to allow one solid detergent, which is moved to the seating member inner space 1401, to be temporarily seated on the seating member 1400 and then to be input into the tub 12.

The seating member 1400 may include the seating member opening 1420 that is connected to the discharge guide 1430 through which the seating member inner space 1401 is connected to the tub 12. The seating member opening 1420 may be provided to open toward the third direction Z when the automatic detergent dispenser 1000 is disposed at the first position 1000A.

The seating member 1400 may include the seating member door 1410 configured to open and close the seating member opening 1420. When the seating member door 1410 closes the seating member opening 1420, the seating member door 1410 may be provided to form a lower surface of the seating member inner space 1401.

The seating member door 1410 may include a seating surface 1411 on which the solid detergent is seated when the seating member door 1410 closes the seating member opening 1420. The seating surface 1411 may be disposed to face upward in the third direction Z when the seating member door 1410 closes the seating member opening 1420.

For example, the seating member opening 1420 may be defined as a surface closed by the seating member door 1410 in the seating member inner space 1401. Accordingly, a region formed above the upper surface of the seating member opening 1420 may be defined as the seating member inner space 1401, and a region formed below the lower surface of the seating member opening 1420 may be defined as the discharge guide 1430. When the seating member door 1410 closes the seating member opening 1420, the seating surface 1411 may be disposed on the seating member opening 1420, and accordingly, the seating surface 1411 may be defined as the lower surface of the seating member inner space 1401.

For example, the lower surface of the seating member inner space 1401 may be defined as the seating member opening 1420, but when the seating member door 1410 closes the seating member opening 1420, the lower surface of the seating member inner space 1401 may be defined as the seating member door 1410.

The seating member door 1410 may be provided to seal the seating member inner space 1401 from the outside when the seating member door 1410 closes the seating member opening 1420. Further, the seating member door 1410 may connect the seating member inner space 1401 and the tub 12 when the seating member door 1410 opens the seating member opening 1420.

The seating member 1400 may include a seating member door driver 1470 configured to open and close the seating member door 1410.

For example, the seating member door driver 1470 may include a driving motor and a transmission member.

For example, the transmission member of the seating member door driver 1470 may include a plurality of gears. For example, when the driving motor is rotated in one direction, the plurality of gears may transmit a rotational force in one direction to the seating member door 1410. The seating member door 1410 may be rotated in one direction by the received rotational force, so as to open the seating member opening 1420 in a state in which the seating member door 1410 closes the seating member opening 1420.

For example, when the driving motor is rotated in the opposite direction, the plurality of gears may transmit the rotational force in the opposite direction to the seating member door 1410. The seating member door 1410 may be rotated in the opposite direction by the received rotational force, so as to close the seating member opening 1420 in a state in which the seating member door 1410 opens the seating member opening 1420.

The seating member opening 1420 may communicate with the inlet 1122 by the discharge guide 1430. One solid detergent located in the seating member inner space 1401 may be discharged from the seating member inner space 1401 through the seating member opening 1420, and then discharged from the seating member opening 1420 to the outside of the automatic detergent dispenser 1000 through the inlet 1122. Accordingly, the solid detergent may be input to the tub 12.

The seating member 1400 may include the discharge guide 1430 formed between the seating member opening 1420 and the inlet 1122 and provided to guide the movement in which the solid detergent is moved from the seating member opening 1420 to the inlet 1122.

One solid detergent discharged from the storage compartment 1200 may be temporarily seated on the seating member 1400, and particularly, the solid detergent may be located on the seating surface 1411 of the seating member door 1410 forming the lower surface of the seating member inner space 1401.

The inlet 1122 may be opened and closed by the inlet cover 1150. The inlet cover 1150 may open the inlet 1122 while the solid detergent discharged along the discharge guide 1430 presses the inlet cover 1150.

The solid detergent may pass through the inlet 1122 while pressing the inlet cover 1150, and then move to the tub 12.

When the seating member door 1410 opens the seating member opening 1420, the solid detergent placed on the seating member door 1410 may be moved downward by gravity, and then discharged to the outside of the seating member inner space 1401 through the seating member opening 1420.

The automatic detergent dispenser 1000 may be configured to allow one solid detergent, which is discharged from the storage compartment 1200, to be moved to the outside of the storage compartment 1200 through the seating member 1400 without being immediately discharged to the outside of the automatic detergent dispenser 1000.

The storage compartment 1200 may include an intermediate door 1250 configured to open and close the storage compartment outlet 1210. The intermediate door 1250 may be configured to prevent a solid detergent, which is loaded into the storage compartment 1200, from being moved to the seating member 1400 by an external force without being discharged from the storage compartment 1200 by the ejector 1300.

The intermediate door 1250 may be biased in a direction to close the storage compartment outlet 1210. The intermediate door 1250 may include an elastic member 1251, and the intermediate door 1250 may be biased toward the storage compartment outlet 1210 by the elastic member 1251 to allow the intermediate door 1250 to close the storage compartment outlet 1210.

The solid detergent, which is pressed by the ejector 1300 and moved to the storage compartment outlet 1210 among the plurality of solid detergents loaded into the storage compartment 1200, may open the intermediate door 1250 by pressing the intermediate door 1250. As the intermediate door 1250 is opened, the solid detergent may be moved to the seating member 1400 through the storage compartment outlet 1210.

Even when the solid detergent is moved toward the storage compartment outlet 1210 by an external force, not by the pressing of the ejector 1300, the solid detergent may be blocked by the intermediate door 1250 and thus the solid detergent may not pass through the storage compartment outlet 1210 and may not be discharged from the storage compartment 1200.

When the solid detergent is moved by the pressing portion 1312a and collides with the intermediate door 1250, the ejector 1300 may press the solid detergent to allow the biased intermediate door 1250 to be opened by the pressing of the solid detergent.

A force by which the intermediate door 1250 closes the storage compartment outlet 1210 by the elastic member 1251 may be set to be less than a force by which the solid detergent presses the door 1250 by the pressing of the ejector 1300.

As the seating member 1400 is formed between the storage compartment opening 1121 and the tub 12, the storage compartment outlet 1210 may be connected to the tub 12 through the seating member 1400 without being directly connected to the tub 12.

When the storage compartment outlet 1210 is directly connected to the tub 12, the water remaining in the tub 12 may flow into the storage compartment 1200 through the storage compartment outlet 1210, and thus the plurality of solid detergents loaded inside the storage compartment 1200 may be damaged or deformed by the water.

In order to prevent this, the storage compartment outlet 1210 may be provided to be bypassed to the tub 12 through the seating member 1400 without being directly connected to the tub 12.

When it is required to input the solid detergent to the tub 12, the seating member 1400 may open the seating member opening 1420 to allow the seating member inner space 1401 to communicate with the tub 12. The seating member door 1410 may close the seating member opening 1420 at a stage when the solid detergent is not input into the tub 12, so as to minimize a flow of water, which remains in the tub 12, into the seating member inner space 1401.

The seating member 1400 may include a seating member sensor 1440 configured to detect whether a solid detergent is seated on the seating member 1400.

Because the storage compartment 1200 is provided to communicate with the seating member 1400, it is inevitable that whether the solid detergent discharged from the storage compartment 1200 is seated on the seating member 1400 is detected by the seating member sensor 1440.

The seating member sensor 1440 may be provided as a position sensor. For example, the seating member sensor 1440 may include an optical sensor.

The seating member sensor 1440 may detect whether or not the solid detergent is located in the seating member 1400, and the control device 1900 (refer to FIG. 5) of the dishwasher 1 may control the automatic detergent dispenser 1000 based on a value detected by the seating member sensor 1440.

The control device 1900 may receive information related to whether the solid detergent is loaded in the storage compartment 1200, whether the soiled detergent is seated on the seating member 1400 after the ejector 1300 is driven in a state in which the solid detergent is loaded in the storage compartment 1200, and whether the solid detergent is discharged from the seating member 1400 after the solid detergent is seated on the seating member 1400, and control the automatic detergent dispenser 1000 based on the received information.

The control device 1900 may be configured to communicate with the main control device of the dishwasher 1 and configured to allow the controller to control the dishwasher 1 based on the received information.

For example, the control device 1900 and the main control device may be subordinate components of the controller, and both the dishwasher 1 and the automatic detergent dispenser 1000 may be controlled by the controller. However, in the following description, it is assumed that the automatic detergent dispenser 1000 is controlled by the control device 1900 only for the control of the automatic detergent dispenser 1000.

For example, when the seating member sensor 1440 fails to detect the solid detergent after the ejector 1300 is driven, the control device 1900 may determine that the solid detergent is not discharged from the storage compartment 1200 because the solid detergent is not loaded into the storage compartment 1200, or determine that the solid detergent is not discharged from the storage compartment 1200 due to a malfunction of the ejector 1300 even when the solid detergent is loaded into the storage compartment 1200. Based on the determination, the control device 1900 may control the automatic detergent dispenser 1000.

For example, the control device 1900 may allow the ejector 1300 to be driven again to move the solid detergent to the seating member 1400. In addition, the control device 1900 may communicate with the main control device, and the controller may control the dishwasher 1 not to perform the washing process of the dishwasher 1 based on a communication value.

For example, when the seating member sensor 1440 continuously fails to detect the solid detergent after the control device 1900 controls the ejector 1300 to be driven again, the control device 1900 may communicate with the main control device, and the controller may control the dishwasher 1 not to perform the washing process of the dishwasher 1 based on a communication value. Further, the controller may control a display to inform a user that there is no solid detergent in the storage compartment 1200.

For example, the display may be implemented as a display positioned on the main body 10 of the dishwasher 1. For example, the display may be implemented in a separate device configured to communicate with the dishwasher 1.

For example, when the seating member sensor 1440 fails to detect the solid detergent after the detection state is maintained since the seating member sensor 1440 detects the solid detergent in the seating member, the control device 1900 may determine that the solid detergent is discharged from the seating member 1400 and then input to the tub 12, and the control device 1900 may control the automatic detergent dispenser 1000 based on the determination. For example, the control device 1900 may communicate with the main control device, and the controller may control the dishwasher 1 to perform the washing process of the dishwasher 1 based on the communication value.

As the seating member sensor 1440 senses the position of the solid detergent in the seating member 1400, the control device 1900 may be configured to identify all of the above situations, and thus it is possible to minimize the number of additional sensors configured to detect a position of a solid detergent. That is, even when a position sensor, which is configured to additionally detect a position of the solid detergent, is not placed to the storage compartment 1200 or the discharge guide 1430, the control device 1900 may be configured to determine all of whether the solid detergent is located in the storage compartment 1200, or whether the solid detergent is located in the seating member inner space 1401 or whether the solid detergent is located in the outside of the seating member 1400, by placing the seating member sensor 1440 on the seating member 1400. This will be described later in detail.

As described above, the storage compartment 1200 may be provided in plurality. For example, two storage compartments 1200 may be provided.

Hereinafter for convenience of description, the storage compartment 1200 disposed on the left side in the second direction Y with respect to FIG. 8 is defined as a first storage compartment 1200, and a storage compartment 1200' disposed on the right side is defined as a second storage compartment 1200'. In addition, a configuration of the first storage compartment 1200 is defined as a first configuration, and a configuration of the second storage compartment 1200' is defined as a second configuration. For example, the intermediate door 1250 of the first storage compartment 1200 is defined as a first intermediate door 1250 and an intermediate door 1250' of the second storage compartment 1200' is defined as a second intermediate door 1250'.

In addition, an ejector configured to discharge a solid detergent stored in the first storage compartment 1200 is defined as a first ejector 1300, and an ejector configured to discharge a solid detergent stored in the second storage compartment 1200' is defined as a second ejector 1300'. In addition, a holder 1500 disposed inside the first storage compartment 1200 is defined as a first holder 1500, and a holder 1500 disposed inside the second storage compartment 1200' is defined as a second holder 1500'.

The first and second storage compartments 1200 and 1200' may be provided to be spaced apart from each other in the second direction Y. The first and second storage compartments 1200 and 1200' include long sides extending in the third direction Z when the automatic detergent dispenser 1000 is disposed at the first position 1000A, respectively. Accordingly, when the first and second storage compartments 1200 and 1200' are provided to be spaced apart from each other in the second direction Y, the first and second storage compartments 1200 and 1200' may be efficiently arranged inside the automatic detergent dispenser 1000.

Due to the first and second storage compartments 1200 and 1200', a user can load a large number of solid detergents into the automatic detergent dispenser 1000 at one time.

The seating member 1400 may be disposed between the first storage compartment 1200 and the second storage compartment 1200' in the second direction Y. The first storage compartment 1200 may be provided to communicate with the seating member 1400 as described above, and the second storage compartment 1200' may also be provided to communicate with the seating member 1400.

Accordingly, the first and second storage compartments 1200 and 1200' may communicate with the tub 12 through a single seating member 1400 arranged between the first storage compartment 1200 and the second storage compartment 1200' in the second direction Y.

This is to minimize the expansion of the automatic detergent dispenser 1000 in the second direction Y as the first and second storage compartments 1200 and 1200' share the seating member 1400. That is, when a plurality of seating members 1400 is provided to correspond to the first and second storage compartments 1200 and 1200', the automatic detergent dispenser 1000 may increase in volume in the second direction Y due to the plurality of seating members. However, as for the automatic detergent dispenser 1000, the first and second storage compartments 1200 and 1200' may communicate with each other through a single seating member 1400 as described above, and thus it is possible to minimize the length of the automatic detergent dispenser 1000 in the second direction Y.

Based on FIG. 8, the first storage compartment 1200 may be disposed on the left side of the seating member 1400 and the second storage compartment 1200' may be disposed on the right side of the seating member 1400 with respect to the second direction Y.

As described above, while the first cam member 1310 is rotated clockwise, the first cam member 1310 may move a solid detergent seated on the first lower surface 1220 of the first storage compartment 1200 to the right side of the first storage compartment 1200, and as the first storage compartment outlet 1210 is disposed in a lower portion of the first right surface 1230 of the first storage compartment 1200, the solid detergent may be moved to the seating member 1400 disposed on the right side of the first storage compartment 1200.

The first cam member 1310 may be provided to be rotated in a clockwise direction by interlocking with the first driving motor 1320 and the first transmission member 1330.

Conversely, a second cam member 1310' may be rotated counterclockwise. Unlike the first ejector 1300, the second ejector 1300' may be configured to move the solid detergent loaded in the second storage compartment 1200' to the left side.

The second cam member 1310' may be provided to be rotated in a counterclockwise direction by interlocking with a second driving motor 1320' and a second transmission member 1330'.

While the second cam member 1310' is rotated counterclockwise, the second cam member 1310' may move a solid detergent seated on a second lower surface 1220' of the second storage compartment 1200' to the left side of the second storage compartment 1200', and as a second storage compartment outlet 1210' is disposed in a lower portion of the second left surface 1240' of the second storage compartment 1200', the solid detergent may be moved to the seating member 1400 disposed on the left side of the second storage compartment 1200'.

The second storage compartment 1200' may include a second penetration member 1221' formed on the second lower surface 1220' of the second storage compartment 1200' and provided to allow a second pressing portion 1312a' to be moved from the outside of the second storage compartment 1200' to the inside of the second storage compartment 1200'.

The second penetration member 1221' may be provided to extend not only to the second lower surface 1220' of the second storage compartment 1200' but also to the lower side of a second right surface 1230' and a second left surface 1240' of the second storage compartment 1200'.

The second pressing portion 1312a' may be rotated by the rotation of the second cam member 1310' and moved into the second storage compartment 1200' through the lower side of the second right surface 1230' and the second penetration member 1221' of the second lower surface 1220', and then moved to the outside of the second storage compartment 1200' through the lower side of the second left surface 1240' and the second penetration member 1221' of the second lower surface 1220'.

The second pressing portion 1312a' may be provided to be rotated while pressing the solid detergent seated on the second lower surface 1220', so as to allow the solid detergent to be moved to the left side.

The first rotating axis 1313 of the first cam member 1310 may be disposed between the first left surface 1240 and the first right surface 1230 of the first storage compartment 1200 in the second direction Y. For example, the first rotating axis 1313 of the first cam member 1310 may be disposed at the center of the left surface 1240 and the right surface 1230 of the first storage compartment 1200 in the second direction Y.

A second rotating axis 1313' of the second cam member 1310' may be disposed between the second left surface 1240' and the second right surface 1230' of the second storage compartment 1200' in the second direction Y. For example, the second rotating axis 1313' of the second cam member 1310' may be disposed at the center of the second left surface 1240' and the second right surface 1230' of the second storage compartment 1200' in the second direction Y.

A reason why the first and second rotating axes 1313 and 1313' of the first and second cam members 1310 and 1310' are respectively at the center of the first and second storage compartments 1200 and 1200' disposed in the second direction Y as mentioned above, is to stably support and press the solid detergent when the first and second pressing portions 1312a and 1312a' of the first and second cam members 1310 and 1310' are rotated.

When the first and second rotating axes 1313 and 1313' of the first and second cam members 1310 and 1310' are disposed outside the center of the first and second storage compartments 1200 and 1200' in the second direction Y, the first and second pressing portions 1312a and 1312a' may pass through the first and second penetration members 1221 and 1221' with a predetermined length or less of the first and second pressing portions 1312a and 1312a' and thus it is difficult for the first and second pressing portions 1312a and 1312a' to stably support the solid detergent, in a section in which the first and second pressing portions 1312a and 1312a' pass through the first and second penetration members 1221 and 1221' by the rotation of the first and second cam members 1310 and 1310'.

In a section in which the first and second pressing portions 1312a and 1312a' enter or exit the first and second storage compartments 1200 and 1200' by passing through the first and second penetration members 1221 and 1221', the first and second pressing portions 1312a and 1312a' may pass through the first and second penetration members 1221 and 1221' with a predetermined length or less of the first and second pressing portions 1312a and 1312a' and thus it is difficult for the first and second pressing portions 1312a and 1312a' to stably support the solid detergent loaded into the first and second storage compartments 1200 and 1200'.

To prevent this, the first and second rotating axes 1313 and 1313' of the first and second cam members 1310 and 1310' may be respectively disposed at the center of the first and second storage compartments 1200 and 1200' in the second direction Y in order that the first and second pressing portions 1312a and 1312a' pass through the first and second penetration members 1221 and 1221' and are rotated with a predetermined length or more of the first and second pressing portions 1312a and 1312a', in a section in which the first and second pressing portions 1312a and 1312a' enter or exit the first and second storage compartments 1200 and 1200' through the first and second penetration members 1221 and 1221'.

When the first and second rotating axes 1313 and 1313' of the first and second cam members 1310 and 1310' are not respectively disposed at the center of the first and second storage compartments 1200 and 1200' in the second direction Y, the volume of the automatic detergent dispenser 1000 in the second direction Y may increase. Accordingly, it is appropriate that the first and second rotating axes 1313 and 1313' of the first and second cam members 1310 and 1310' are respectively disposed at the center of the first and second storage compartments 1200 and 1200' in the second direction Y.

The first ejector 1300 and the second ejector 1300' may be provided to be driven in a mirror-symmetrical direction in the second direction Y with respect to the seating member 1400. The first cam member 1310 and the second cam member 1310' may be configured to be rotated in opposite directions to each other so as to be mirror symmetrical about the seating member 1400.

In order that the first storage compartment 1200 and the second storage compartment 1200' are disposed on opposite sides of the seating member 1400 with respect to the second direction Y and the solid detergent discharged from the first and second storage compartments 1200 and 1200' is moved to the seating member 1400, the first ejector 1300 and the second ejector 1300' may be provided to be driven in a mirror-symmetrical direction in the second direction Y with respect to the seating member 1400.

A width L1 of the first storage compartment 1200 in the second direction Y (or referred to as the horizontal length) may be substantially the same as a width L1 of the second storage compartment 1200'.

The width L1 of the first and second storage compartments 1200 and 1200' in the second direction Y may substantially correspond to a width L3 of the seating member 1400. When the solid detergent is discharged from the first and second storage compartments 1200 and 1200 in a state in which the width L3 of the seating member 1400 in the second direction Y is excessively less than the width L1 of the first and second storage compartments 1200 and 1200', the solid detergent may be stuck in the seating member inner space 1401 without being seated on the seating member door 1410.

Conversely, when the width L3 of the seating member 1400 in the second direction Y is excessively greater than the width L1 of the first and second storage compartments 1200 and 1200', the volume of the seating member 1400 in the second direction Y may increase more than necessary and thus the volume of the automatic detergent dispenser 1000 in the second direction Y may increase more than necessary.

Therefore, as described above, it is appropriate that the width L3 of the seating member 1400 may have a length corresponding to the width L1 of the first and second storage compartments 1200 and 1200' having a cross-sectional area S in accordance with the size of the solid detergent, in the second direction Y.

Hereinafter the operation of the automatic detergent dispenser 1000 will be described in detail.

Figure 9:
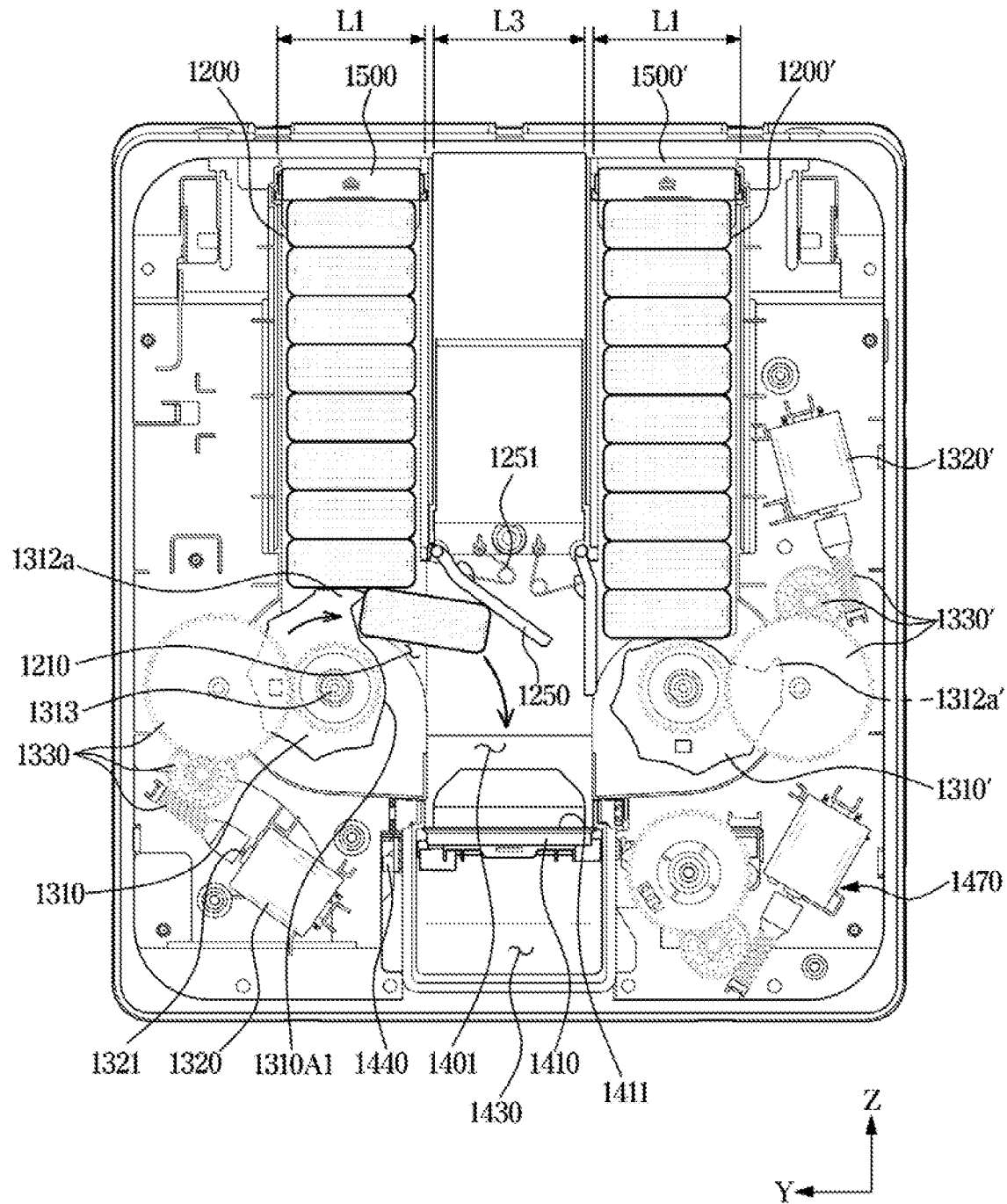
FIG. 9 is a view illustrating a state in which a solid detergent loaded in a first storage compartment of FIG. 8 is discharged from the first storage compartment.
Figure 10:
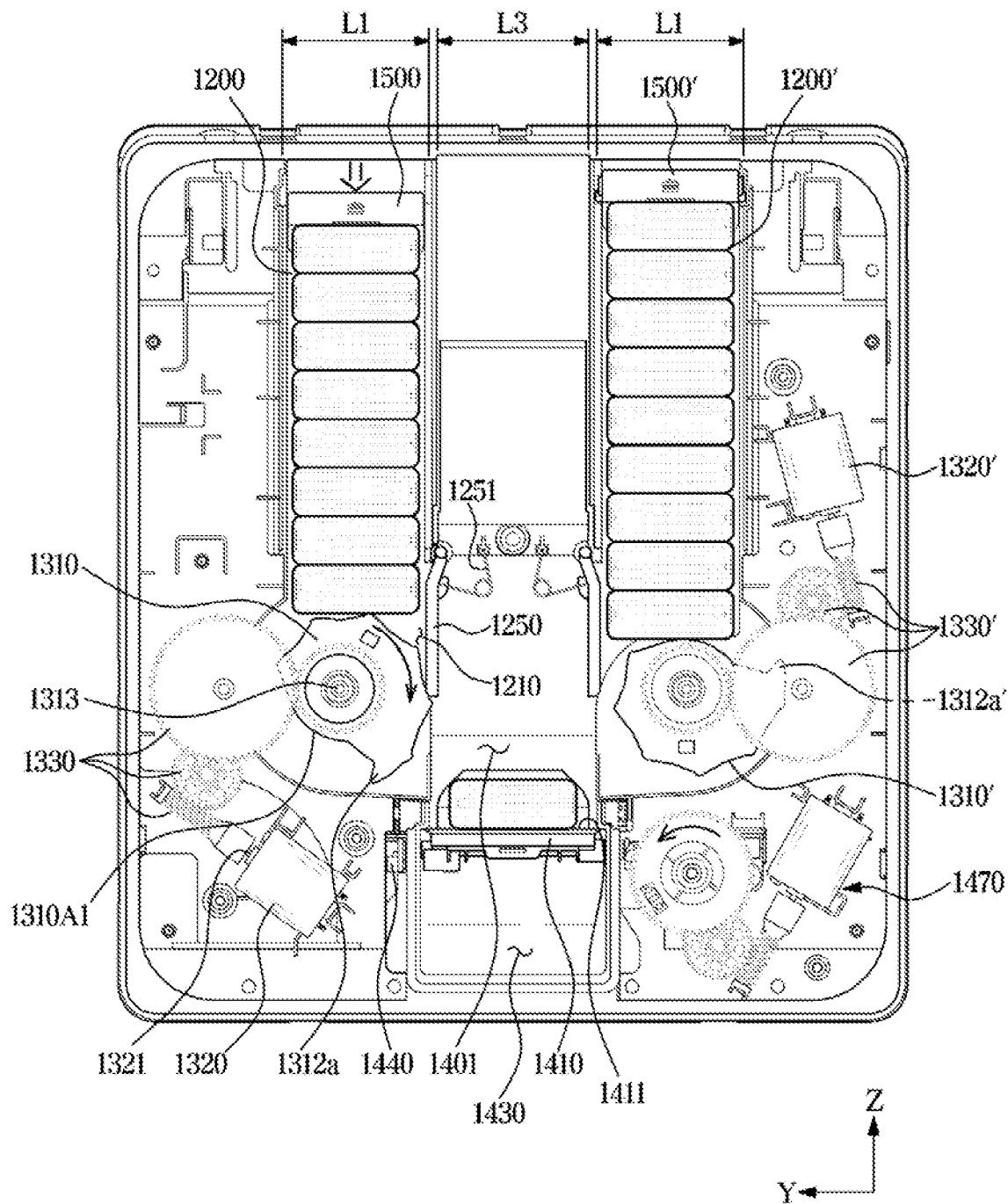
FIG. 10 is a view illustrating a state in which the solid detergent of FIG. 9 is seated on a seating member.
Figure 11:
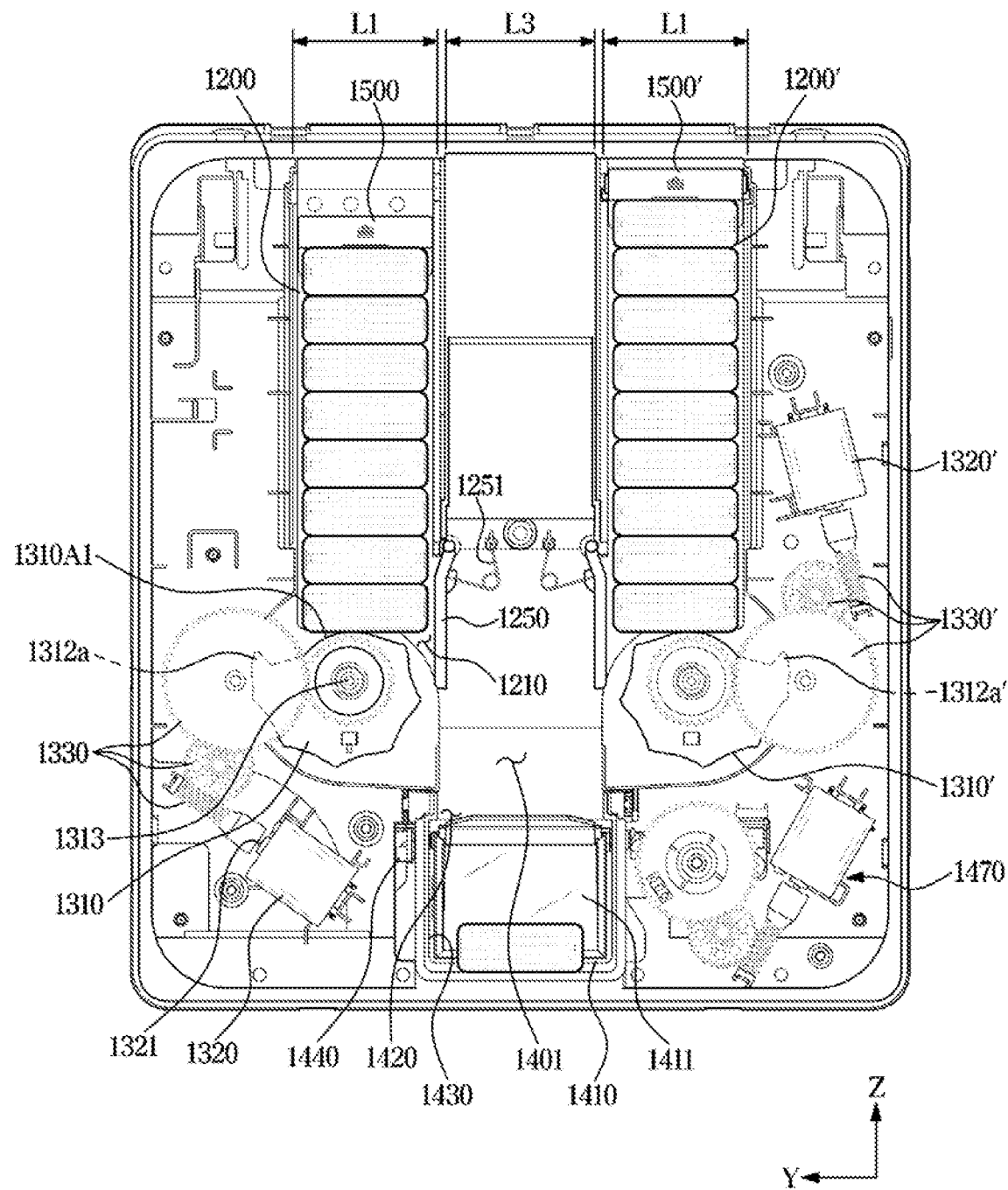
FIG. 11 is a view illustrating a state in which the solid detergent of FIG. 10 is discharged from the automatic detergent dispenser.
Figure 12:
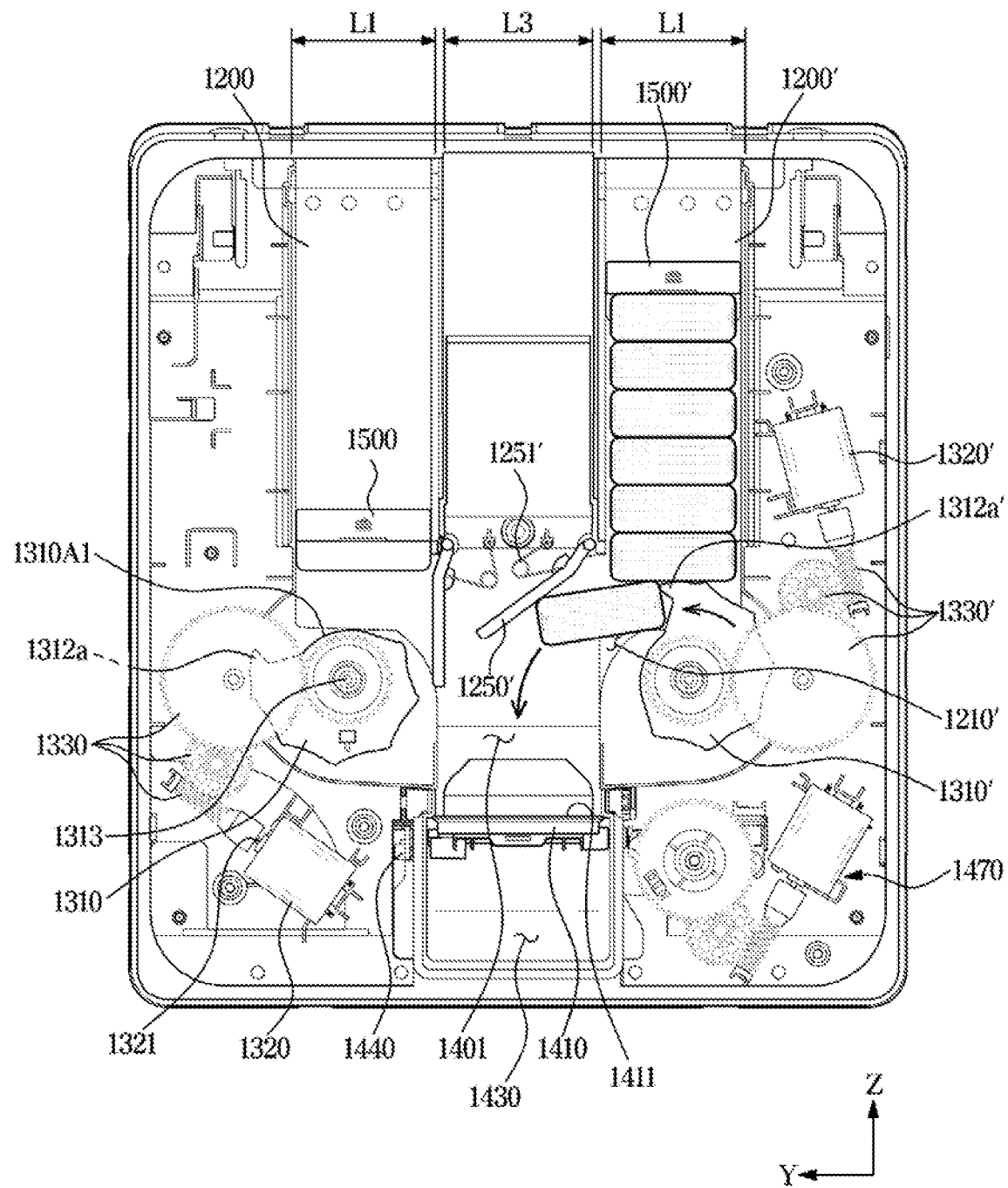
FIG. 12 is a view illustrating a state in which a solid detergent loaded in a second storage compartment of FIG. 8 is discharged from the second storage compartment.

FIG. 8 is a view illustrating a state in which some components of the automatic detergent dispenser of the dishwasher according to an embodiment are removed, FIG. 9 is a view illustrating a state in which a solid detergent loaded in a first storage compartment of FIG. 8 is discharged from the first storage compartment, FIG. 10 is a view illustrating a state in which the solid detergent of FIG. 9 is seated on a seating member, FIG. 11 is a view illustrating a state in which the solid detergent of FIG. 10 is discharged from the automatic detergent dispenser, and FIG. 12 is a view illustrating a state in which a solid detergent loaded in a second storage compartment of FIG. 8 is discharged from the second storage compartment.

As shown in FIGS. 8 and 9, the control device 1900 may control the first ejector 1300 or the second ejector 1300' to allow one of the plurality of solid detergents stacked in one of the first storage compartment 1200 and the second storage compartment 1200' to be moved to the seating member 1400.

For example, the control device 1900 may control the first ejector 1300 to be driven. The control device 1900 may control the first ejector 1300 to be driven again or control the second ejector 1300' to be driven based on the sensing value of the seating member sensor 1440. A description thereof will be described later in detail.

By driving the first driving motor 1320, the control device 1900 may control the first ejector 1300 to allow the first cam member 1310 to be rotated clockwise.

By driving the second driving motor 1320', the control device 1900 may control the second ejector 1300' to allow the second cam member 1310' to be rotated clockwise.

The control device 1900 may control the position of the first cam member 1310 to allow the first cam region 1310A1 of the first cam member 1310 to be arranged at the upper end in the third direction Z before the first cam member 1310 is rotated and the first pressing portion 1312a is moved into the storage compartment 1200.

When the first cam region 1310A1 of the first cam member 1310 is arranged at the upper end of the first cam member 1310 in the third direction Z, the first cam region 1310A1 may be disposed below the first support surface 1222 of the storage compartment 1200 in the third direction Z as described above. Accordingly, the solid detergent located at the lowest position in the third direction Z among the plurality of solid detergents loaded in the first storage compartment 1200 may be stably seated on the first support surface 1222, and thus the first pressing portion 1312a may stably move the solid detergent to the second direction Y by the rotation of the first cam member 1310.

For example, when a part of the first cam member 1310 protrudes higher than the first support surface 1222 in the third direction Z through the first penetration member 1221, the solid detergent located at the lowest position in the third direction Z among the plurality of solid detergents loaded in the first storage compartment 1200 may not be horizontally disposed in the third direction Z. Accordingly, when the solid detergent is moved in the second direction Y, the solid detergent may be rotated or moved to another direction without being moved to the second direction Y by the center of gravity. Accordingly, the solid detergent may not be moved toward the first storage compartment outlet 1210 and may not be discharged to the outside of the first storage compartment 1200.

Accordingly, the control device 1900 may control the position of the first cam member 1310 to allow the first cam region 1310A1 of the first cam member 1310 to be arranged at the upper end in the third direction Z when the dishwasher 1 does not performs the washing process. Thereafter, when the dishwasher 1 performs the washing process, the control device 1900 may communicate with the main control device and the control device 1900 may control the first ejector 1300 to allow the first cam member 1310 to be rotated clockwise.

The first pressing portion 1312a may be interlocked with the rotation of the first cam member 1310 and moved into the first storage compartment 1200, and accordingly, the solid detergent located at the lowest position in the third direction Z may be moved to the right side with respect to the second direction Y by the first pressing portion 1312a.

The solid detergent may be pressed by the first pressing portion 1312a and moved to the first storage compartment outlet 1210, and while the solid detergent opens the first intermediate door 1250 provided to close the first storage compartment outlet 1210, the solid detergent may be discharged to the outside of the first storage compartment 1200 through the first storage compartment outlet 1210.

Thereafter, the solid detergent may be disposed on the seating member 1400, particularly, on the seating member door 1410 as shown in FIG. 10.

The seating member sensor 1440 may detect the position of the solid detergent, that is, whether or not the solid detergent is located in the seating member inner space 1401. Particularly, the seating member sensor 1440 may be arranged on the seating member door 1410 in the third direction Z and configured to detect whether the solid detergent is located on the seating member door 1410.

The control device 1900 may receive information on the position of the solid detergent located on the seating member door 1410 by the seating member sensor 1440 and communicate with the main control device, and the controller may control the dishwasher 1 to allow the dishwasher 1 to perform the washing process based on the communicated value.

For example, the washing process of the dishwasher 1 may be divided into the pre-washing operation, the main washing operation, the rinsing operation, and the drying operation. The controller may control the dishwasher 1 to allow the dishwasher 1 to perform the pre-washing operation based on the communicated value.

For example, when the seating member sensor 1440 fails to detect the solid detergent after driving the first ejector 1300 once, the control device 1900 may transmit the information that no solid detergent is detected to the main control device. The controller may control the dishwasher 1 to allow the dishwasher 1 not to perform the pre-washing operation of the washing process based on the communicated value. This is because, in some cases, a user can open the door 20 to load the solid detergent into the automatic detergent dispenser 1000. Accordingly, the controller may control the dishwasher 1 not to start the washing process itself when no solid detergent is placed in the seating member 1400.

For example, when the seating member sensor 1440 fails to detect the solid detergent after driving the first ejector 1300 once, the control device 1900 may drive the first ejector 1300 once again, which is different from FIG. 10. As described above, the controller may control the dishwasher 1 to allow the dishwasher 1 not to perform the washing process.

This is to drive the first ejector 1300 again to move the solid detergent to the second direction Y by the first pressing portion 1312a so as to allow the solid detergent to be discharged to the outside of the first storage compartment 1200 when the solid detergent, which is disposed at the lowest position in the third direction Z among the plurality of solid detergents loaded into the first storage compartment 1200, is not stably seated on the first support surface 1222 and moved to another direction without being moved to the second direction Y by the first pressing portion 1312a, and thus the solid detergent is not discharged to the first storage compartment outlet 1210.

Thereafter, the control device 1900 may receive information on the position of the solid detergent located on the seating member door 1410 by the seating member sensor 1440 and communicate with the main control device, and the controller may control the dishwasher 1 to allow the dishwasher 1 to perform the washing process based on the communicated value.

As illustrated in FIG. 11, when the dishwasher 1 performs the main washing operation of the washing process by the controller, the control device 1900 may open the seating member door 1410 to allow the solid detergent to be discharged from the seating member inner space 1401 and to be input to the tub 12 through the discharge guide 1430.

When the seating member door 1410 opens the seating member opening 1420, the solid detergent may be moved to the discharge guide 1430 through the seating member opening 1420, and the solid detergent may be discharged from the automatic detergent dispenser 1000 along the discharge guide 1430 through the inlet 1122.

For example, the seating member door 1410 may open the seating member opening 1420 while rotating downward, and the solid detergent placed on the seating member door 1410 may be moved to the discharge guide 1430 by passing through the seating member opening 1420 while the solid detergent is moved downward according to the rotation of the seating member door 1410.

The control device 1900 may rotate the seating member door 1410 to allow the seating member door 1410 to open the seating member opening 1420, and after a predetermined time elapses, the control device 1900 may rotate the seating member door 1410 to the opposite direction to allow the seating member door 1410 to close the seating member opening 1420, again.

This is because while the seating member opening 1420 is opened for a predetermined period of time, water may flow from the tub 12 into the storage compartment 1200 through the seating member 1400. To prevent this, the control device 1900 may control the seating member door 1410.

The control device 1900 may control the seating member door driver 1470 to open and close the seating member door 1410. The seating member door driver 1470 may transmit a rotational force to the seating member door 1410 in one direction or the opposite direction under the control of the control device 1900, so as to drive the seating member door 1410 to open and close the seating member opening 1420.

When the control device 1900 receives information that no solid detergent is located in the seating member 1400 from the seating member sensor 1440 after the control device 1900 controls the seating member door 1410 to be opened and closed, the control device 1900 may communicate with the main control device and the controller may control the dishwasher 1 to perform the main washing operation of the washing process based on the communicated value.

This is to prevent the dishwasher 1 from performing the main washing operation in a state in which the solid detergent is not discharged from the seating member inner space 1401 due to adhesion of the solid detergent to the seating member door 1410 even when the seating member door 1410 opens and closes the seating member opening 1420.

The control device 1900 may receive information that no solid detergent is located in the seating member 1400 from the seating member sensor 1440 after the control device 1900 controls the seating member door 1410 to be opened and closed, and the control device 1900 may control the position of the first cam member 1310 to allow the first cam region 1310A1 of the cam member 1310 to be disposed at the upper end in the third direction Z.

Accordingly, as the solid detergent located at the lowest position in the third direction Z among the plurality of solid detergents is discharged to the outside of the first storage compartment 1200, the plurality of solid detergents loaded in the first storage compartment 1200 may be moved downward and a solid detergent, which is positioned directly above the discharged solid detergent, may be stably placed on the support surface 1222.

By repeating the above-described process, the control device 1900 may control the automatic detergent dispenser 1000 to allow the solid detergent to be automatically input into the tub 12 in response to the dishwasher 1 performing the washing process.

When receiving information that no solid detergent is detected by the seating member sensor 1440 after driving the first ejector 1300, the control device 1900 may drive the first ejector 1300 one more time and receive information on whether or not the solid detergent is detected from the seating member sensor 1440, as described above.

When receiving information that no solid detergent is detected by the seating member sensor 1440 even after driving the first ejector 1300 one more time, the control device 1900 may drive the second ejector 1300' based on the information.

Because all of the plurality of solid detergents loaded in the first storage compartment 1200 is discharged from the first storage compartment 1200, the seating member sensor 1440 may fail to detect the solid detergent even after the control device 1900 controls the first ejector 1300 to be driven twice.

Accordingly, the control device 1900 may control the second ejector 1300' to be driven. The feature of driving the second ejector 1300' by the control device 1900 is the same as the feature of driving the first ejector 1300 by the control device 1900, and thus a description thereof will be omitted.

In the above description, the configuration and operation of the automatic detergent dispenser 1000 of the dishwasher 1 according to an embodiment of the disclosure have been described with reference to FIGS. 1 to 12. However, the disclosure is not limited thereto, and the contents described above are merely examples of the dishwasher and the automatic detergent dispenser according to the disclosure.

For example, when the automatic detergent dispenser 1000 is at the first position 1000A, the plurality of solid detergents may be stacked and loaded in a direction different from the third direction Z that is a direction different from the vertical direction of the dishwasher 1, in the storage compartment 1200.

For example, when the automatic detergent dispenser 1000 is at the first position 1000A, the automatic detergent dispenser 1000 may include a storage compartment including a long side extending in the second direction Y, which is the left and right direction of the dishwasher 1. A plurality of solid detergents may be stacked and loaded in the second direction Y inside the storage compartment. The automatic detergent dispenser 1000 may include a holder configured to move the plurality of solid detergents, which is stacked in the second direction Y inside the storage compartment, to the second direction Y. For example, the holder may include an elastic member, and thus the holder may move the plurality of solid detergents to the second direction Y toward a cam member of an ejector. The cam member may press one of the plurality of solid detergents to be discharged to the outside of the storage compartment. For example, the solid detergent may be discharged to a direction perpendicular to the second direction Y and then moved to the lower side of the storage compartment. One solid detergent discharged to the outside of the storage compartment may be introduced into the tub 12 through a seating member or the like.

As an example, when the automatic detergent dispenser 1000 is at the first position 1000A, the automatic detergent dispenser 1000 may include storage compartments 1200 and 1200' in which a plurality of solid detergents is stacked and loaded in the third direction Z, as illustrated in FIGS. 1 to 12. However, unlike those shown in FIGS. 1 to 12, the automatic detergent dispenser 1000 may be provided to allow a plurality of solid detergents to be moved upward in the storage compartments 1200 and 1200' and then discharged. The automatic detergent dispenser 1000 may include a holder arranged inside the storage compartments 1200 and 1200' and configured to move the plurality of solid detergents to the upper side. For example, the holder may include an elastic member, and thus the holder may move the plurality of solid detergents to the upper side. A cam of an ejector may be disposed at an upper side of the storage compartments 1200 and 1200', and one solid detergent disposed at the highest position among the plurality of solid detergents may be moved out of the storage compartment 1200 by the cam of the ejector. One solid detergent moved to the outside of the storage compartment 1200 may be introduced into the tub 12 through a seating member or the like.

For the sake of convenience of description, it is illustrated that when the automatic detergent dispenser 1000 is at the first position 1000A, the plurality of solid detergents is stacked and loaded in the third direction Z, which is the vertical direction, inside the storage compartments 1200 and 1200'. In addition, it is illustrated that the plurality of solid detergents are moved from the top to the bottom along the third direction Z inside the storage compartments 1200 and 1200', and are discharged to the outside of the storage compartments 1200 and 1200' starting from a solid detergent located at a lower position.

Meanwhile, the term "third direction", which refers to the direction in which the plurality of solid detergents is stacked and loaded inside the storage compartments 1200 and 1200', is only a term for defining the stacking direction of the plurality of solid detergents. Therefore, the stacking direction of the plurality of solid detergents is not limited by the term "third direction". For example, the stacking direction of the plurality of solid detergents may be referred to as a "first direction" as needed, and even in this case, the term "first direction" may represent the Z direction shown in the drawings according to an embodiment of the disclosure (it is assumed that the automatic detergent dispenser 1000 is at the first position 1000A) and the like.

In addition, for the sake of convenience of description, the following description of the automatic detergent dispenser 1000 according to an embodiment of the present disclosure will be made in detail on the first storage compartment 1200, the first ejector 1300, and the first cam member 1310. However, the following description may be equally applied to the second storage compartment 1200', the second ejector 1300', and the second cam member 1310'. Accordingly, in the following description, detailed configurations and operations of the cam member according to an embodiment of the disclosure will be described by referring to the first storage compartment 1200, the first ejector 1300, the first cam member 1310, and the like as the storage compartment 1200, the ejector 1300, the cam member 1310, and the like.

Figure 13:
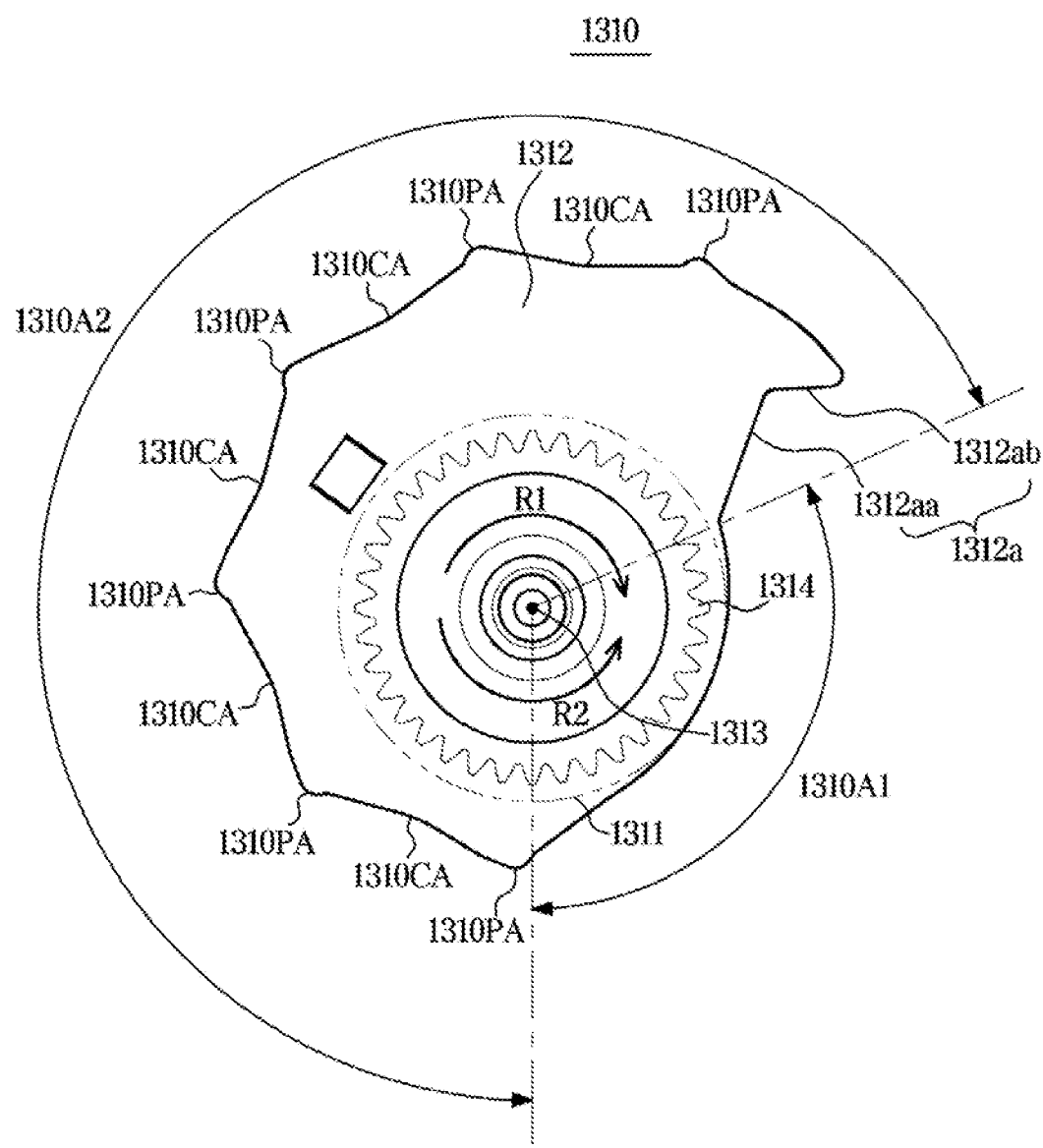
FIG. 13 is a view illustrating a cam member of the automatic detergent dispenser of the dishwasher according to an embodiment of the disclosure.
Figure 14:
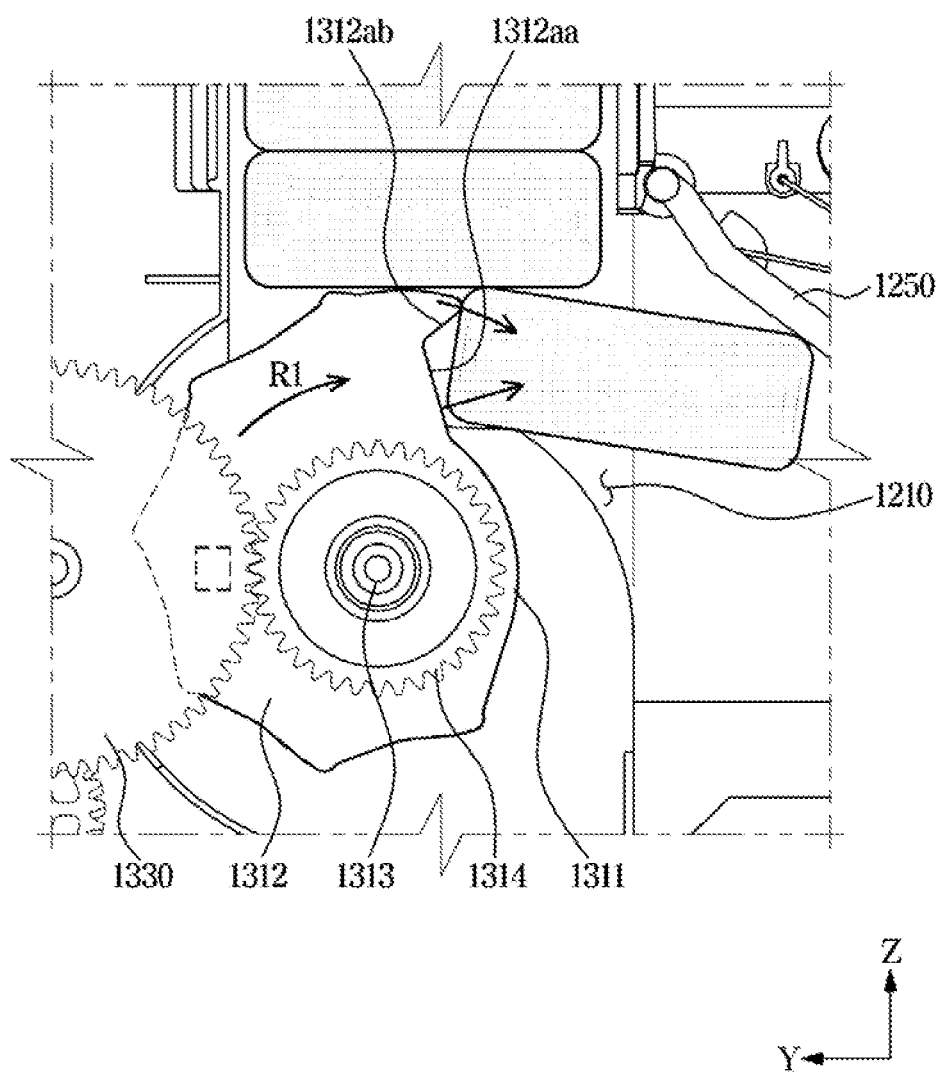
FIG. 14 is an enlarged view of a part of FIG. 9.
Figure 15:
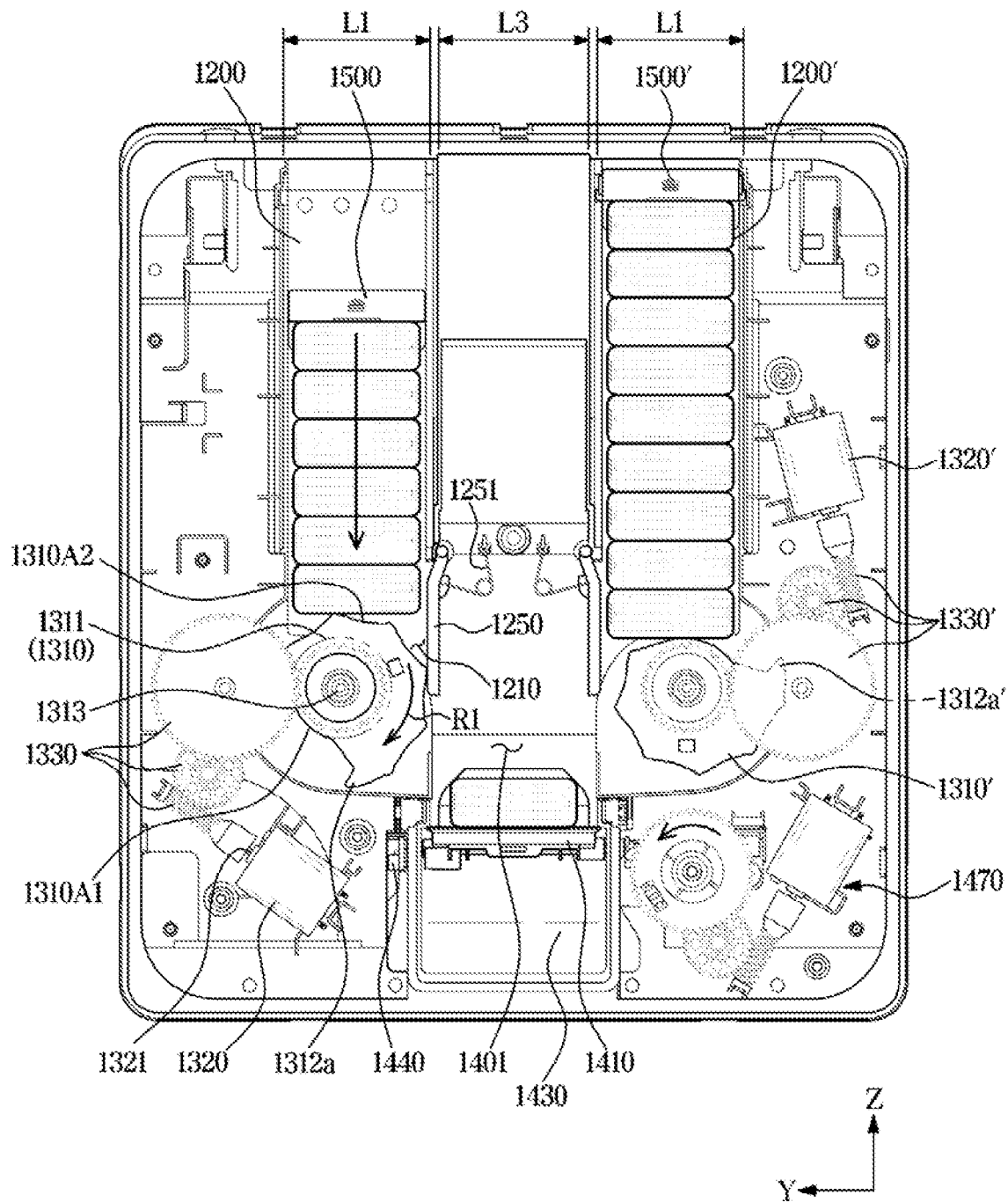
FIG. 15 is a view illustrating a state in which the solid detergent of FIG. 8 moves inside the storage compartment according to an embodiment of the disclosure.
Figure 16:
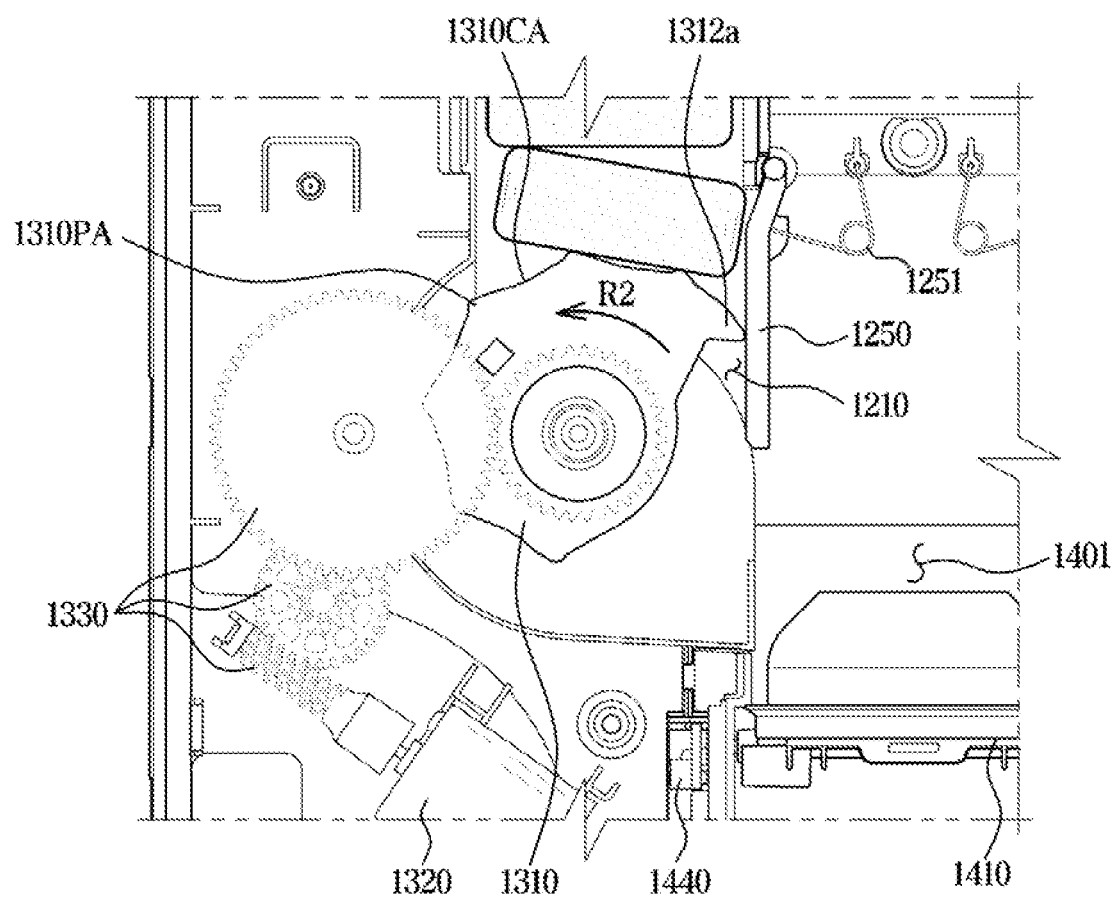
FIG. 16 is a view illustrating a state in which the cam member rotates in a direction opposite to that shown in FIGS. 10 to 14 in the automatic detergent dispenser of the dishwasher according to an embodiment of the disclosure.

FIG. 13 is a view illustrating a cam member of the automatic detergent dispenser of the dishwasher according to an embodiment, FIG. 14 is an enlarged view of a part of FIG. 9, FIG. 15 is a view illustrating a state in which the solid detergent of FIG. 8 moves inside the storage compartment, and FIG. 16 is a view illustrating a state in which the cam member rotates in a direction opposite to that shown in FIGS. 10 to 14 in the automatic detergent dispenser of the dishwasher according to an embodiment.

Referring to FIGS. 13 to 17, the automatic detergent dispenser 1000 may include an automatic detergent dispenser 1000 disposed on the door 20 and configured to input a solid detergent to the inside of the tub. The automatic detergent dispenser 1000 may include a storage compartment 1200 into which a plurality of solid detergents are loaded, and a cam member 1310 provided to move one of the plurality of solid detergents to the outside of the storage compartment 1200.

The cam member 1310 may transport one solid detergent among the solid detergents inside the storage compartment 1200 to the outside of the storage compartment 1200. The cam member 1310 may be referred to as a "transporting member".

For example, unlike shown in the drawings, the ejector 1300 may include a transporting member that transports a solid detergent inside the storage compartment 1200 to the outside of the storage compartment 1200 by a structure other than a cam structure. For example, the transporting member of the ejector 1300 may transport a solid detergent from the inside of the storage compartment 1200 to the outside through a translational motion. However, in the following description, it is illustrated that the transporting member 1310 of the ejector 1300 has a cam structure as shown in the drawings, and for the sake of convenience of description, a "transporting member 1310" is referred to as a "cam member 1310".

The storage compartment 1200 may be provided to allow a plurality of solid detergents to be stacked and loaded in the third direction Z as described above.

The cam member 1310 may be provided at a side of the storage compartment 1200 in the third direction Z. Specifically, the cam member 1310 may be provided at a lower side of the storage compartment 1200 when the automatic detergent dispenser 1000 is in the first position 1000A. Accordingly, the cam member 1310 may be provided to move one solid detergent located at the lowest position of the storage compartment 1200 among the plurality of solid detergents to the outside of the storage compartment 1200. However, alternatively, the cam member 1310 may also be provided at an upper side of the storage compartment 1200 as described above.

As described above, the automatic detergent dispenser 1000 may include a holder 1500 provided to maintain a stacked state of the plurality of solid detergents inside the storage compartment 1200. The holder 1500 may be located in the third direction Z of the plurality of solid detergents inside the storage compartment 1200, and may be provided to press the plurality of solid detergents in the third direction Z.

Here, when a direction in which the plurality of solid detergents are stacked while the automatic detergent dispenser 1000 is located in the first position 1000A is defined as a direction from an upper side of the storage compartment 1200 to a lower side of the storage compartment 1200, the holder 1500 may be referred to as being located at a side in the stacking direction with respect to the plurality of solid detergents. In addition, the holder 1500 may be referred to as being provided to press the plurality of solid detergents in a direction opposite to the stacking direction.

Under the assumption above, the cam member 1310 may be referred to as being located at a side in a direction opposite to the stacking direction of the plurality of solid detergents with respect to the storage compartment 1200. That is, the holder 1500 may move the plurality of solid detergents loaded in the storage compartment 1200 toward the cam member 1310. The cam member 1310 may be provided to discharge one of the plurality of solid detergents pressed by the holder 1500 from the storage compartment 1200.

The cam member 1310 may be rotatably provided with respect to the storage compartment 1200. In other words, the cam member 1310 may be rotatably provided with respect to the housing 1100. The cam member 1310 may be provided to, through rotation, press one solid detergent toward the outside of the storage compartment 1200. Alternatively, the cam member 1310 may be provided to, through rotation, guide a movement of the plurality of solid detergents in parallel to the third direction Z inside the storage compartment 1200.

A rotational direction in which the cam member 1310 rotates to press one solid detergent toward the outside of the storage compartment 1200 or to guide a movement of a plurality of solid detergents in parallel to the third direction Z inside the storage compartment 1200 may be defined as the first rotational direction R1.

Referring to FIGS. 13 to 17, the first rotational direction R1 may be a direction in which the first cam member 1310 rotates clockwise. Conversely, referring to FIGS. 13 to 17, the first rotational direction R1 may be a direction in which the second cam member 1310' rotates counterclockwise.

The cam member 1310 may be rotatably provided with respect to the rotating axis 1313. The rotating axis 1313 of the cam member 1310 may be disposed at a side in the third direction Z with respect to the storage compartment 1200. In other words, the rotating axis 1313 of the cam member 1310 may be positioned below the storage compartment 1200. Accordingly, the cam member 1310 may be rotatably provided at a lower side of the storage compartment 1200. The cam member 1310 may be provided to discharge one solid detergent adjacent to the rotating axis 1313 among the plurality of solid detergents from the storage compartment 1200.

Since the rotating axis 1313 of the cam member 1310 is located at a lower side of the storage compartment 1200, at least half of a hub portion 1311 may be disposed at a lower side of the storage compartment 1200.

The automatic detergent dispenser 1000 may include power supply devices 1320 and 1330 that supply power to the cam member 1310 so that the cam member 1310 is rotatable. In other words, the power supply devices 1320 and 1330 may be provided to supply power to the rotating axis 1313 of the cam member 1310.

Specifically, the ejector 1300 may include the driving motor 1320 and the transmission member 1330 as components of the power supply devices 1320 and 1330. As described above, the driving motor 1320 may generate rotational force to drive the cam member 1310, and the transmission member 1330 may transmit the rotational force generated by the driving motor 1320 to the rotating axis 1313 of the cam member 1310. The transmission member 1330 may include a plurality of gears, and the plurality of gears may include various types of gears, such as a spur gear, a worm gear, and a bevel gear.

The cam member 1310 may include a power transmission portion 1314 provided to receive power from the power supply devices 1320 and 1330. For example, the power transmission portion 1314 may be formed in the shape of a gear including teeth, and may be provided to mesh with the gear of the transmission member 1330. The power transmission portion 1314 may be formed in the shape of a gear centered on the rotating axis 1313. Accordingly, the cam member 1310 may receive power from the power supply devices 1320 and 1330 and may be provided to be rotatable around the rotating axis 1313.

However, it is not limited thereto, and the cam member 1310 may receive rotational force through various configurations. For example, the transmission member 1330 may not include a plurality of gears, but may include only a single gear connected to the driving motor 1320 and meshing with the power transmission portion 1314 of the cam member 1310 to transmit rotational force to the cam member 1310. For example, the power transmission portion 1314 of the cam member 1310 may not be provided in the shape of a gear, more specifically, may have a configuration in which the rotating axis 1313 is connected to the center of one gear among a plurality of gears of the transmission member 1330 to receive rotational force.

The cam member 1310 may include a hub portion 1311 rotatably provided with respect to the storage compartment 1200 and a body portion 1312 provided to be rotatable together with the hub portion 1311 and extending from the hub portion 1311 in a radial direction of the hub portion 1311.

The rotating axis 1313 of the cam member 1310 may be provided in the hub portion 1311. In other words, the rotating axis 1313 may be provided at the center of the hub portion 1311, and the hub portion 1311 may rotate around the rotating axis 1313. The hub portion 1311 may be formed concentrically with the power transmission portion 1314. The hub portion 1311 may be connected to the rotating axis 1313. The hub portion 1311 may be passed through by the rotating axis 1313.

The hub portion 1311 may be formed to include a substantially flat disk shape. That is, the hub portion 1311 may have an outer rim whose distance from the rotating axis 1313 of the cam member 1310 in the radial direction is constant.

The body portion 1312 may extend from a portion of the outer rim of the hub portion 1311 in the radial direction of the hub portion 1311. In other words, the body portion 1312 may be formed to extend in the radial direction of the hub portion 1311 and located on a portion of the outer rim of the hub portion 1311.

The portion of the outer rim of the hub portion 1311 may not be exposed to the outside due to the presence of the body portion 1312. On the other hand, another portion of the hub portion 1311 may be exposed to the outside due to the absence of the body portion 1312. That is, the body portion 1312 may cover a portion of the outer rim of the hub portion 1311 and may not cover another portion of the outer rim of the hub portion 1311.

As described above, the cam member 310 may, due to a difference between a portion including the body portion 1312 and a portion excluding the body portion 1312, have a shape in which a certain outer circumferential portion radially protrudes more than another outer circumferential portion. The outer circumferential surface of the cam member 1310 may be provided to press one of the plurality of solid detergents in the storage compartment 1200 according to the rotation of the cam member 1310, so that the cam member 1310 may discharge the one solid detergent to the outside of the storage compartment 1200.

The body portion 1312 may be provided, through rotation in the first rotational direction R1, press one solid detergent toward the storage compartment 1200. That is, the body portion 1312 may include the pressing portion 1312a described above.

The pressing portion 1312a may protrude in the radial direction of the cam member 1310. The pressing portion 1312a may be provided at one end of the body portion 1312 in the first rotational direction R1. In other words, the pressing portion 1312a may form one surface provided at one end of the body portion 1312 in the first rotational direction R1. With such a configuration, the pressing portion 1312a may be provided to rotate in the first rotational direction R1 to press one solid detergent toward the outside of the storage compartment 1200.

The body portion 1312 may be provided to allow one of the plurality of solid detergents stacked inside the storage compartment 1200 to be pressed in a direction different from the third direction Z by the pressing portion 1312a. For example, as shown in FIG. 14 and the like, the body portion 1312 may be provided to allow one solid detergent to be pressed in a second direction Y, which is a direction perpendicular to the third direction Z, by the pressing portion 1312a.

When the pressing portion 1312a rotates in the first rotational direction R1 to press one solid detergent toward the outside of the storage compartment 1200, a contact surface may be formed between the pressing portion 1312a and the one solid detergent. In this case, the direction of an external force exerted on the one solid detergent by the pressing portion 1312a may be formed differently depending on the direction of the contact surface. The direction of the contact surface between the pressing portion 1312a and the one solid detergent may vary depending on the size, shape or arrangement of the pressing portion 1312a and the solid detergent. As long as the solid detergent is formed in a shape that does not greatly deviate from a predetermined range, the direction of the contact surface may vary depending on the shape of the pressing portion 1312a.

When the pressing portion 1312a extends only in a constant direction from the hub portion 1311, the efficiency of pressing one solid detergent toward the outside of the storage compartment 1200 by the pressing portion 1312a may decrease.

For example, it may be assumed that the pressing portion 1312a is formed to extend only in a direction exactly parallel to the radial direction of the hub portion 1311 from the hub portion 1311 or obliquely extend only in a direction opposite to the first rotational direction R1 with respect to the radial direction of the hub portion 1311. In this case, the pressing portion 1312a while in contact with one solid detergent may rotate in the first rotational direction R1 and thus apply an upward external force to the one solid detergent. Therefore, a portion of the pressed solid detergent may be lifted upward, and the discharge of the solid detergent to the outside of the storage compartment 1200 may be impeded.

Conversely, for example, it may be assumed that the pressing portion 1312a obliquely extends from the hub portion 1311 only in the first rotational direction R1 with respect to the radial direction of the hub portion 1311. In this case, the above described issue that one solid detergent pressed by the pressing portion 1312a is lifted upward may not occur. However, even in this case, a portion of the pressing portion 1312a that is in contact with the solid detergent may only be a portion disposed outside the radial direction, and thus the efficiency of one solid detergent being pressed by the pressing portion 1312a may decrease.

To resolve the above issues, the pressing portion 1312a may include a first portion 1312aa and a second portion 1312ab extending in different directions.

Specifically, the pressing portion 1312a may include the first portion 1312aa formed to extend from the hub portion 1311 and the second portion 1312ab formed to bend and extend from the first portion 1312aa. The second portion 1312ab may be formed to bend from one end of the first portion 1312aa and extend in the first rotational direction R1. That is, the second portion 1312ab may be formed to extend from the first portion 1312aa in a direction toward the one solid detergent when the pressing portion 1312a presses one solid detergent.

With such a configuration, as shown in FIG. 14, the second portion 1312ab may apply a downward external force to the one solid detergent, and may prevent the one solid detergent from being lifted upward when pressed. In particular, even when an upward external force is applied to the one solid detergent by the first portion 1312*aa*, the second portion 1312*ab* may prevent the one solid detergent from being lifted upward.

The first portion 1312*aa* may be formed to obliquely extend from the hub portion 1311 in a direction opposite to the first rotational direction R1 with respect to the radial direction of the hub portion 1311. In other words, the first portion 1312*aa* may be formed to extend from the hub portion 1311 in a direction away from the one solid detergent when the pressing portion 1312*a* may press the one solid detergent.

In a case in which the extension direction of the second portion 1312*ab* is provided to be different from the above, the one solid detergent may not be sufficiently pressed by the first portion 1312*aa*. In order to make the first portion 1312*aa* sufficient contact with the one solid detergent, the second portion 1312*ab* may need to bend at a smaller angle with respect to the first portion 1312*aa* so as to extend toward the first rotational direction R1.

With the configuration described above, as shown in FIG. 14, the one solid detergent may be sufficiently pressed not only by the second portion 1312*ab* but also by the first portion 1312*aa*. In addition, the second portion 1312*ab* may be set to bend at a larger angle with respect to the first portion 1312*aa*, so that the solid detergent may be more effectively prevented from being lifted up when pressed.

In other words, the pressing portion 1312*a* may be formed to include a concave shape by the first portion 1312*aa* and the second portion 1312*ab*.

For example, a concave-convex shape (not shown), a rib (not shown) or the like may be formed on the pressing portion 1312*a* to effectively prevent the solid detergent from slipping when pressed.

In a case in which the extension length of the first portion 1312*aa* is shorter than the extension length of the second portion 1312*ab*, the first portion 1312*aa* may not easily come in contact with one solid detergent, and thus the solid detergent may not be sufficiently pressed by the first portion 1312*aa*. In order to make the first portion 1312*aa* sufficient contact with the one solid detergent, the second portion 1312*ab* may need to bend at a smaller angle with respect to the first portion 1312*aa* so as to extend toward the first rotational direction R1. Alternatively, in order to sufficiently secure the angle at which the second portion 1312*ab* is bent, there may be a need for a complex design such as increasing the extension length of the first portion 1312*aa* from the hub portion 1311 while increasing the inclination angle of the first portion 1312*aa* with respect to the radial direction of the hub portion 1311.

To prevent this, the first portion 1312*aa* may be formed to extend from the hub portion 1311 by a length greater than or equal to an extension length of the second portion 1312*ab* from the first portion 1312*aa*. Furthermore, preferably, the extension length of the first portion 1312*aa* may be formed to be longer than the extension length of the second portion 1312*ab*.

However, it is not limited thereto, and the pressing portion 1312*a* may extend in various directions and may be formed to have various shapes. For example, the pressing portion 1312*a* may be formed to have a convex shape toward the first rotational direction R1. For example, the pressing portion 1312*a* may be formed to extend in a constant direction and have an overall flat shape.

The pressing portion 1312*a* may protrude from the hub portion 1311 to have a length substantially corresponding to a length of one solid detergent. More specifically, in the pressing portion 1312*a*, the distance between one end of the first portion 1312*aa* adjacent to the hub portion 1311 and one end of the second portion 1312*ab* opposite to the first portion 1312*aa* may be provided to correspond to the solid detergent. The pressing portion 1312*a* may protrude to correspond approximately to the height h of one solid detergent D (see FIG. 7).

In other words, the difference between the distance from the rotating axis 1313 to the outer end of the pressing portion 1312*a* and the distance from the rotating axis 1313 to the inner end of the pressing portion 1312*a* (or to the hub portion 1311) may correspond approximately to the height h of one solid detergent D.

In other words, the difference between the maximum distance to a second cam region 1310A2 of the cam member 1310 and the distance to a first cam region 1310A1 may correspond approximately to the height h of one solid detergent D.

Alternatively, for example, the pressing portion 1312*a* may be formed to press one solid detergent at a position higher than or equal to approximately at least a middle height of the one solid detergent. That is, the pressing portion 1312*a* may protrude to have a length greater than or equal to approximately the middle position of the height h of one solid detergent D.

Accordingly, the pressing portion 1312*a* may be provided with a length suitable for sufficiently pressing one solid detergent without pressing two or more solid detergents due to having an excessively long length.

However, as described above, since the solid detergent may have various sizes depending on the components, functions, or manufacturing companies of the solid detergent, it is not that the pressing portion 1312*a* has a length exactly corresponding to one solid detergent or greater than or equal to a middle position of one solid detergent.

With such a configuration, the body portion 1312 may press one solid detergent among a plurality of solid detergents stacked and loaded inside the storage compartment 1200 to move the one solid detergent to the outside of the storage compartment 1200.

The hub portion 1311 and the body portion 1312 may be integrally formed with each other. In other words, the cam member 1310 may be formed as one part.

The hub portion 1311 and the body portion 1312 may be components conceptually defining respective portions of the cam member 1310 formed as one part. In other words, with reference to FIGS. 13 to 16, the hub portion 1311 and the body portion 1312 are described assuming that the hub portion 1311 is defined as a disk-shaped component with only a portion of the outer rim exposed, and the body portion 1312 is defined a component radially extending from a portion of the outer rim of the hub portion 1311, but the configuration of the hub portion 1311 and the body portion 1312 is not limited to the definitions.

For example, according to an embodiment different from that shown in FIG. 13, the hub portion and the body portion may not be integrally formed with each other, and the hub portion formed to have a smaller radius than the hub portion 1311 shown FIG. 13 and the body portion provided to cover the entire outer rim of the hub part may be coupled to each other to form a cam member.

The concept of the present disclosure does not exclude embodiments configured as described above. In the example described above, the body portion may also be defined as a component extending from a portion of the outer rim of the hub portion, and the hub portion may also be defined as a component whose outer rim is partially exposed to the outside due to absence of the body portion at another portion of the outer rim.

Under the assumption of the above definition, the cam region of the cam member 1310 according to an embodiment of the present disclosure will be described in detail.

The body portion 1312 may be provided to guide a movement of the plurality of solid detergents stacked and loaded inside the storage compartment 1200 in parallel with the third direction Z. More specifically, the body portion 1312 may be provided to guide a step-wise descent of the plurality of solid detergents seated on the outer circumferential surface of the body portion 1312 as the body portion 1312 rotates in the first rotational direction R1.

Alternatively, it may be illustrated that the cam member includes a hub portion and a body portion and the body portion is formed to extend from a portion of an outer rim of the hub portion such that the distance between the rotating axis of the cam member and the outer circumferential surface of the body portion is constant.

Alternatively, it may be illustrated that the cam member includes a disk-shaped hub portion having a constant radius from the rotating axis and a pressing portion protruding radially from the hub portion and configured to press one solid detergent, in which the pressing portion may be formed to radially protrude from a very narrow portion of the outer rim of the hub portion, allowing the rest of the outer rim of the hub portion to be exposed to the outside.

Even in the case of the above example, an effect of moving one of the plurality of solid detergents stacked inside the storage compartment 1200 to the outside of the storage compartment 1200 may be provided. However, the plurality of solid detergents remaining inside the storage compartment 1200 after one solid detergent is discharged may not be properly supported by the cam member due to the steep step difference between the body portion or the pressing portion and the hub portion in a process in which the cam member is rotated, and thus may be rapidly moved in the third direction Z. For example, the plurality of solid detergents remaining inside the storage compartment 1200 may be fallen to the bottom of the storage compartment 1200.

In this case, noise and vibration may be generated due to a collision between the plurality of solid detergents and the support surface 1222 of the storage compartment 1200, the life span of the product may be reduced due to a damage to parts, the solid detergent may be damaged, or the stacked state of the plurality of the solid detergent may be disturbed.

In order to resolve the issue, the cam member 1310 may be provided to allow the plurality of solid detergents seated on the outer rim to be moved inside the storage compartment 1200 in parallel with the third direction Z in a stepwise and/or gradual manner as the cam member 1310 rotates in the first rotational direction R1.

Specifically, as described above, the cam member 1310 may include a plurality of cam regions divided in the first rotational direction R1 on the outer rim of the cam member 1310.

The plurality of cam regions may include a first cam region 1310A1 and a second cam region 1310A2 positioned at a side of the first cam region 1310A1 in the first rotational direction R1.

The first cam region 1310A1 may be located on the outer rim of the hub portion 1311.

More specifically, the first cam region 1310A1 may be defined as a region located on a portion of the outer rim of the hub portion 1311 other than a portion of the outer rim of the hub portion 1311 from which the body portion 1312 extends. In other words, the first cam region 1310A1 may be defined as a region of the outer rim of the hub portion 1311 which is exposed to the outside due to not having the body portion 1312. The first cam region 1310A1 may be a region having the shortest distance in a radial direction from the rotating axis 1313 to the outer rim among the plurality of cam regions. The first cam region 1310A1 may have a constant extension length from the rotating axis 1313 in the radial direction.

In the first cam region 1310A1, the distance between the outer rim of the first cam region 1310A1 and the rotating axis 1313 may be provided to be less than or equal to the distance between the support surface 1222 of the storage compartment 1200 and the rotating axis 1313. In other words, the entirety of the hub portion 1311 may be disposed below the storage compartment 1200.

With such a configuration, the first cam region 1310A1 located on the top of the cam member 1310 when the dishwasher 1 is not driven in the washing cycle may be arranged at a position lower than the support surface 1222 in the third direction Z. Therefore, when a solid detergent located at the lowest position among the plurality of solid detergents is arranged on the lower surface 1220 of the storage compartment 1200, the solid detergent may be placed in the storage compartment 1200 in a substantially horizontal state with respect to the third direction Z without one side thereof being pressed upward with respect to the third direction Z by the cam member 1310.

The second cam region 1310A2 may be defined as a region located on the outer rim of the body portion 1312. The extension length of the second cam region 1310A2 extending in the radial direction from the rotating axis 1313 may not be constant along the first rotational direction R1.

The second cam region 1310A2 may have a length radially extending from the rotating axis 1313 that tends to increase along the first rotational direction R1. When the cam member 1310 rotates in the first rotational direction R1 around the rotating axis 1313, a portion of the second cam region 1310A2 in contact with the plurality of solid detergents inside the storage compartment 1200 may have a length extending from the rotating axis 1313 that tends to decrease. That is, the second cam region 1310A2 may be formed to guide the solid detergent in the storage compartment 1200 in a direction toward the rotating axis 1313 of the transporting member 1310 during rotation in the first rotational direction R1. Accordingly, the solid detergent stacked inside the storage compartment 1200 may descend in the third direction Z in a stepwise manner.

In other words, as the body portion 1312 rotates around the rotating axis 1313 of the cam member 1310, the plurality of solid detergents seated on the outer circumferential surface of the body portion 1312 may be guided to descend in a step-wise manner inside the storage compartment 1200.

The second cam region 1310A2 may include a plurality of peak areas 1310PA arranged along the first rotational direction R1 and protruding in the radial direction of the cam member 1310. Each of the plurality of peak areas 1310PA may have a shape protruding from the outer circumferential surface of the body portion 1312. The plurality of peak areas 1310PA may be arranged spaced apart from each other along the first rotational direction R1 of the cam member 1310 on the outer circumferential surface of the body portion 1312.

Each of the plurality of peak areas 1310PA may be formed to support the solid detergent inside the storage compartment 1200.

The peak area 1310PA may also be referred to as a "protruding portion" of the cam member 1310.

The plurality of peak areas 1310PA may be defined as areas located on the outer rim of the cam member 1310, as a part of the second cam region 1310A2.

The plurality of peak areas 1310PA may protrude in the radial direction of the cam member 1310 from the rotating axis 1313 by lengths that gradually increase in a direction along the first rotational direction R1. In other words, as the cam member 1310 rotates in the first rotational direction R1 while a plurality of solid detergents are seated on the second cam region 1310A2, the solid detergents may sequentially come in contact with the peak areas from a peak area 1310PA, of which the radially protruding length from the rotating axis 131 is larger to a peak area 1310PA, of which the radially protruding length from the rotating axis 131 is smaller.

The outer rim of the cam member 1310 may be formed with a shape concavely recessed toward the inner side in the radial direction of the cam member 1310. Specifically, such a concavely recessed shape may be provided on the outer rim of the body portion 1312.

In other words, the second cam region 1310A2 may include a concave area 1310CA that is concavely recessed inwardly in the radial direction of the cam member 1310. The concave area 1310CA may be disposed between the plurality of peak areas 1310PA. The concave area 1310CA may be concavely formed on the outer circumferential surface of the body portion 1312.

The concave area 1310CA may also be referred to as a "concave portion" of the cam member 1310.

The concave area 1310CA may be defined as an area located on the outer rim of the cam member 1310, as a part of the second cam region 1310A2. A plurality of the concave areas 1310CA may be provided, and the plurality of concave areas 1310CA may be arranged along the first rotational direction R1 on the second cam region 1310A2. Each of the plurality of concave areas 1310CA may be disposed between two adjacent peak areas 1310PA among the plurality of peak areas 1310PA.

A single concave area 1310CA may include a portion in which the distance between the outer rim and the rotating axis 1313 decreases along the first rotational direction R1 and a portion in which the distance between the outer rim and the rotating axis 1313 increases along the first rotational direction R1, thereby having a concave shape. However, as described above, the lengths of the plurality of peak areas 1310PA from the rotating shaft 1313 are formed to gradually increase along the first rotational direction R1, and correspondingly, the degree to which each of the plurality of concave areas 1310CA protrudes from the rotating axis 1313 may be provided to gradually increase in the first rotational direction R1. In other words, the average distance between a single concave area 1310CA and the rotating axis 1313 may be provided to gradually increase along the first rotational direction R1.

With such a configuration, as the cam member 1310 rotates in the first rotational direction R1, the distances of the plurality of solid detergents seated on the second cam region 1310A2 from the rotating axis 1313 of the cam member 1310 may decrease in a stepwise manner.

Referring to FIGS. 9, 10, and 15 for comparison, the plurality of solid detergents stacked and loaded in the third direction Z inside the storage compartment 1200 may be movable in the third direction Z by the gravity of the solid detergent itself or by the pressing of the holder 1500, and when moved in the third direction Z, the plurality of solid detergents seated on the second cam region 1310A2 may be guided by the second cam region 1310A2 and gradually descend toward the support surface 1222 inside the storage compartment 1200.

In addition, as the concave area 1310CA is provided in the second cam region 1310A2, the solid detergent seated on the second cam region 1310A2 may be more stably supported. For example, the solid detergent may have various shapes depending on the manufacturer, and the like, and in particular, the solid detergent may have a shape in which the lower surface in the third direction Z is convex outward. In this case, the convex lower surface is seated on the concave area 1310CA, and thus the solid detergent may be stably supported by the cam member 1310 in a horizontal state.

When one of the plurality of solid detergents stacked inside the storage compartment 1200 is pressed to the outside of the storage compartment 1200 by the cam member 1310, the one solid detergent may be caught inside the storage compartment 1200, or may be caught between the intermediate door 1250 and the storage compartment 1200, and thus fail to be smoothly discharged to the outside of the storage compartment 1200.

In order to resolve the issue, the cam member 1310 may be provided to be rotatable in the second rotational direction R2 opposite to the first rotational direction R1, and the plurality of peak areas 1310PA may be provided to press one of the plurality of solid detergents while rotating in the second rotational direction R2.

Based on FIGS. 13 to 16, the second rotational direction R2 may be a direction in which the first cam member 1310 rotates counterclockwise. Conversely, based on FIGS. 13 to 16, the second rotational direction R2 may be a direction in which the second cam member 1310' rotates clockwise.

Specifically, the control device 1900 may recognize that the solid detergent has not been discharged from the storage compartment 1200 and not moved to the seating portion 1400 despite the rotation of the cam member 1310.

For example, the control device 1900 may, upon sensing by the seating member sensor 1440 that the solid detergent has not been seated on the seating member 1400 after the cam member 1310 is driven to rotate in the first rotational direction R1, receive a signal output from the seating member sensor 1440, and based on the received signal, recognize that the solid detergent has not been discharged from the storage compartment 1200.

For example, a position sensor (not shown) provided to sense the position of the holder 1500 or the stacked solid detergent may be provided on the holder 1500 or inside the storage compartment 1200, and the position sensor may be configured to sense the position of the holder 1500 or the solid detergent after the cam member 1310 is driven to rotate in the first rotational direction R1, and output a signal. The control device 1900 may receive the signal output from the position sensor, and recognize that the solid detergent has not been discharged from the storage compartment 1200 based on the received signal.

However, it is not limited thereto, and the control device 1900 may recognize that the solid detergent has not been discharged from the storage compartment 1200 in various ways.

The control device 1900 may identify that the solid detergent has been caught inside the storage compartment 1200 or between the intermediate door 1250 and the storage compartment 1200.

For example, the control device 1900 may, based on a power consumption of the driving motor 1320 increasing to a value greater than or equal to a reference power consumption (a power consumption required for driving of the driving motor 1320 at normal times) or an increasing load of the driving motor 1320 in a process of rotating the cam member 1310 in the first rotational direction R1, identify that a solid detergent has been caught in the storage compartment 1200.

For example, the control device 1900 may, based on recognizing that the solid detergent has not been discharged from the storage compartment 1200 despite the rotation of the cam member 1310 in the first rotational direction R1, identify that the solid detergent has been caught in the storage compartment 1200.

In order to resolve the issue of the solid detergent being caught, the control device 1900 may control driving of the ejector 1300 such that the cam member 1310 rotates in the second rotational direction R2.

As the cam member 1310 rotates in the second rotational direction R2, the plurality of peak areas 1310PA protruding in the radial direction of the cam member 1310 may press the lower surface of the caught solid detergent in the third direction Z. In other words, as the cam member 1310 rotates in the second rotational direction R2, the plurality of peak areas 1310PA may press the caught solid detergent in a direction from the outside of the storage compartment 1200 to the inside of the storage compartment 1200.

Accordingly, the solid detergent caught in the storage compartment 1200 may be released, and then the cam member 1310 may rotate again in the first rotational direction R1 to press one solid detergent and discharge the one solid detergent to the outside of the storage compartment 1200. The control device 1900 may, upon recognizing that there is no solid detergent discharged from the storage compartment 1200 even after performing the above process, identify that the solid detergent is still caught inside the storage compartment 1200, or may identify that there is no solid detergent loaded into the storage compartment 1200.

However, the configuration of the plurality of cam regions provided on the outer rim of the cam member 1310 is not limited to the above description, and the cam member 1310 may be formed to have an outer circumferential surface in a variety of shapes different from those shown in FIGS. 13 to 16.

Figure 17:
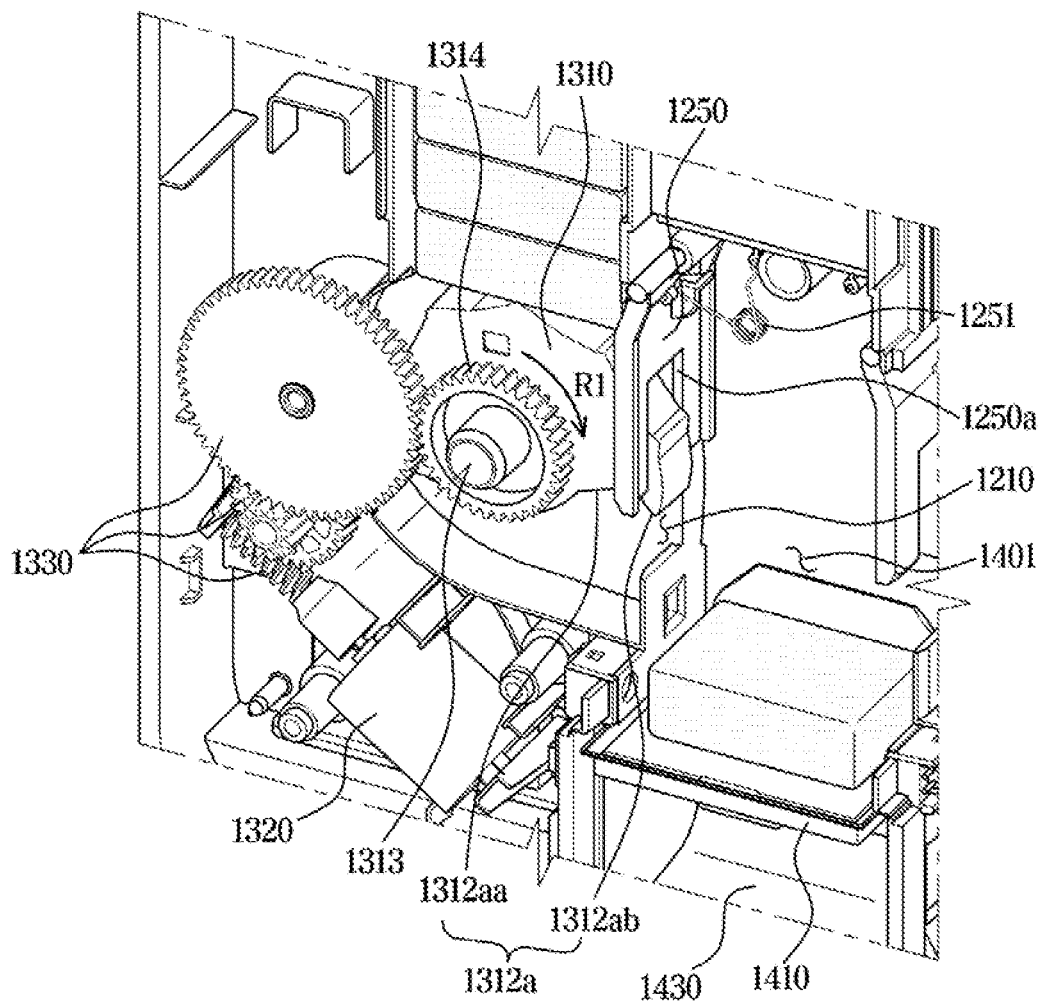
FIG. 17 is a view illustrating a state in which the storage compartment is closed by an intermediate door after the solid detergent of FIG. 9 is discharged from the first storage compartment according to an embodiment of the disclosure.

FIG. 17 is a view illustrating a state in which the storage compartment is closed by an intermediate door after the solid detergent of FIG. 9 is discharged from the first storage compartment.

Referring to FIG. 7, after one of the plurality of solid detergents stacked and loaded inside the storage compartment 1200 is completely discharged to the outside of the storage compartment 1200 by the cam member 1310, the intermediate door 1250 may be provided to close the storage compartment outlet 1210.

Among the plurality of solid detergents loaded in the storage compartment 1200, one solid detergent pressed by the cam member 1310 and moved to the storage compartment outlet 1210 may open the intermediate door 1250 while pressing the intermediate door 1250, and as the intermediate door 1250 is opened, may be moved to the seating member 1400 through the storage compartment outlet 1210.

After one solid detergent is completely moved to the outside of the storage compartment 1200, the intermediate door 1250 may be provided to immediately close the storage compartment outlet 1210. For example, the intermediate door 1250 may be biased toward the storage compartment outlet 1210 by the elastic member 1251 such that the intermediate door 1250 closes the storage compartment outlet 1210.

Accordingly, the intermediate door 1250 may be provided to restrict a movement of the solid detergent inside the storage compartment 1200 to the outside of the storage compartment 1200 by another external force, rather than being discharged by pressing of the cam member 1310.

The pressing portion 1312*a* of the cam member 1310 may be provided such that a distance between one end of the pressing portion 1312*a* in the radial direction of the hub portion 1311 and the rotating axis 1313 of the cam member 1310 is greater than or equal to a distance between the storage compartment outlet 1210 and the rotating axis 1313. In other words, the pressing portion 1312*a* may be elongated to pass through the storage compartment outlet 1210 according to the rotation of the cam member 1310. For example, the pressing portion 1312*a* may pass through the storage compartment outlet 1210 immediately after one solid detergent is moved to the seating member 1410 as shown in FIG. 17.

In this case, the intermediate door 1250 may include a door insertion portion 1250*a* into which at least a portion of the pressing portion 1312*a* is insertable, to rapidly close the storage compartment outlet 1210. The pressing portion 1312*a*, located in a position passing through the storage compartment outlet 1210 by rotation, may be inserted into the door insertion portion 1250*a*, and the intermediate door 1250 may be prevented from interfering with the pressing portion 1312*a* during a process of being closed.

The door insertion portion 1250*a* may extend to one end of the intermediate door 1250 in the third direction Z. The pressing portion 1312*a* inserted into the door insertion portion 1250*a* may be provided to rotate in the first rotational direction R1, and reach the one end of the intermediate door 1250 in the third direction Z, escaping from the door insertion portion 1250*a*.

When the automatic detergent dispenser 1000 is in the first position 1000A, the thickness of the pressing portion 1312*a* in the first direction X may be smaller than the width of the door insertion portion 1250*a* in the first direction X.

Figure 18:
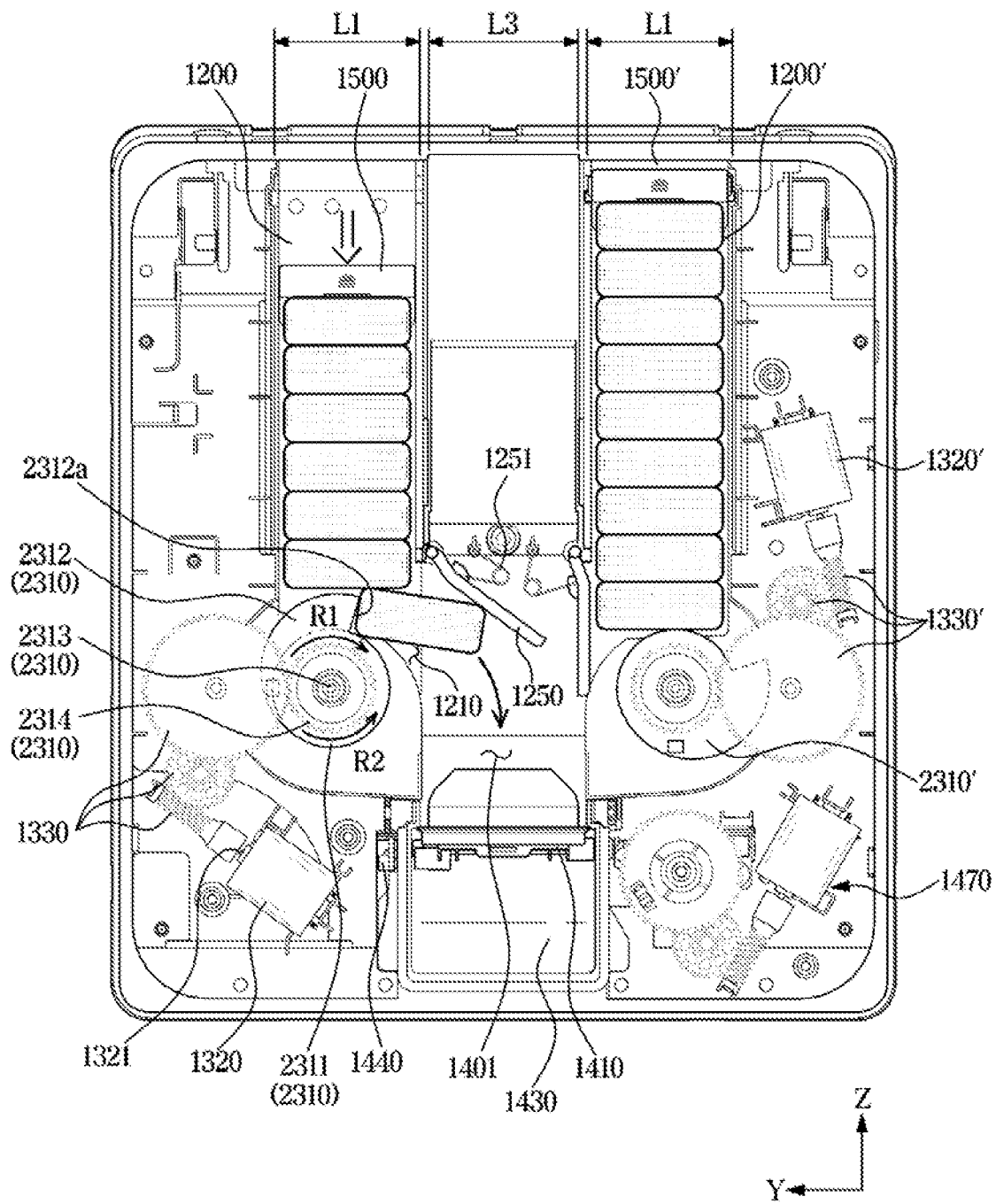
FIG. 18 is a view illustrating a state in which some components of the automatic detergent dispenser of the dishwasher according to an embodiment of the disclosure are removed.

FIG. 18 is a view illustrating a state in which some components of the automatic detergent dispenser of the dishwasher according to an embodiment are removed.

Referring to FIG. 18, a detergent automatic detergent dispenser of a dishwasher according to an embodiment will be described. In describing the embodiment shown in FIG. 18, components identical to those shown in FIGS. 1 to 17 may be given the same reference numerals, and descriptions thereof may be omitted.

Referring to FIG. 18, the automatic detergent dispenser 1000 of the dishwasher 1 may include cam members 2310 and 2310' rotatably provided at one side of the storage compartments 1200 and 1200'. The cam members 2310 and 2310' may include a first cam member 2310 disposed on the left side and a second cam member 2310' disposed on the right side with reference to FIG. 18. The first cam member 2310 and the second cam member 2310' may be configured to correspond to each other. For the sake of convenience of description, the following description will be made in relation to the first cam member 2310, and description of the second cam member 2310' may be omitted. In addition, for the sake of convenience of description, the first cam member 2310 may be referred to as a cam member.

The cam member 2310 may be provided at one side of the storage compartment 1200 in the third direction Z. When the automatic detergent dispenser 1000 is in the first position 1000A, the cam member 2310 may be provided to rotate in the first rotational direction R1 to move one of the plurality of solid detergents stacked inside the storage compartment 1200 to the outside of the storage compartment 1200.

The cam member 2310 may be provided to be rotatable around a rotating axis 2313 located at a side of the storage compartment 1200 in the third direction Z. The cam member 2310 may include a power transmission portion 2314 provided to receive rotational force from the power supply devices 1320 and 1330.

The cam member 2310 may include a hub portion 2311 provided to be rotatable around the rotating axis 2313 and a body portion 2312 provided to be rotatable together with the hub portion 2311 and formed to radially extend from a portion of an outer rim of the hub portion 2311.

The body portion 2312 may include a pressing portion 2312a provided to rotate in the first rotational direction R1 to press one solid detergent toward the outside of the storage compartment 1200. The pressing portion 2312a may be provided at one end of the body portion 2312 in the first rotational direction R1.

As shown in FIG. 18, the pressing portion 2312a may be formed to extend only in a constant direction from the hub portion 2311, for example, in a radial direction of the hub portion 2311. However, it is not limited thereto, and as an example, the pressing portion 2312a may be formed to have a concavely recessed shape.

The body portion 2312 may be formed to include a shape in which a length extending from the hub portion 2311 gradually increases along the first rotational direction R1. In other words, the body portion 2312 may be formed to have a shape in which a distance between an outer rim of the body portion 2312 and the rotating axis 2313 gradually increases along the first rotational direction R1. The body portion 2312 may be formed to include a smooth curved surface.

Accordingly, the body portion 2312 may be provided to guide a movement of the plurality of solid detergents stacked and loaded in the storage compartment 1200 in parallel with the third direction Z. More specifically, the body portion 1312 may be provided to guide a gradual descent of the plurality of solid detergents seated on the outer circumferential surface of the body portion 1312 inside the storage compartment as the body portion 1312 rotates in the first rotational direction R1.

On the other hand, the body portion 2312 may be provided on the outer rim thereof with a plurality of peak areas (not shown) that protrude in the radial direction of the cam member 2310, and as the cam member 2310 rotates in the second rotational direction R2, the plurality of peak areas may be provided to press the solid detergent caught inside the storage compartment 1200 to release the caught solid detergent as described in FIG. 16.

Hereinafter a cross-sectional area of the storage compartment 1200 according to an embodiment will be described in detail.

Figure 19:
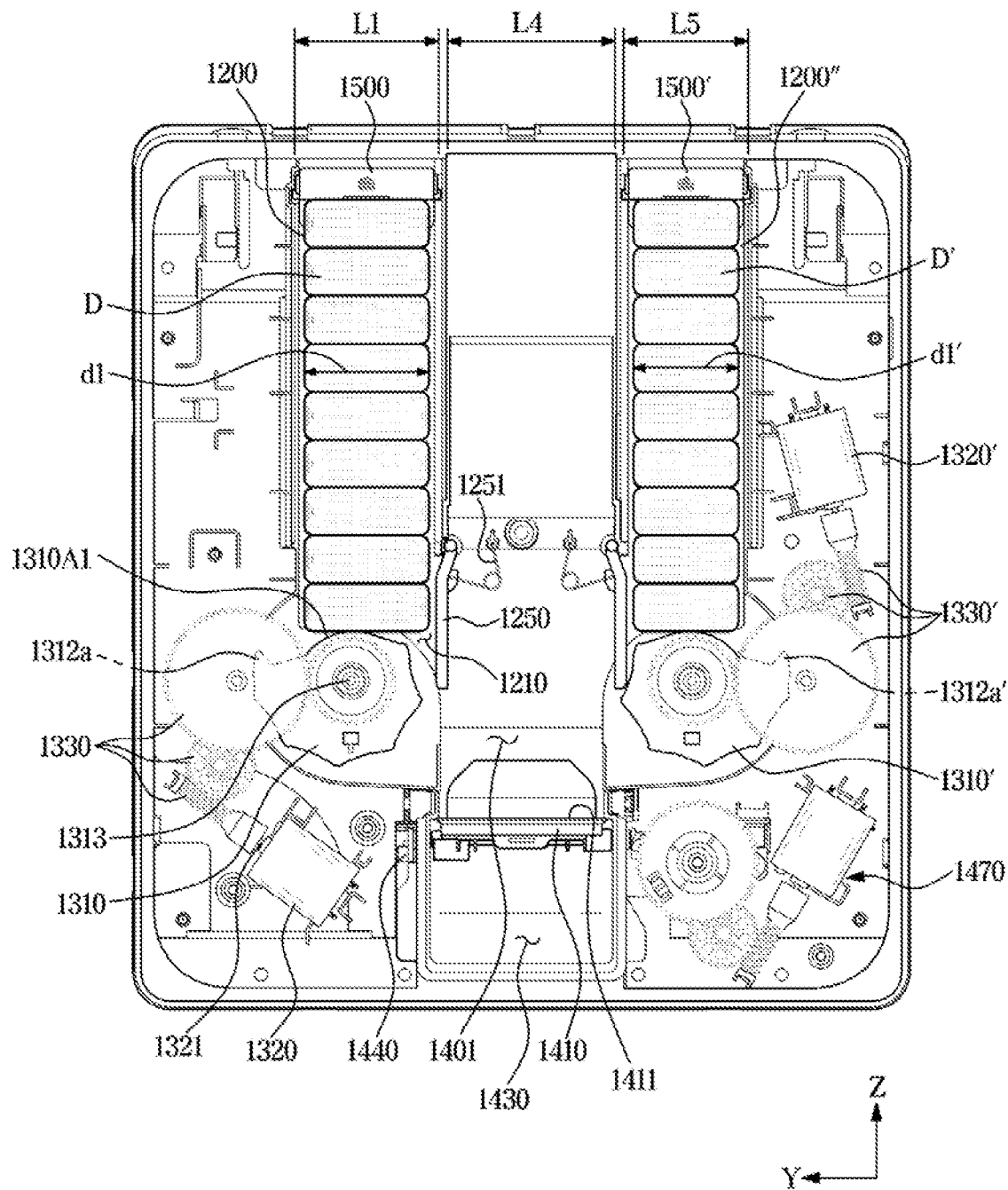
FIG. 19 is a view illustrating a state in which some components of the automatic detergent dispenser of the dishwasher according to an embodiment of the disclosure are removed.

FIG. 19 is a view illustrating a state in which some components of the automatic detergent dispenser of the dishwasher according to an embodiment are removed.

The following description of the embodiment of FIG. 19 will be made in relation to the configuration of the automatic detergent dispenser including the cam member 1310 shown in FIGS. 1 to 17, but it is not limited thereto. The embodiment described below with reference to FIG. 19 may also be applied to the configuration of the automatic detergent dispenser including the cam member 2310 shown in FIG. 18.

For example, as shown in FIG. 19, the horizontal length L1 of the first storage compartment 1200 and a horizontal length L5 of the second storage compartment 1200' may be different from each other.

For example, the horizontal length L1 of the first storage compartment 1200 may be provided to have a predetermined length to allow the above-described solid detergent D to be stored in the storage compartment 1200. The horizontal length L5 of the second storage compartment 1200' may be less than the horizontal length L1 of the first storage compartment 1200.

For example, the horizontal length L5 of the second storage compartment 1200' may be greater than the horizontal length L1 of the first storage compartment 1200.

The width L4 of the seating member 1400 in the second direction Y may be substantially similar to the width L1 of the first storage compartment 1200. This is because, when the solid detergent is discharged from the first storage compartment 1200 to the seating member 1400 in a state in which the width L4 of the seating member 1400 is excessively less than the width L5 of the second storage compartment 1200', the solid detergent may be stuck in the seating member inner space 1401 without being seated on the seating member door 1410.

Conversely, when the width L4 of the seating member 1400 in the second direction Y is excessively greater than the width L1 of the first storage compartment 1200 or the width L5 of the second storage compartment 1200', the volume of the seating member 1400 in the second direction Y may increase more than necessary and thus the volume of the automatic detergent dispenser 1000 in the second direction Y may increase more than necessary.

Therefore, as described above, it is appropriate that the width L4 of the seating member 1400 may have a length similar to the width L1 of the first storage compartment 1200 having a cross-sectional area S in accordance with the size of the solid detergent, in the second direction Y.

When the above-described solid detergent D is defined as a general solid detergent D that has an appropriate volume for washing in accordance with a capacity of the tub 12 of the general dishwasher 1 and has a predetermined horizontal length d1 according to the appropriate volume, a small solid detergent D' stored in the second storage compartment 1200' may be defined as a small solid detergent D' that has a smaller volume than the general solid detergent D and thus has a shorter horizontal length than the horizontal length d1 of the solid detergent D. Further, the small solid detergent D' may be a solid detergent D' in a shape in which the general solid detergent D is partially cut in the direction of the horizontal length d1.

When a user wants to wash only a small number of dishes, it may be possible to wash the small number of dishes with a smaller detergent than the general solid detergent D that is generally used according to the capacity of the tub 12.

Apart from the general solid detergent D stored in the first storage compartment 1200, the second storage compartment 1200' may be provided to store the small solid detergent D', which is different in volume from the solid detergent D. Accordingly, a user can selectively perform the washing process using the general solid detergent D or the small solid detergent D' as needed.

A user can input information about the washing mode of the dishwasher 1 through the inputter of the dishwasher 1 or a mobile device to allow the dishwasher 1 to selectively perform one of a normal washing mode and a small amount washing mode.

The control device 1900 may control the automatic detergent dispenser 1000 to drive the first ejector 1300 or the second ejector 1300' based on a user input obtained from the main control device.

When a user selects the normal washing mode, the control device 1900 may control the automatic detergent dispenser 1000 to allow the first ejector 1300 to be driven.

When a user selects the small amount washing mode, the control device 1900 may control the automatic detergent dispenser 1000 to allow the second ejector 1300' to be driven.

Hereinafter an adjusting member 1270 configured to adjust the cross-sectional area of the storage compartment 1200 according to an embodiment will be described in detail.

Figure 20:
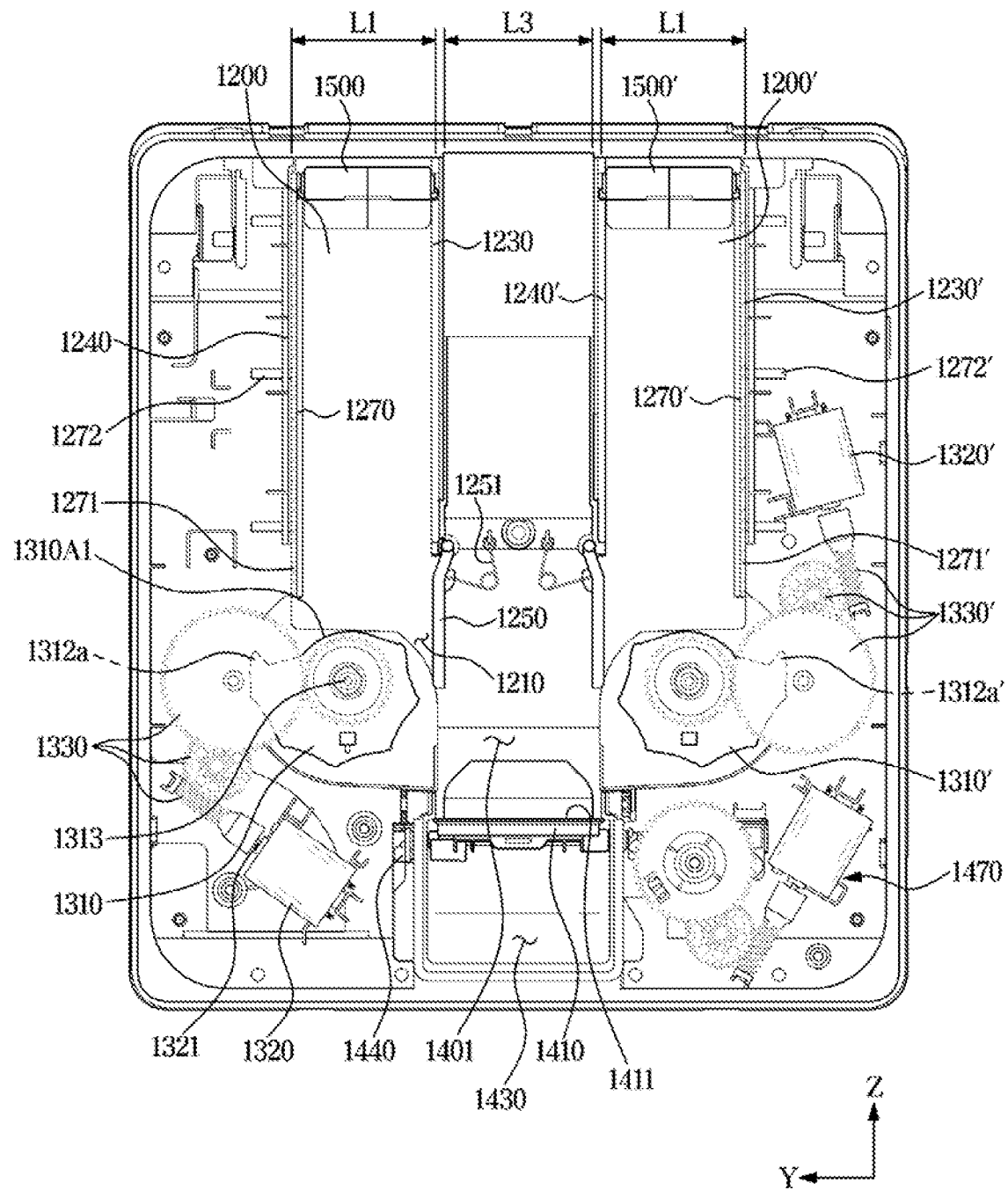
FIG. 20 is a view illustrating a state in which some components of the automatic detergent dispenser of the dishwasher according to an embodiment of the disclosure are removed.
Figure 21:
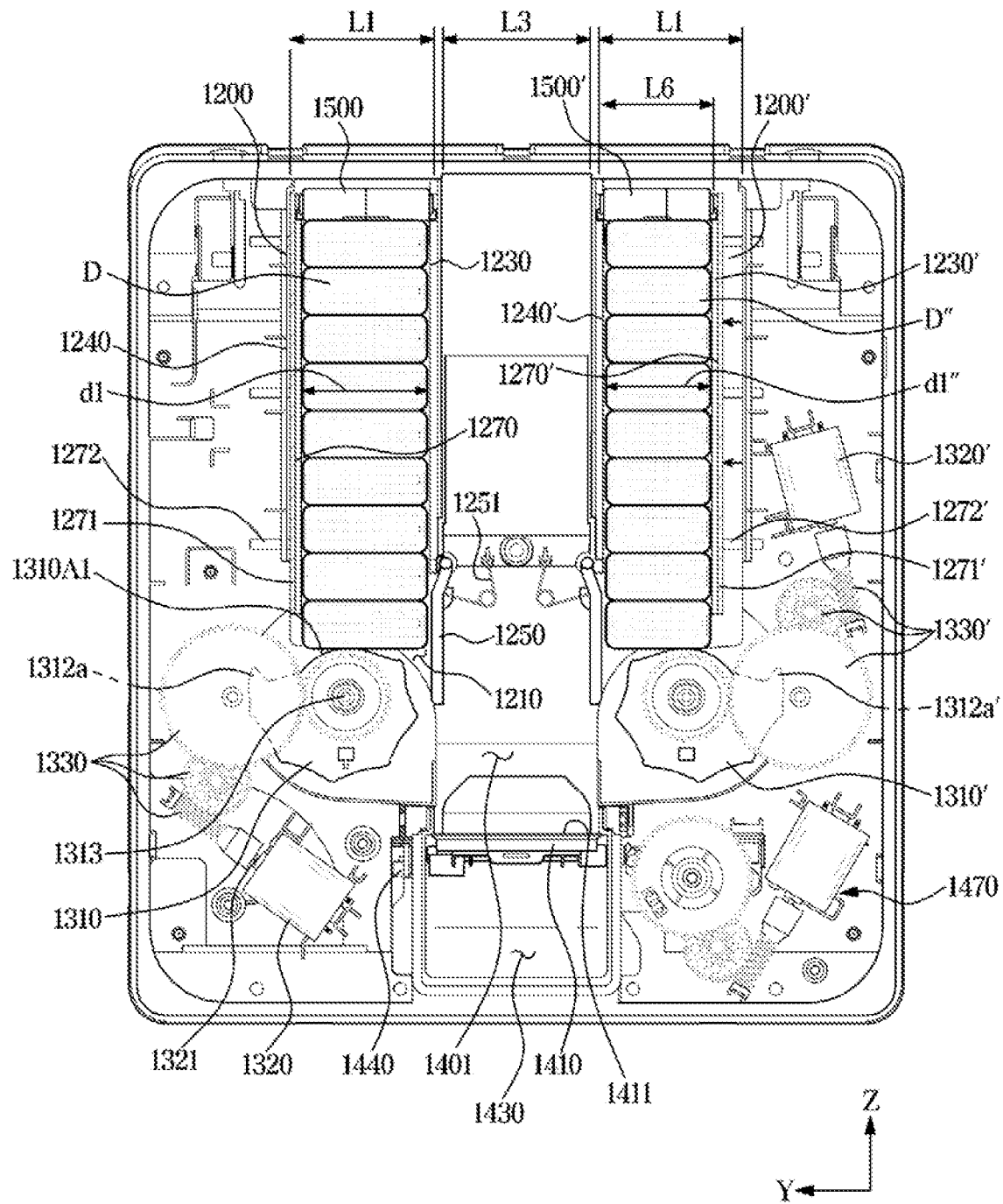
FIG. 21 is a view illustrating a state in which an adjusting member of the second storage compartment has been moved from that shown in FIG. 20.

FIG. 20 is a view illustrating a state in which some components of the automatic detergent dispenser of the dishwasher according to an embodiment are removed, and FIG. 21 is a view illustrating a state in which an adjusting member of the second storage compartment is moved from the state in FIG. 20.

The following description of the embodiment of FIGS. 20 and 21 will be made in relation to the configuration of the automatic detergent dispenser including the cam member 1310 shown in FIGS. 1 to 17, but it is not limited thereto. The embodiment described below with reference to FIGS. 20 and 21 may also be applied to the configuration of the automatic detergent dispenser including the cam member 2310 shown in FIG. 18.

For example, as shown in FIGS. 20 and 21, the storage compartment 1200 may include the adjusting member 1270 configured to adjust an internal width of the storage compartment 1200.

When the above-described solid detergent D is defined as a general solid detergent D that has an appropriate volume for washing in accordance with a capacity of the tub 12 of the general dishwasher 1 and has a predetermined horizontal length d1 according to the appropriate volume, some solid detergents D" may have a smaller volume than the general solid detergent D, and thus a width d1" of the solid detergents D" may be less than the width d1 of the general solid detergents D.

For example, when the some solid detergents D" are stacked in the storage compartment 1200 having the width L1 corresponding to the width d1 of the general solid detergent D, the some solid detergents D" may be moved in the second direction Y due to a gap between the right surface 1230 or the left surface 1240 of the storage compartment 1200 and the some solid detergents D" in the storage compartment 1200, and thus the some solid detergents D" may be separated from the stacked arrangement of the solid detergents D". When the ejector 1300 is driven in a state in which the some solid detergents D" are separated, the plurality of solid detergents D" may not be moved to the third direction Y by the ejector 1300 and the some solid detergents D" may be stuck in the storage compartment 1200 and thus may not be discharged to the outside of the storage compartment 1200.

For example, the storage compartment 1200 may include the adjusting member 1270 configured to adjust the width of the storage compartment 1200 in the second direction Y, and the adjusting member 1270 may be moved in the second direction Y so as to adjust the width of the storage compartment 1200.

Even when a width d1" of some solid detergent D" is less than the width d1 of the general solid detergent D, the adjusting member 1270 may adjust a width L6 of the storage compartment 1200 to correspond to the width d1" of the some solid detergent D", and thus the stacked state of the solid detergents D" may be maintained in the storage compartment 1200

The adjusting member 1270 may include a support wall 1271 provided to support a plurality of solid detergents and a mover 1272 connected to the support wall 1271 in the second direction Y so as to move a position of the support wall 1271 toward the second direction Y.

The adjusting member 1270 may be disposed on the right surface 1230 or the left surface 1240 of the storage compartment 1200.

When the support wall 1271 is disposed closest to the right surface 1230 or the left surface 1240, the width L1 of the storage compartment 1200 may be approximately the same as the width d1 of the general solid detergent D.

A user can adjust the width of the storage compartment 1200 by pressing the support wall 1271 toward the second direction Y. For example, a user can move the support wall 1271, which is disposed adjacent to the right surface 1230 or the left surface 1240, toward the second direction Y so as to allow the width d1" of some solid detergents D" to correspond to the width L6 of the storage compartment 1200.

For example, the mover 1272 may be extended or contracted in the second direction Y to allow the support wall 1271 to be moved in the second direction Y inside the storage compartment 1200.

For example, the mover 1272 may be provided to be movable in the second direction Y between the outside and the inside of the storage compartment 1200 to allow the support wall 1271 to be moved in the second direction Y inside the storage compartment 1200.

For example, a user can open the storage compartment cover 1140 to open the storage compartment 1200 and move the adjusting member 1270 toward the second direction Y to have a width of the storage compartment 1200 that is desired by the user. A user can selectively adjust the width of the storage compartment 1200 by gripping the support wall 1271 and moving the support wall 1271 toward the second direction Y to form the width of the storage compartment 1200 desired by the user. As a user presses the support wall 1271, the mover 1272 may be extended or contracted in the second direction Y.

For example, the adjusting member 1270 may be driven by the control of the control device 1900 by an adjusting member driver. A user can input information about the width of the storage compartment 1200 to the dishwasher 1 through the inputter of the dishwasher 1 or a mobile device, and the control device 1900 may control the adjusting member 1270 to move the mover 1272 or to expand or contract the mover 1272 so as to allow the adjusting member 1270 to be moved in the second direction Y by a predetermined distance based on the user input obtained from the main control device.

The holder 1500 may be provided to move between the support wall 1271 and one surface, on which the adjusting member 1270 is not disposed, of the right surface 1230 or the left surface 1240.

For example, the guide rail 1290 provided to guide the movement of the holder 1500 may be disposed on the support wall 1271. The holder 1500 may be translated in the third direction Z by being guided by the guide rail 1290 disposed on the support wall 1271 and the guide rail disposed on one surface, on which the adjusting member 1270 is not disposed, of the right surface 1230 or the left surface 1240.

The holder 1500 may be provided in a shape that is contracted in the second direction Y when the support wall 1271 is moved in a direction away from the right surface 1230 or the left surface 1240.

The holder 1500 may be provided in a shape that is contracted or expanded in the second direction Y. For example, the holder 1500 may be provided in a telescopic shape. Accordingly, when the support wall 1271 is moved toward the center of the storage compartment 1200, the holder 1500 may be overlapped and contracted, and when the support wall 1271 is moved in the opposite direction of the center direction of the storage compartment 1200, the holder 1500 may be expanded and extended.

The adjusting member 1270 may include a first adjusting member 1270 provided inside the first storage compartment 1200 and a second adjusting member 1270' provided inside the second storage compartment 1200'.

For example, a user can adjust the width of the first storage compartment 1200 and the second storage compartment 1200' by moving the first adjusting member 1270 and the second adjusting member 1270', respectively.

For example, a user can maintain the width L1 of the first storage compartment 1200 and the second storage compartment 1200' by not moving both the first adjusting member 1270 and the second adjusting member 1270'.

For example, a user can adjust the widths of the first storage compartment 1200 and the second storage compartment 1200' by moving one of the first and second adjusting members 1270 and 1270'.

For example, the first adjusting member 1270 may be disposed on the left surface 1240 of the first storage compartment 1200. The second adjusting member 1270' may be disposed on the right surface 1230' of the second storage compartment 1200'.

Alternatively, the second adjusting member 1270' may be disposed on the left surface 1240' of the second storage compartment 1200'. The first adjusting member 1270 may be disposed on the right surface 1230 of the first storage compartment 1200.

Alternatively, the first adjusting member 1270 and the second adjusting member 1270' may be disposed on the left surface 1240 of the first storage compartment 1200 and the left surface 1240' of the second storage compartment 1200', respectively.

Alternatively, the first adjusting member 1270 and the second adjusting member 1270' may be disposed on the right surface 1230 of the first storage compartment 1200 and the right surface 1230' of the second storage compartment 1200', respectively.

Alternatively, the adjusting member 1270 may be provided in only one of the first storage compartment 1200 and the second storage compartment 1200'.

For example, as shown in FIG. 21, the adjusting member 1270 of the first storage compartment 1200 may be disposed adjacent to the left surface 1240 to allow the width L1 of the first storage compartment 1200 to correspond to the width d1 of the general solid detergent D, and the adjusting member 1270' of the second storage compartment 1200' may be moved in the second direction Y from the right surface 1230' to allow the width L6 of the second storage compartment 1200' to correspond to the width d1" of some solid detergent D".

At this time, a user can load the general solid detergent D into the first storage compartment 1200 and load some solid detergent D" into the second storage compartment 1200'.

The storage compartment 1200 may include an adjusting member detection sensor configured to detect a position of each of the support walls 1271 and 1271'. The adjusting member detection sensor may detect a position in which the support wall 1271 of the first storage compartment 1200 and the support wall 1271' of the second storage compartment 1200' are disposed, and the control device 1900 may be configured to recognize the type of solid detergent loaded in the first storage compartment 1200 and the type of the solid detergent loaded in the second storage compartment 1200' based on the detected value.

For example, the adjusting member detection sensor may measure a distance to a position of each of the support walls 1271 and 1271', or detect a distance to a position of each of the support walls 1271 and 1271' by detecting a distance in which each of the movers 1272 and 1272' is moved, extended or contracted.

A user can input information about the washing mode of the dishwasher 1 through the inputter of the dishwasher 1 or a mobile device to allow the dishwasher 1 to selectively perform one of the normal washing mode and the small amount washing mode.

The control device 1900 may control the automatic detergent dispenser 1000 to allow the first ejector 1300 or the second ejector 1300' to be driven based on the user input obtained from the main control device, and a value sensed by the adjusting member detection sensor.

For example, when a user selects the normal washing mode, the control device 1900 may control the automatic detergent dispenser 1000 to allow the first ejector 1300 to be driven. When a user selects the small amount washing mode, the controller 1900 may control the automatic detergent dispenser 1000 to allow the second ejector 1300' to be driven.

Referring to FIGS. 1 to 21, the cam members 1310 and 2310 may be rotatably provided about the rotating axes 1313 and 2313 in a direction parallel to the first direction X. However, it is not limited thereto, and the cam members 1310 and 2310 may be provided to have a rotating axis in a direction different from the above.

For example, the cam members 1310 and 2310 may be provided to be rotatable about a rotating axis in a direction parallel to the third direction Z. Even when a plurality of solid detergents are stacked in the third direction Z in the storage compartment 1200, the cam members 1310 and 2310 may be disposed at the lower side of the storage compartment 1200 in the third direction Z, The cam members 1310 and 2310 may be provided to press one solid detergent to the outside of the storage compartment 1200 while rotating around the rotating axis in a direction parallel to the third direction Z. In this case, as an example, the pressing portion of the cam members 1310 and 2310 provided to press one solid detergent may have a shape protruding in a direction parallel to the radial direction of the cam members 1310 and 2310 as shown in FIGS. 1 to 18. Alternatively, the pressing portion of the cam members 1310 and 2310 provided to press one solid detergent may have a shape protruding in the third direction Z.

In addition, as an example, the cam members 1310 and 2310 may be provided to rotate around a rotating axis in a direction parallel to the third direction Z, and the cam members 1310 and 2310 may be formed to have a shape in which the thickness or height of the cam members 1310 and 2310 in the third direction Z varies in a gradual and/or stepwise manner along the rotational direction of the cam members 1310 and 2310. More specifically, as an example, the cam members 1310 and 2310 may include a first cam region having the smallest thickness in the third direction Z and a second cam region arranged at a side of the first cam region in the rotational direction of the cam members 1310 and 2310. In this case, the second cam region may be formed to have a shape in which the thickness in the third direction Z gradually increases along the rotational direction of the cam members 1310 and 2310. Alternatively, as an example, the cam members 1310 and 2310 may include a first cam region located at a position where the height of the upper surface in the third direction Z is the lowest and a second cam region arranged at a side of the first cam region in the rotational direction of the cam members 1310 and 2310. In this case, the second cam region may be formed to have a shape in which the height of the upper surface in the third direction Z increases gradually/stepwise along the rotational direction of the cam members 1310 and 2310. In this case, the plurality of solid detergents seated on the upper surfaces of the cam members 1310 and 2310 in the third direction Z may be guided to move in parallel to the third direction Z as the cam members 1310 and 2310 rotate. In other words, the plurality of solid detergents may be slowly moved downward in the third direction Z as the cam members 1310 and 2310 rotate.

Embodiments of the disclosure may provide a dishwasher including a main body; a tub provided inside the main body; a door configured to open and close the tub; and an automatic detergent dispenser disposed on the door and configured to input a solid detergent toward an inside of the tub, wherein the automatic detergent dispenser includes: a storage compartment provided to allow a plurality of solid detergents to be stacked and loaded in an upper to lower direction of the door while the door closes the tub; and a transporting member configured to be rotatable around a rotating axis located at one side of the storage compartment, and allowing one solid detergent adjacent to the rotating axis among the plurality of solid detergents to be discharged from the storage compartment, wherein the transporting member includes a pressing portion protruding in a radial direction of the transporting member, the pressing portion configured to press the one solid detergent in a direction different from a direction in which the plurality of solid detergents may be stacked according to rotation of the transporting member.

The transporting member may include a hub portion passed by the rotating axis, and a body portion formed to extend from a portion of an outer rim of the hub portion in a radial direction of the hub portion, w % herein the pressing portion may be formed on the body portion.

The body portion may be configured to, according to rotation around the rotating axis of the transporting member, guide a step-wise descent of the plurality of solid detergents seated on an outer circumferential surface of the body portion inside the storage compartment.

The transporting member may include a plurality of peak areas arranged spaced apart from each other on an outer circumferential surface of the body portion along a rotational direction of the transporting member, and having a shape protruding in a radial direction of the body portion; and a concave area positioned between the plurality of peak areas and concavely formed on the outer circumferential surface of the body portion, wherein a protruding length of each of the plurality of peak areas in the radial direction of the body portion may be formed to gradually increase along the rotational direction of the transporting member.

Embodiments of the disclosure may provide a dishwasher including a main body; a tub provided inside the main body; a door configured to open and close the tub; and an automatic detergent dispenser disposed on the door and configured to input a solid detergent toward an inside of the tub while the door closes the tub, wherein the automatic detergent dispenser includes: a storage compartment provided to allow a plurality of solid detergents to be stacked and loaded in a first direction; and a transporting member rotatably provided with respect to the storage compartment, and configured to move one solid detergent among the plurality of solid detergents inside the storage compartment in a second direction different from the first direction, wherein the transporting member includes: a plurality of protruding portions having a shape protruding from an outer circumferential surface of the transporting member and formed to support the solid detergent inside the storage compartment; and a concave portion located between the plurality of protruding portions on the outer circumferential surface of the transporting member and formed to have a concavely recessed shape.

According to a technical concept of the present disclosure, the automatic detergent dispenser of the dishwasher may include a storage compartment such that a plurality of solid detergents may be stacked and loaded into the storage compartment of the automatic detergent dispenser.

According to a technical concept of the present disclosure, the automatic detergent dispenser of the dishwasher may include an ejector configured to move one of a plurality of solid detergents loaded in a storage compartment to an outside of the storage compartment such that a certain amount of solid detergent may be input to a tub in a washing process.

According to a technical concept of the present disclosure, the automatic detergent dispenser of the dishwasher may include a cam member that is rotatably provided such that the cam member may press a solid detergent loaded in a storage compartment to thereby move the solid detergent to an outside of the storage compartment.

According to a technical concept of the present disclosure, the automatic detergent dispenser of the dishwasher may include a cam member that is rotatably provided to guide a movement of solid detergents loaded into a storage compartment.

The effects of the present disclosure are not limited to the effects described above, and other effects that are not described will be clearly understood by those skilled in the art from the above detailed description.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A dishwasher comprising:
   a tub;
   a door to open and close the tub; and
   an automatic detergent dispenser disposed on the door and configured to input a solid detergent toward an inside of the tub, the automatic detergent dispenser including:
   a storage compartment in which a plurality of solid detergents are stackable so as to be loaded along one direction, and
   a transporting member arranged at one side of the storage compartment along the one direction in which the plurality of solid detergents are stackable, and configured to move a solid detergent, among the plurality of solid detergents loaded in the storage compartment, outside of the storage compartment, the transporting member including:
   a hub portion configured to be rotatable in a first rotational direction around a rotating axis, and a body portion extending from a portion of an outer rim of the hub portion, in a radial direction of the hub portion, and configured to rotate together with the hub portion in the first rotational direction, wherein the body portion is configured to, when rotated in the first rotational direction, and a plurality of solid detergents are loaded in the storage compartment:

press one solid detergent among the plurality of solid detergents outside of the storage compartment, and guide a movement of at least one remaining solid detergent, among the plurality of solid detergents, inside the storage compartment along the one direction, the body portion includes a pressing portion configured to press the one solid detergent outside of the storage compartment during rotation of the body portion in the first rotational direction, and the pressing portion is formed at one end of the body portion in the first rotational direction.

2. The dishwasher of claim 1, wherein the pressing portion includes: a first portion extending from the hub portion, and a second portion extending in the first rotational direction from one end of the first portion.

3. The dishwasher of claim 2, wherein
the first portion obliquely extends from the hub portion in a direction opposite to the first rotational direction with respect to the radial direction of the hub portion.

4. The dishwasher of claim 2, wherein
an extension length of the first portion is longer than an extension length of the second portion.

5. The dishwasher of claim 1, wherein the storage compartment includes a storage compartment outlet configured to pass a solid detergent therethrough to be discharged outside of the storage compartment, and a distance between one end of the pressing portion in the radial direction of the hub portion and the rotating axis of the transporting member is greater than or equal to a distance between the storage compartment outlet and the rotating axis of the transporting member.

6. The dishwasher of claim 1, wherein
the transporting member includes a plurality of cam regions divided in the first rotational direction on an outer rim of the transporting member,
the plurality of cam regions include:
a first cam region located on the outer rim of the hub portion, and
a second cam region located at a side of the first cam region in the first rotational direction, on an outer rim of the body portion, and
the second cam region is configured to guide the movement of the at least one remaining solid detergent inside the storage compartment along the one direction toward the rotating axis of the transporting member during the rotation of the body portion in the first rotational direction.

7. The dishwasher of claim 6, wherein
the second cam region includes:
a plurality of peak areas arranged along the first rotational direction and protruding in a radial direction of the transporting member, and
a concave area positioned between adjacent peak areas among the plurality of peak areas, and recessed inwardly in the radial direction of the transporting member.

8. The dishwasher of claim 7, wherein
a protruding length of each of the plurality of peak areas in the radial direction of the transporting member gradually increases along the first rotational direction.

9. The dishwasher of claim 7, wherein
the transporting member is configured to be rotatable in a second rotational direction opposite to the first rotational direction, and
the plurality of peak areas are configured to press one solid detergent among the plurality of solid detergents when the transporting member is rotated in the second rotational direction.

10. The dishwasher of claim 6, wherein
the storage compartment includes a support surface configured to allow a solid detergent, among the plurality of solid detergents, closest to the rotating axis of the transporting member to be supported in the one direction in which the plurality of solid detergents are stacked, and
the first cam region is configured such that a distance between an outer rim of the first cam region and the rotating axis of the transporting member is less than or equal to a distance between the support surface and the rotating axis of the transporting member.

11. The dishwasher of claim 1, wherein
the body portion has a shape in which a length extending from the hub portion gradually increases along the first rotational direction.

12. The dishwasher of claim 1, wherein
the body portion is configured to press the one solid detergent in a direction perpendicular to the one direction in which the plurality of solid detergents are stacked.

13. The dishwasher of claim 1, wherein
while the tub is closed by the door:
the one direction in which the plurality of solid detergents are stacked is parallel to an upper to lower direction of the door, and
the transporting member is configured to move the one solid detergent, which is disposed at a lowest position among the plurality of solid detergents before being pressed outside of the storage compartment, outside of the storage compartment as the transporting member rotates in the first rotational direction.

14. The dishwasher of claim 13, wherein
the rotating axis of the transporting member is located below the storage compartment.

* * * * *